United States Patent [19]
Nakatani et al.

[11] Patent Number: 5,608,547
[45] Date of Patent: Mar. 4, 1997

[54] IMAGE FORMING APPARATUS HAVING ILLUMINATION DIRECTION ALTERED FOR EVERY PLURALITY OF READOUT OPERATIONS WITH RESPECT TO ONE ORIGINAL

[75] Inventors: Munehiro Nakatani; Yoshikazu Ikenoue, both of Toyohashi; Atsushi Ishikawa, Okazaki; Akio Nakajima, Toyokawa; Hideo Kumashiro, Toyokawa; Katsuaki Tajima, Toyokawa; Tetsuya Itoh, Okazaki; Keiji Nakatani; Sou Hirota, both of Toyokawa, all of Japan

[73] Assignee: Minolta Camera Kabushiki Kaisha, Osaka, Japan

[21] Appl. No.: 229,788

[22] Filed: Apr. 19, 1994

[30] Foreign Application Priority Data

Apr. 22, 1993 [JP] Japan .................... 5-096231

[51] Int. Cl.⁶ .................. H04N 1/04; H04N 1/48
[52] U.S. Cl. .............. 358/505; 358/509; 358/461; 358/474; 358/475
[58] Field of Search .................... 358/475, 461, 358/463, 448, 452, 509, 515; 355/232, 234, 228, 67; 348/269, 268

[56] References Cited

U.S. PATENT DOCUMENTS

| | | |
|---|---|---|
| 3,723,630 | 3/1973 | Perreault . |
| 4,239,383 | 12/1980 | Peterson .................... 355/228 |
| 4,333,130 | 6/1982 | Mochizuki et al. .................... 355/67 |
| 4,473,865 | 9/1984 | Landa .................... 355/228 |
| 4,483,609 | 11/1984 | Harada .................... 355/232 |
| 4,518,249 | 5/1985 | Murata et al. .................... 355/67 |
| 4,639,608 | 1/1987 | Kuroda .................... 358/475 |
| 4,691,228 | 9/1987 | Nagano .................... 358/509 |
| 4,816,875 | 3/1989 | Takeda et al. .................... 355/228 |
| 4,875,091 | 10/1989 | Yamada et al. .................... 348/269 |
| 5,084,772 | 1/1992 | Shimoyama .................... 358/475 |
| 5,408,268 | 4/1995 | Shipp .................... 348/269 |

FOREIGN PATENT DOCUMENTS

| | | | |
|---|---|---|---|
| 56-1663 | 1/1981 | Japan .................... | H04N 1/04 |
| 86263 | 3/1990 | Japan .................... | H04N 1/04 |
| 3-79158 | 4/1991 | Japan . | |
| 3-289763 | 12/1991 | Japan . | |
| 280946 | 10/1993 | Japan . | |

*Primary Examiner*—Scott A. Rogers
*Attorney, Agent, or Firm*—Burns, Doane, Swecker & Mathis, LLP

[57] ABSTRACT

In a shadow process mode, a scanner reads out an original with a first exposure lamp in a first scanning operation. The readout image data is stored in an image memory via an I/O control unit. In the second scanning operation, the scanner reads out the original with a second exposure lamp having an illumination direction different from that of the first exposure lamp. The image data read out in the second scanning operation and the data stored in the image memory are subtracted for each pixel by a subtractor. The difference thereof is compared with a predetermined value in a comparator. The compared result is output to a selector, whereby a desired image data is provided to a printer processing unit via the I/O control unit.

37 Claims, 47 Drawing Sheets

BRIGHTNESS

γ CORRECTION PARAMETER a. INCLINATION
b. CUT AMOUNT
c. AMOUNT OF LEVEL SHIFT

IMAGE FORMING APPARATUS HAVING ILLUMINATION DIRECTION ALTERED FOR EVERY PLURALITY OF READOUT OPERATIONS WITH RESPECT TO ONE ORIGINAL

BACKGROUND OF THE INVENTION

1. Field of the Invention

The present invention relates to image forming apparatuses, and more particularly, to an image forming apparatus receiving reflected light from an illuminated original for obtaining image data.

2. Description of the Related Art

Because an apparatus that reads out an original electrically has random noise superimposed on the readout data, only data of low reliability can be obtained with just one readout operation. An apparatus is known that reads out an image of the same original simultaneously by two CCDs, whereby an average of the readout two image data is adapted as the true image data.

If image data obtained by scanning a book or a cut-and-pasted original is directly output as a hard copy, the frame of the book or the edges of the cut-and-pasted original will appear as shadow regions in the image. It is necessary to eliminate image data of such shadow region to obtain a satisfactory image.

A device erasing such shadow region data is well known as follows. Edge data of a shadow region in a specified region is detected and determination is made that all the area between the edge data is a shadow region, whereby that region is completely erased.

In the above-described first conventional case, random noise can be removed to a certain level, but the picture quality of the image is not satisfactory since there is only one light source that illuminates the original.

In the above-described second conventional case, the usability is not satisfactory since it merely detects a shadow region in a specified area.

SUMMARY OF THE INVENTION

An object of the present invention is to improve picture quality of an image in an image forming apparatus.

Another object of the present invention is to improve usability in an image forming apparatus.

A further object of the present invention is to eliminate undesired data from image data in an image forming apparatus.

Still another object of the present invention is to effectively erased undesired data in an image forming apparatus.

For achieving the above objects, an image forming apparatus according to an aspect of the present invention includes a scanning device that carries out a plurality of times with respect to the same original image an operation of illuminating an original and receiving reflected light therefrom to obtain image data, an illumination device which changes the illumination direction towards an original for every plurality of readout operations by the scanning device, and a data generation device which generates new image data according to a plurality of image data obtained by the plurality of readout operations.

An image forming apparatus of the above-described structure has the illumination direction changed for every plurality of readout operations, whereby the picture quality of the image is improved by the generated new image data.

In order to achieve the above objects, an image forming apparatus according to another aspect of the present invention includes a scanning device that carries out a plurality of times with respect to the same original image an operation of illuminating an original and receiving reflected light therefrom to obtain image data, an illumination device which changes the light receiving conditions from an original for every plurality of readout operations by the scanning device, an identification device which identifies unique data that is generated at the time of illuminating the original from a plurality of image data obtained via the light receiving conditions, and an eraser device which erases the identified unique data from the image data.

The image forming apparatus of the above-described structure has the light receiving conditions changed for every plurality of readout operations to identify unique data, whereby efficient image processing is enabled.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
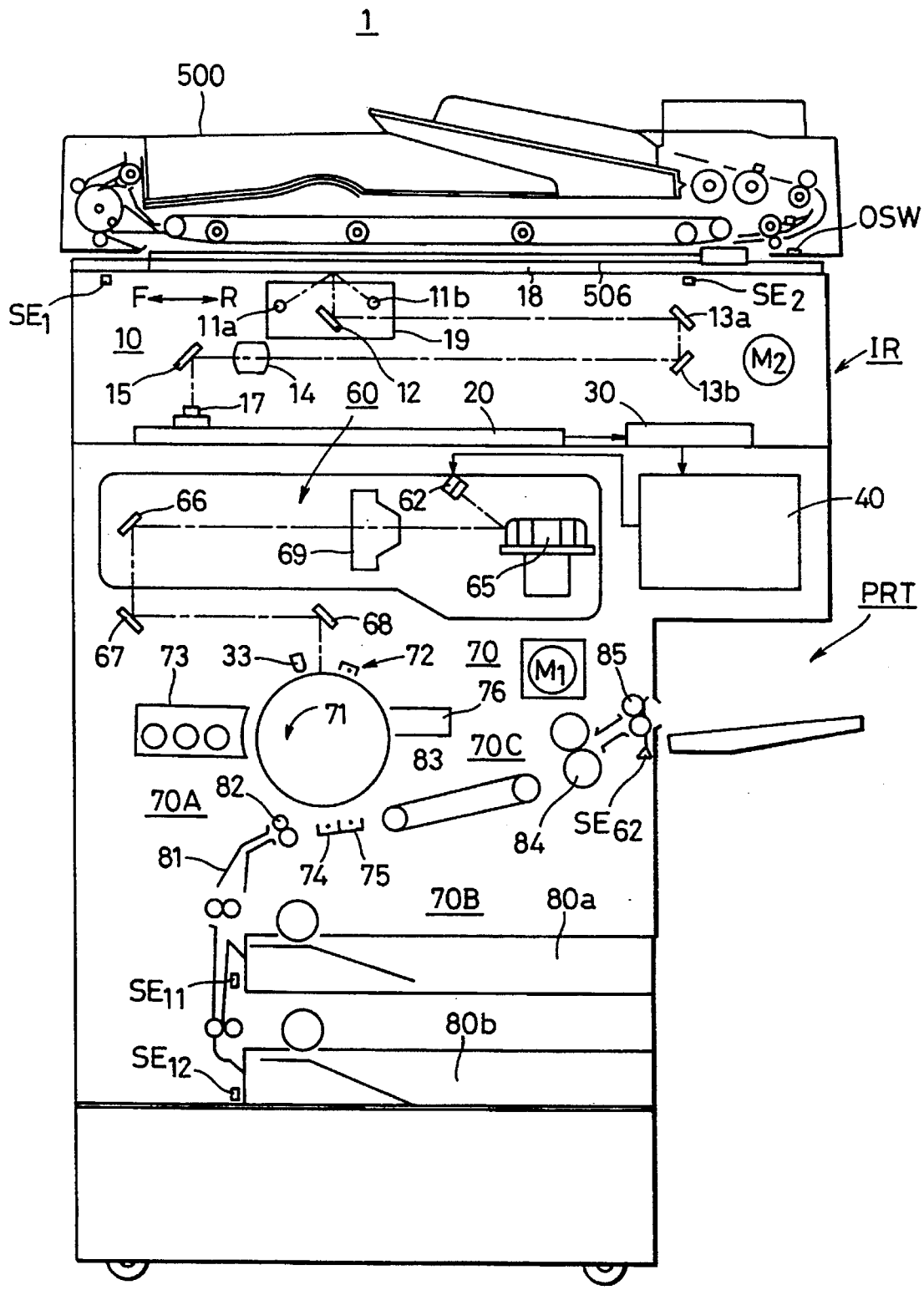
FIG. 1 is a sectional view of a copier according to a first embodiment of the present invention.

FIG. 1 is a sectional plan view showing the structure of a copier according to a first embodiment of the present invention.

Referring to FIG. 1, a copier 1 includes a scanning system 10 for reading an original and converting the same into an image signal, an image signal processing unit 20 for processing an image signal provided from scanning system 10, a memory unit 30 for carrying out switching so as to provide the image data from image signal processing unit 20 directly to a printing unit or to a memory for storage, a printing processing unit 40 for driving a semiconductor laser 62 according to image data from memory unit 30, an optical system 60 for guiding laser light from semiconductor laser 62 to an exposure position on a photoreceptor drum 71, an image forming system 70 for forming an image by developing a latent image obtained by exposure, transferring the same on a reproduction sheet, and fixing the same thereon, an operation panel (not shown) provided at the upper face of the main body, and an original transportation unit 500 for conveying an original and making determination of the front or back side of the original if necessary. Original transportation unit 500 can be opened/closed arbitrarily with respect to the upper face of the platen glass. The opened/closed state thereof is effected by an open-close detection switch OSW.

Scanning system 10 and image signal processing unit 20 form a readout device IR. Printing processing unit 40, optical system 60, and image forming system 70 form a printer device PRT.

Scanning system 10 includes exposure lamps 11a and 11b incorporated in a scanner 19 that moves beneath original platen glass 18, a first mirror 12, a second mirror 13a, a third mirror 13b, a lens 14 for condensing light, a fourth mirror 15, a photoelectric conversion element 17 such as a CCD array, and a scan motor M2.

Image signal processing unit 20 processes an image signal provided from photoelectric conversion element 17, and provides image data to memory unit 30. Memory unit 30 will be described in detail afterwards.

Printing processing unit 40 provides a signal corresponding to an applied image data to semiconductor laser 62.

Optical system 60 includes a polygon mirror 65 for polarizing a laser beam, a main lens 69, and reflecting mirrors 66, 67 and 68.

Image forming system 70 includes a develop-transfer system 70A, a transportation system 70B and a fixing system 70C.

Develop-transfer system 70A includes a photoreceptor drum 71 rotatably driven counterclockwise in FIG. 1. Develop-transfer system 70A further includes a corona charger 72, a developer 73, a transfer charger 74, a separation charger 75, and a cleaning unit 76 disposed in sequence around photoreceptor drum 71 upstream of the rotation direction thereof.

Developer 73 contains a 2-component developing agent of a toner and a carrier.

Transportation system 70B includes cassettes 80a and 80b for accommodating paper sheets, size detection sensors SE11 and SE12 for detecting the size of a sheet, a sheet guide 81, a timing roller 82, and a transport belt 83.

Fixing system 70C includes a fixing roller 84 that applies heat compression on a sheet while transportating the same, a discharge roller 85 and a detection sensor SE62 for detecting discharge of a sheet.

Figure 2:
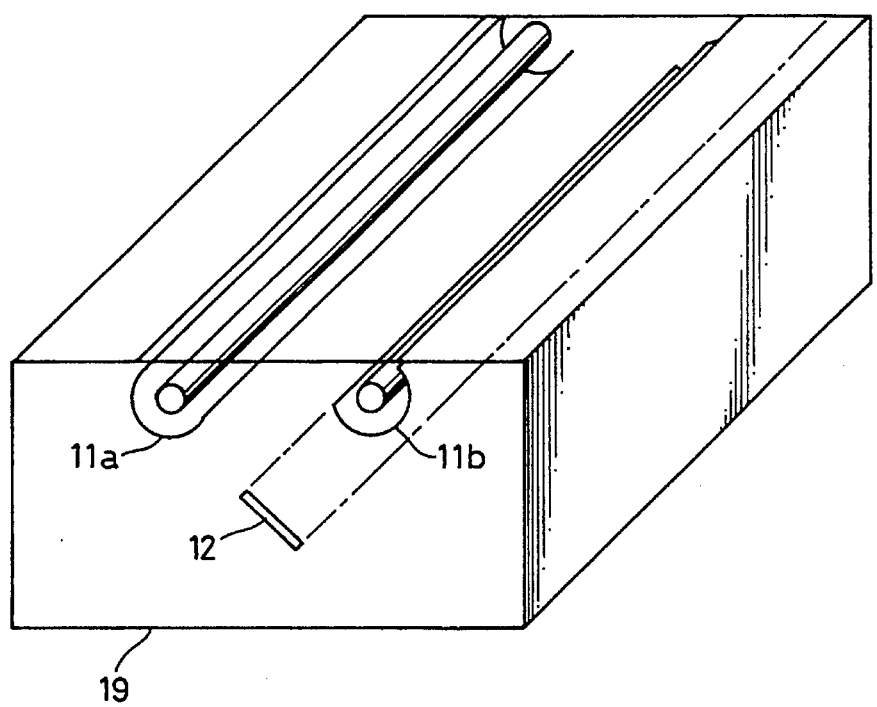
FIG. 2 is a perspective view of the scanner unit in the copier of FIG. 1.
Figure 3:
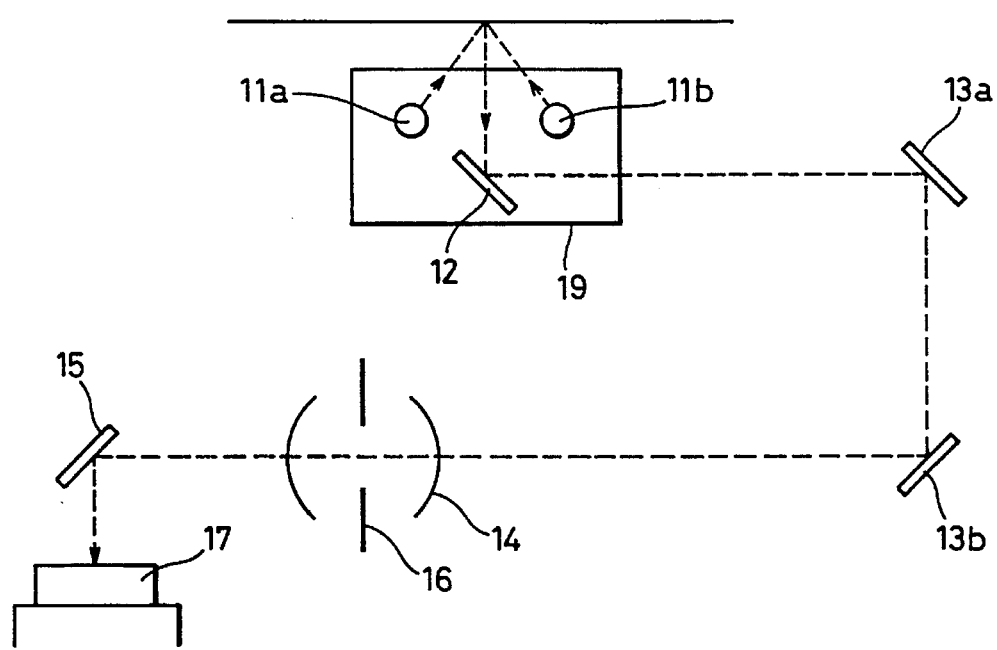
FIG. 3 schematically shows the reflected light path in the scanner unit of FIG. 2.

FIG. 2 is a perspective view showing a structure of scanner 19 of FIG. 1, and FIG. 3 schematically shows the route of reflected light from scanner 19 to photoelectric conversion element 17.

As shown in the figures, scanner 19 includes two light sources 11a and 11b. Each of light sources 11a and 11b is turned on/off independently. If only one of light sources 11a and 11b is turned on, the scanning speed is lowered to cover the decrease in the amount of light that is lower in comparison with the case where both light sources are turned on.

In a normal mode, optical sources 11a and 11b are both turned on. In a shadow processing mode, light source 11a is turned on at the first scanning operation, light source 11b is turned on at the second scanning operation, and both light sources 11a and 11b are turned on at the third scanning operation.

First mirror 12 directs the reflected light from an original towards the optical systems of second mirror 13a and et seq. More specifically, reflected light from first mirror 12 is reflected by first and second mirrors 13a and 13b, which passed through an aperture mechanism 16 provided at condenser lens 14 to be reflected by fourth mirror 15 and provided to photoelectric conversion element 17.

Figure 4:
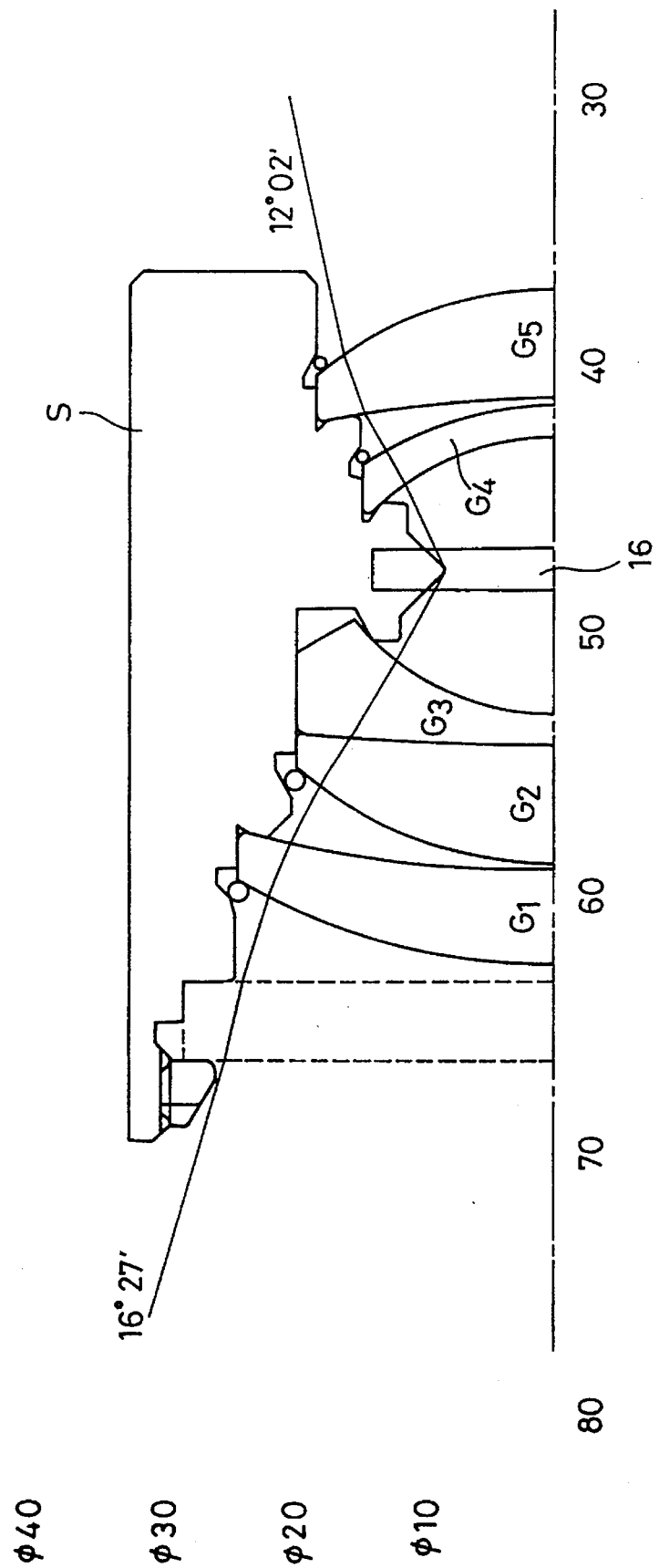
FIG. 4 schematically shows the sectional structure of the condenser lens shown in FIG. 1.

FIG. 4 is a sectional view of the structure of condenser lens 14 shown in FIGS. 1 and 3.

More specifically, condenser lens 14 is formed of 5 lens G1–G5. Each lens is held by a lens holders. Aperture mechanism 16 is held by lens holder S between lens G3 and lens G4.

As this aperture mechanism, an aperture mechanism for controlling exposure of a camera or the like can be used.

Figure 5:
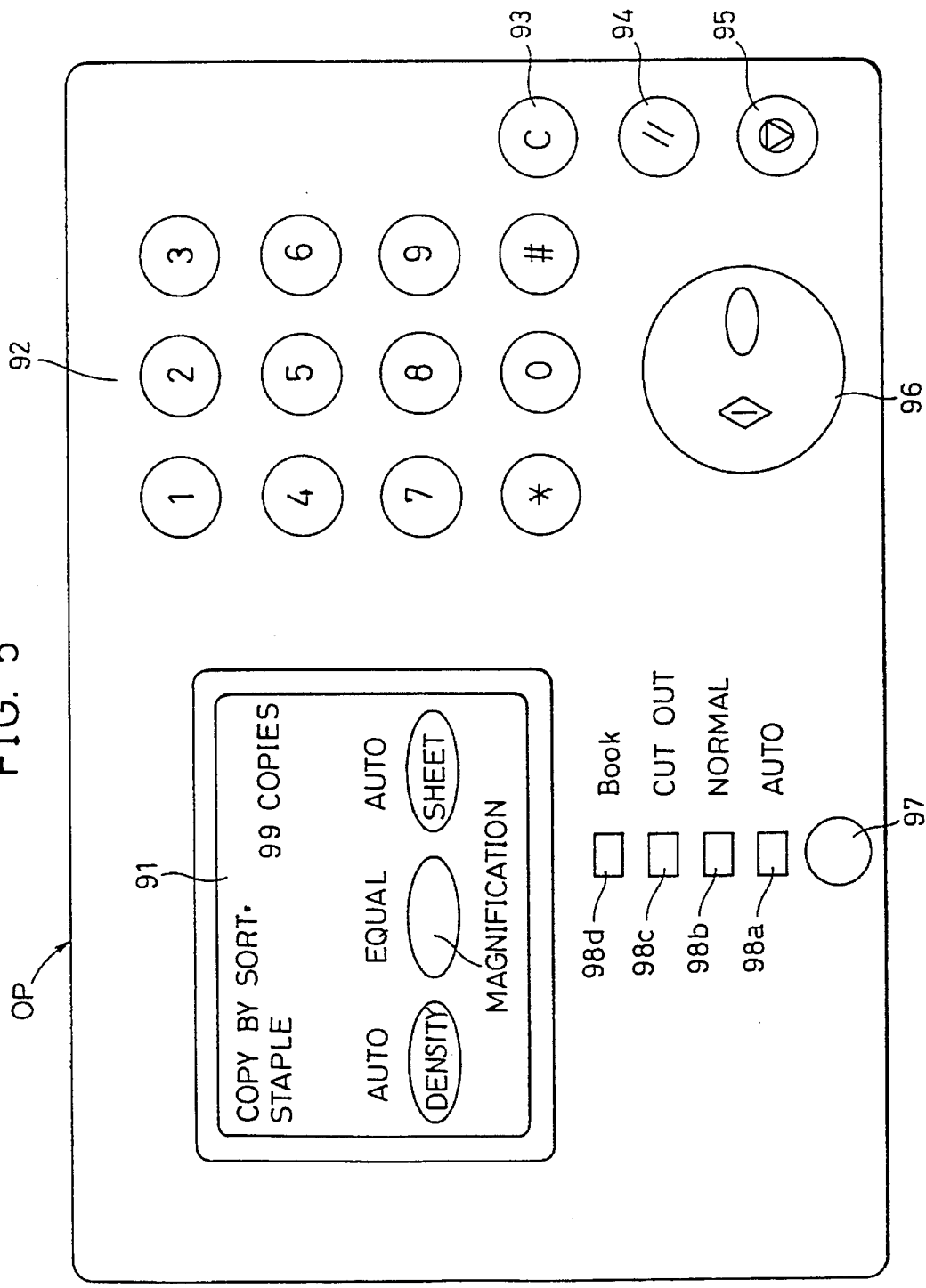
FIG. 5 is a plan view of the operation panel provided at the upper face of the copier of FIG. 1.

FIG. 5 is a plan view of an operation panel provided at the upper face of the main body of the copier of FIG. 1.

Referring to FIG. 5, an operation panel OP includes a liquid crystal touch panel 91, a ten key 92 for entering a ten-key value, a magnification value or the like, a clear key 93 for restoring the ten keys to a standard value of "1", a panel reset key 94 for restoring the set values in copier 1 to standard values, a stop key 95 for interrupting a copy operation, a start key 96 for initiating a copy operation, a mode specification key 97 for specifying a readout mode, and readout mode display units 98a–98d for indicating selection of various readout modes. Display units 98a–98b indicate the specification of a mode for selecting a shadow processing mode process of an automatic mode (controlled by open/closure of ADF), a mode for processing a normal original, a mode for reading out a cut-and-pasted original, and a mode for reading out on original that is a book, i.e. a book original, respectively.

Liquid crystal touch panel 91 displays various states of copier 1 such as jam generation, service man call generation, paper empty generation, operation modes of copier 1 such as the exposure level, magnification, and paper sheet, and other information. Also, input for selection of an operation mode can be carried out.

Figure 6:
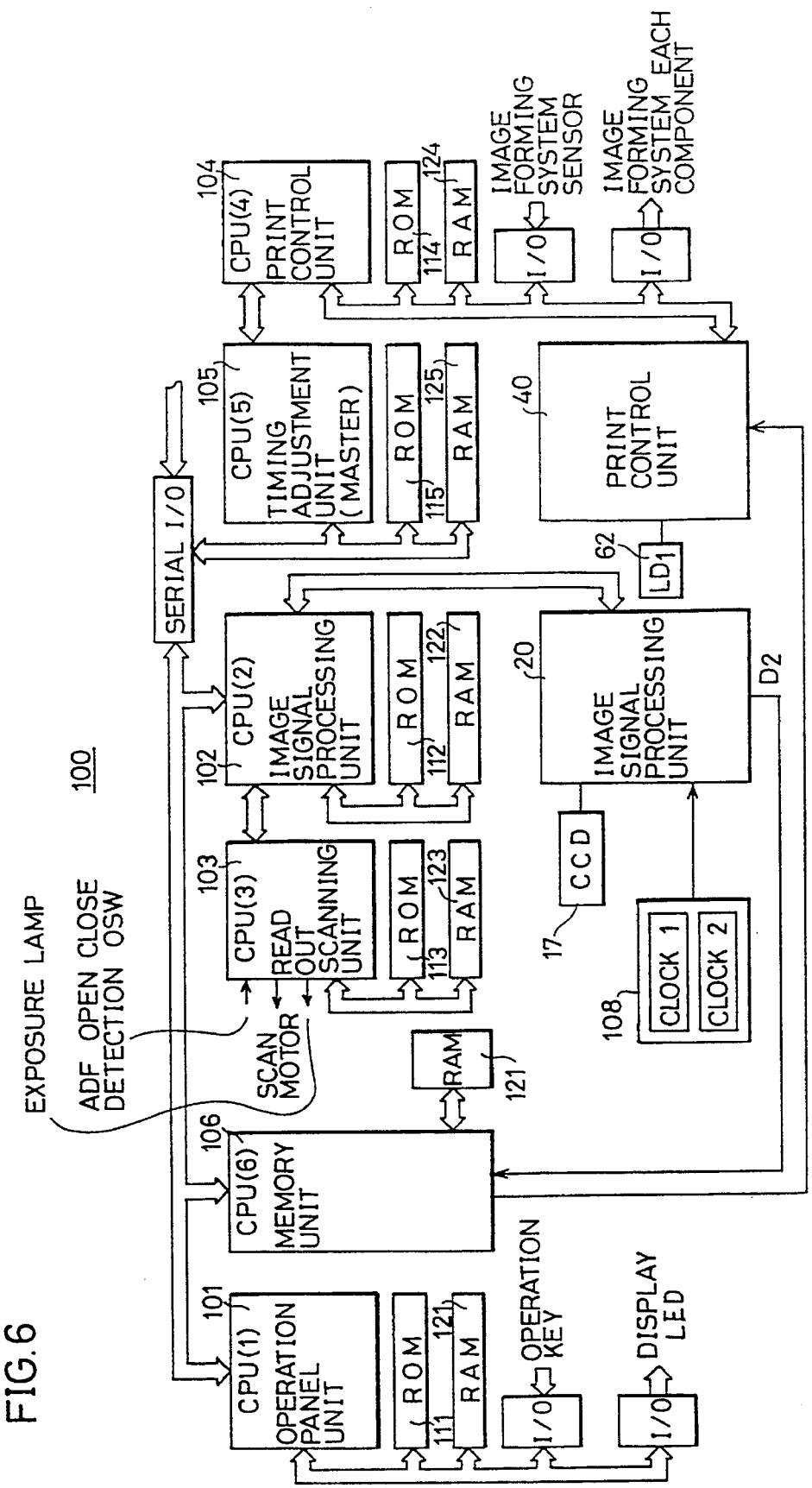
FIG. 6 is a system block diagram showing partially the structure of the control unit of the copier of FIG. 1.
Figure 7:
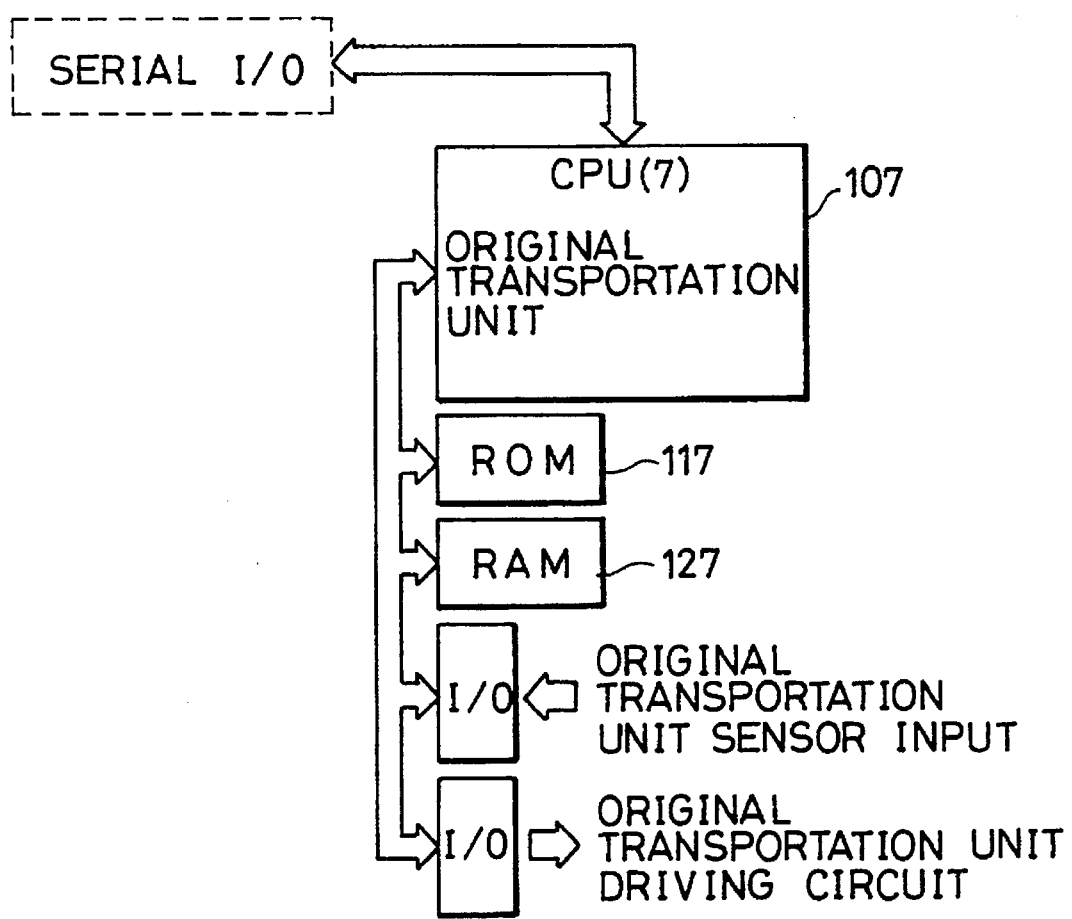
FIG. 7 is a system block diagram showing other portions of the structure of the control unit of the copier of FIG. 1.

FIGS. 6 and 7 are block diagrams showing a structure of a control unit 100 of copier 1 of FIG. 1.

Control unit 100 includes seven CPUs 101–107. Each of CPUs 101–107 includes ROMs 111–117 respectively storing programs, and RAMs 121–127 which are the work areas for program execution. CPU 106 is provided in memory unit 30, and CPU 101 is provided in the operation panel of FIG. 5.

CPU 101 controls the input and display of a signal from each operation key of operation panel OP. CPU 102 controls each component of image signal processing unit 20. CPU 103 controls the drive of scanning system 10. CPU 104 controls printing processing unit 40, optical system 60, and image forming system 70. CPU 105 carries out the overall timing adjustment of control unit 100 and the process for specifying an operation mode. Clock output unit 108 provides a clock modulated according to the aperture diameter of the condenser lens, which is controlled by CPU 102.

CPU 106 controls memory unit 30 to temporarily store readout image data in a memory (not shown), and to read out the same to printing processing unit 40.

CPU 107 controls original transportation unit 500. Serial communication is carried out by interruption between CPUs 101–107, whereby commands, reports, and other data are transmitted and received.

Each processing unit for processing image data will be described hereinafter.

Image signal processor unit 20 includes an A/D converter, a shading correction unit, a magnification processing unit, and a picture quality correction unit.

Image signal processing unit 20 has an image signal applied from photoelectric conversion element 17 quantized into 8-bit image data for each pixel. The 8-bit image data is subject to various processes to be provided as image data D2.

Figure 8:
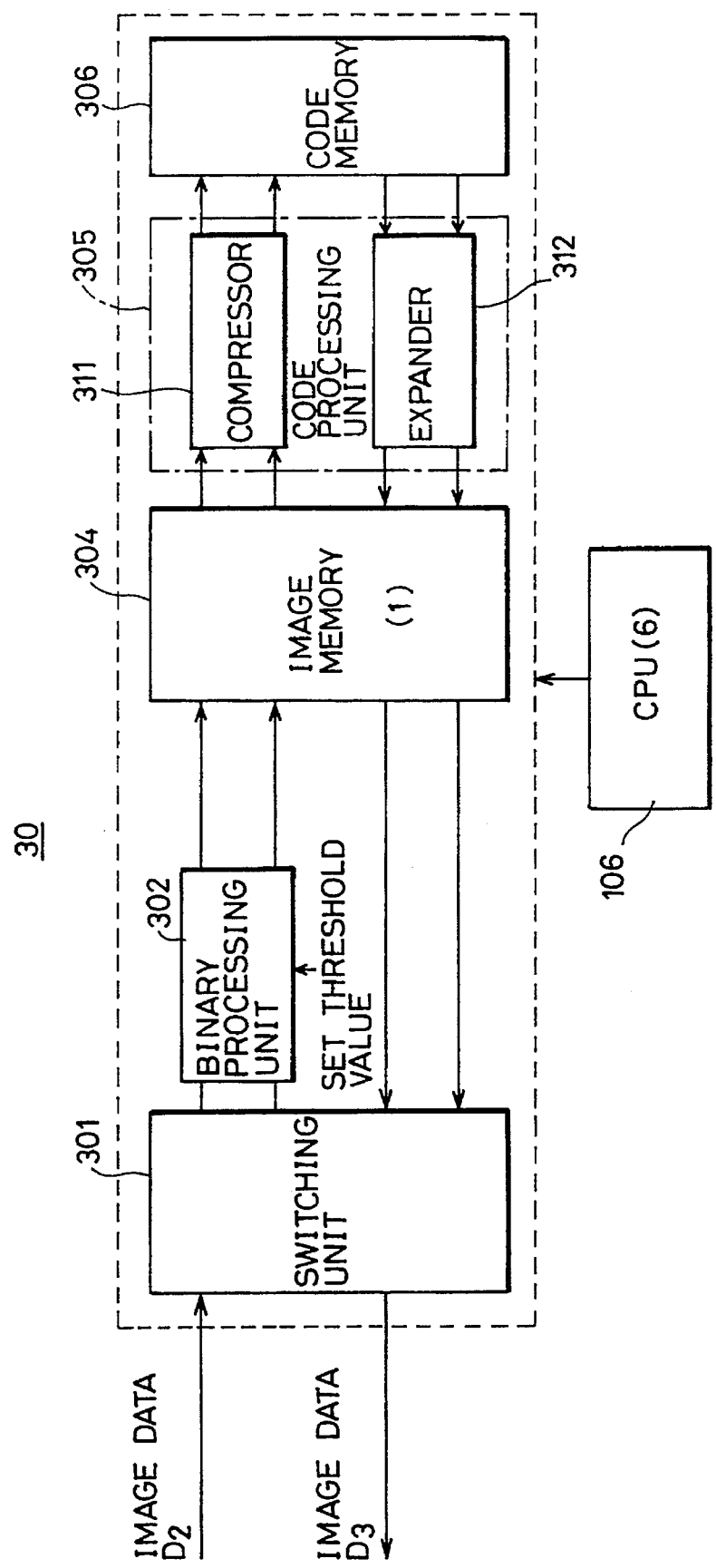
FIG. 8 is a block diagram showing a structure of the memory unit portion of FIG. 6.

FIG. 8 is a block diagram showing a structure of memory unit 30.

Memory unit 30 includes a switching unit 301, a binary processing unit 302 for generating binary threshold data according to specification of a threshold value from CPU 106, a multiport image memory (1) 304, a code processing unit 305 with a compressor 311 and an expander 312 each operable in an independent manner, a code memory 306 with a multiport, and a CPU 106 for carrying out the overall control.

Figure 9:
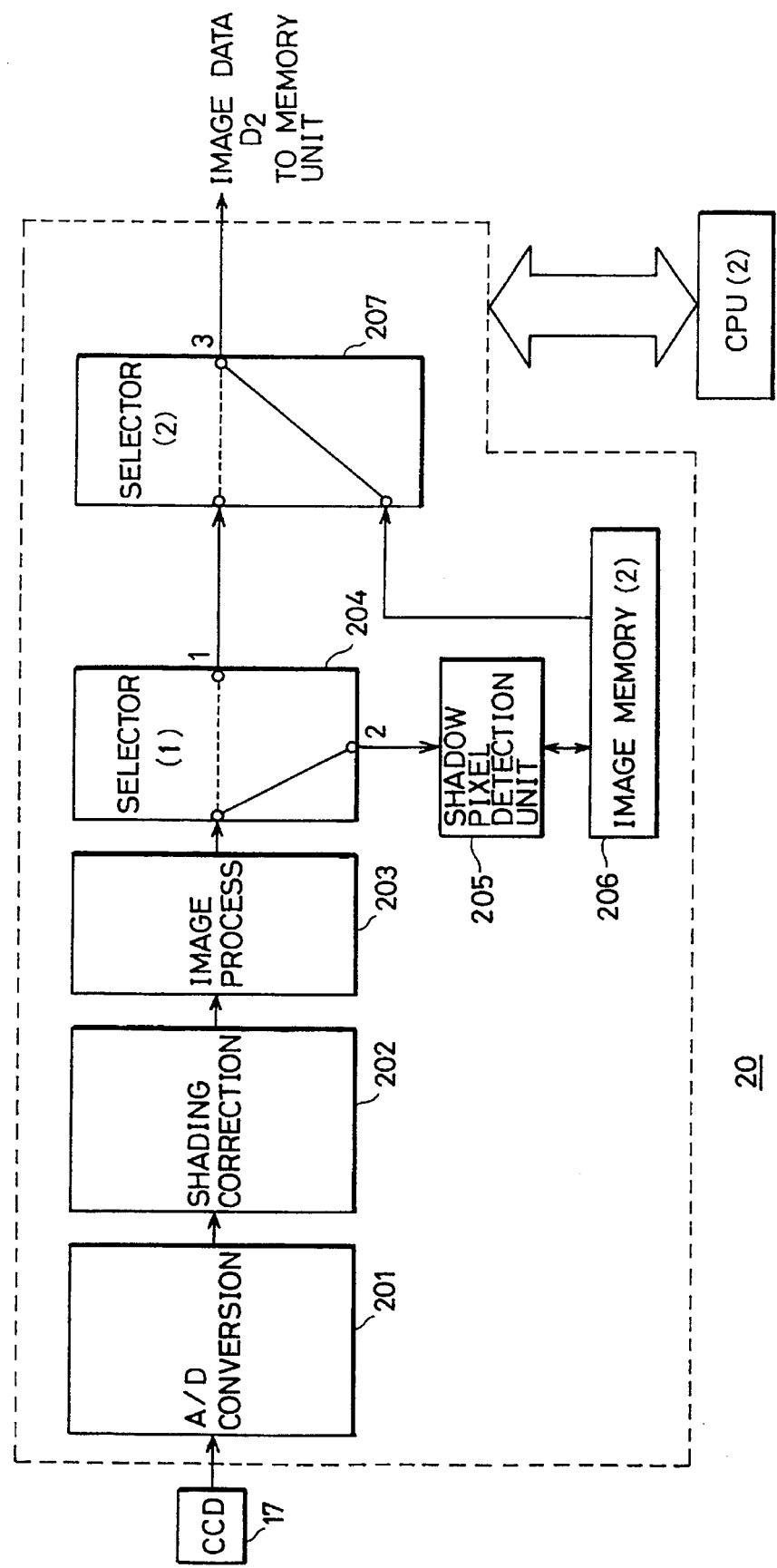
FIG. 9 is a block diagram showing a structure of the image signal processing unit of FIG. 6.

FIG. 9 is a block diagram specifically showing a structure of the image signal processing unit of FIG. 6.

Image data provided from CCD 17 is quantitized into digital data by an A/D converter 201 to have sensitivity unevenness, light distribution or the like corrected by a shading correction unit 202. Various image processing is carried out in image processor unit 203. The output thereof is applied to a selector (1) 204.

Selector (1) 204 is switched-controlled to send input image data to the side of "1" when in normal mode, and to the side of "2" when the specified mode attains a shadow processing mode. A normal mode refers to a mode of scanning a normal original, and a shadow processing mode refers to a processing mode when the original is a cut-and-pasted original or a book.

When a shadow processing mode is specified, the output of selector (1) 204 is set to "2", whereby image data is applied to a shadow pixel detection unit 205. An image memory (2) 206 temporarily stores image data for data transfer between shadow pixel detection unit 205 and a selector (2) 207. Selector (2) 207 is controlled by CPU (2) 102 to switch between the image data directly provided from selector (1) 204 and the shadow-processed image provided from image memory (2) 206.

Figure 10:
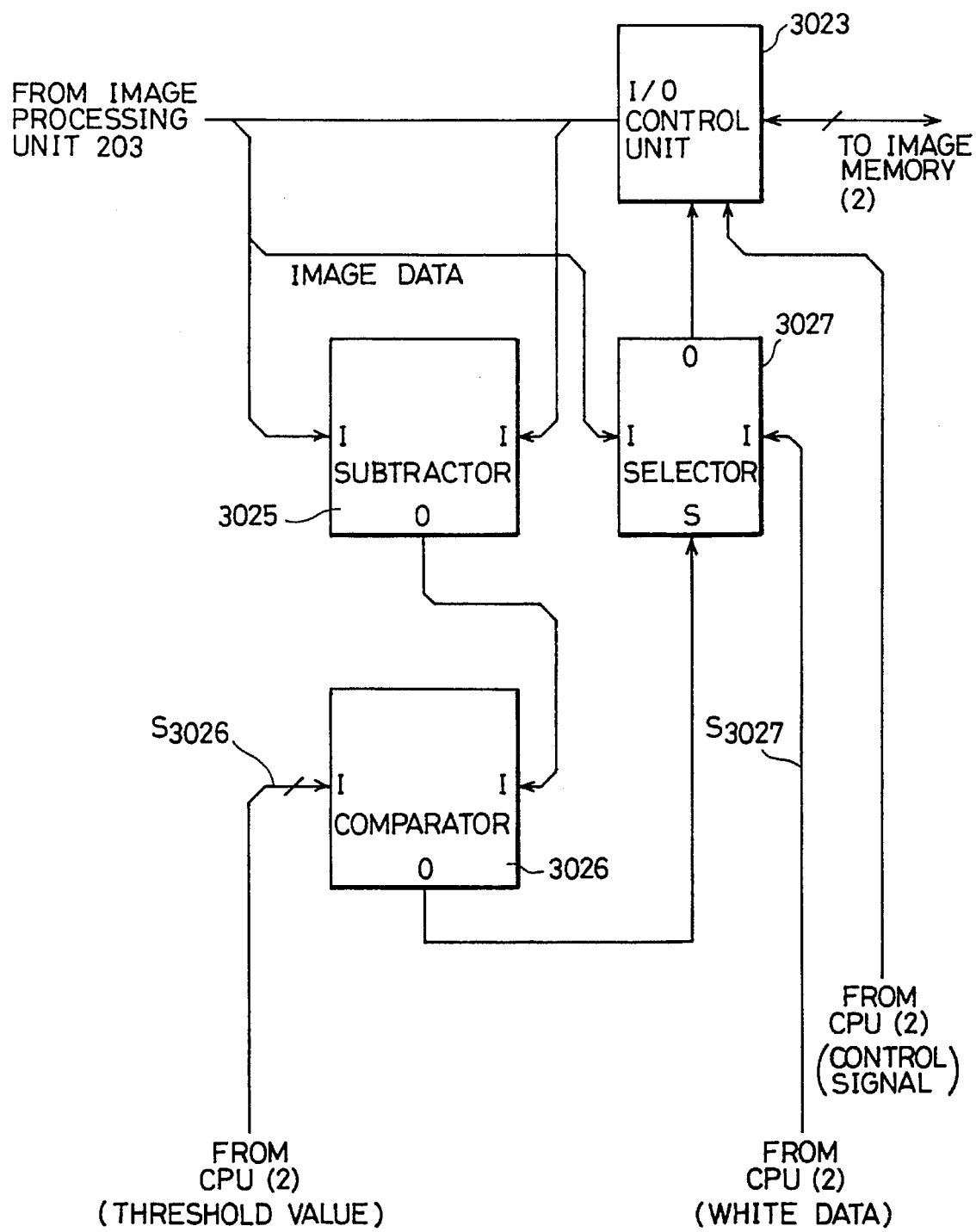
FIG. 10 is a block diagram specifically showing a structure of the shadow pixel detection unit of FIG. 9.

FIG. 10 is a block diagram specifically showing a structure of shadow pixel detection unit 205 of FIG. 9.

Shadow pixel detection unit 205 includes an I/O control unit 3023 for controlling the input/output with image memory (2), and a subtractor 3025 for carrying out subtraction between image data. In a normal mode, CPU (2) specifies I/O control unit 3023 so as to write image data directly to image memory (2) 206.

Figure 11:
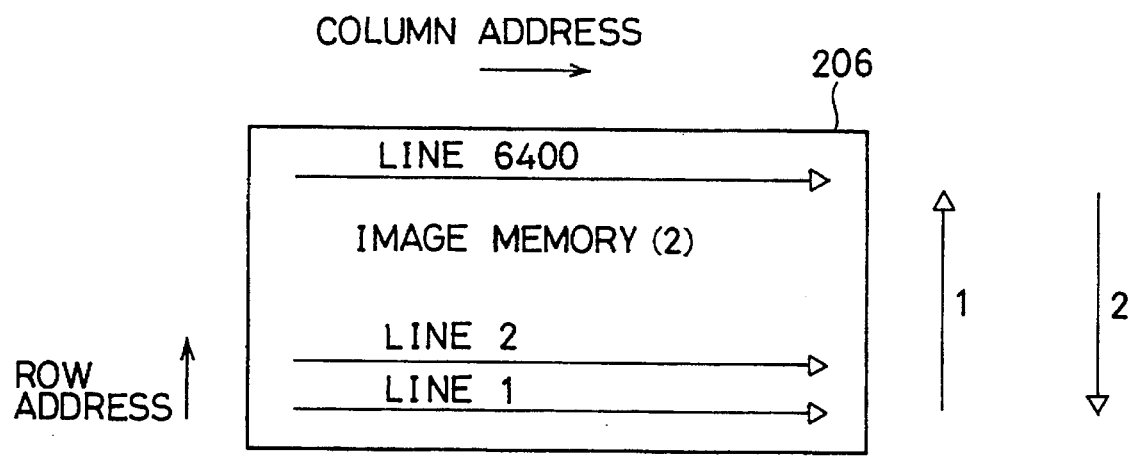
FIG. 11 shows a writing/reading operation of the image memory of FIG. 8.

FIG. 11 shows a structure of image memory (2). Referring to FIG. 11, image memory (2) 206 has a row address corresponding to line 1–line 6400, and a column address corresponding to horizontal pixels for each line. The direction shown by arrow 1 is the direction of writing data into an image memory, and arrow 2 shows the direction of reading out data from an image memory.

When a shadow processing mode is selected, data (1) read out by the first readout operation is sequentially written into the image memory in the direction of arrow 1. In the second readout operation of data (2), I/O control unit 3023 is operated so as to read out data (1) from image memory (2) in the direction of arrow 2 to be provided to subtractor 3025 simultaneous to the readout operation of data (2). Readout data (1) and readout data (2) will have data on the same position of an original subtracted by subtractor 3025 on a pixel basis.

Subtractor 3025 takes each difference of the two image data to provide differential data. A comparator 3026 compares a predetermined data S3026 specified in ROM 112 with the differential data provided from subtractor 3025. The result is provided to a selector 3027. When the output of comparator 3026 indicates that differential data is greater than the predetermined data, selector 3027 operates to provide standard data S3027 to I/O control unit 3023. More specifically, determination is made that a pixel having differential data of a great level (corresponding to a shadow area, for example) is caused by a shadow. That image data is substituted with white wide data for removing the shadow.

If the output of comparator 3026 indicates that the differential data is smaller than predetermined value S3026, the image data is directly provided to I/O control unit 3023. I/O control unit 3023 operates to write the output data from selector 3027 into image memory (2) 206.

According to the above-described process, the original image data portion is directly written into the memory in pixel units. Therefore, the data accuracy is improved. As to portions in which image data changes significantly according to the illumination direction such as in the case of a cut-and-pasted portion, the image data can be substituted with a different fixed data S3027 to erase image data corresponding to a shadow region. The image data to substituted the undesired data is set to white background data or data representing white color.

Figure 12:
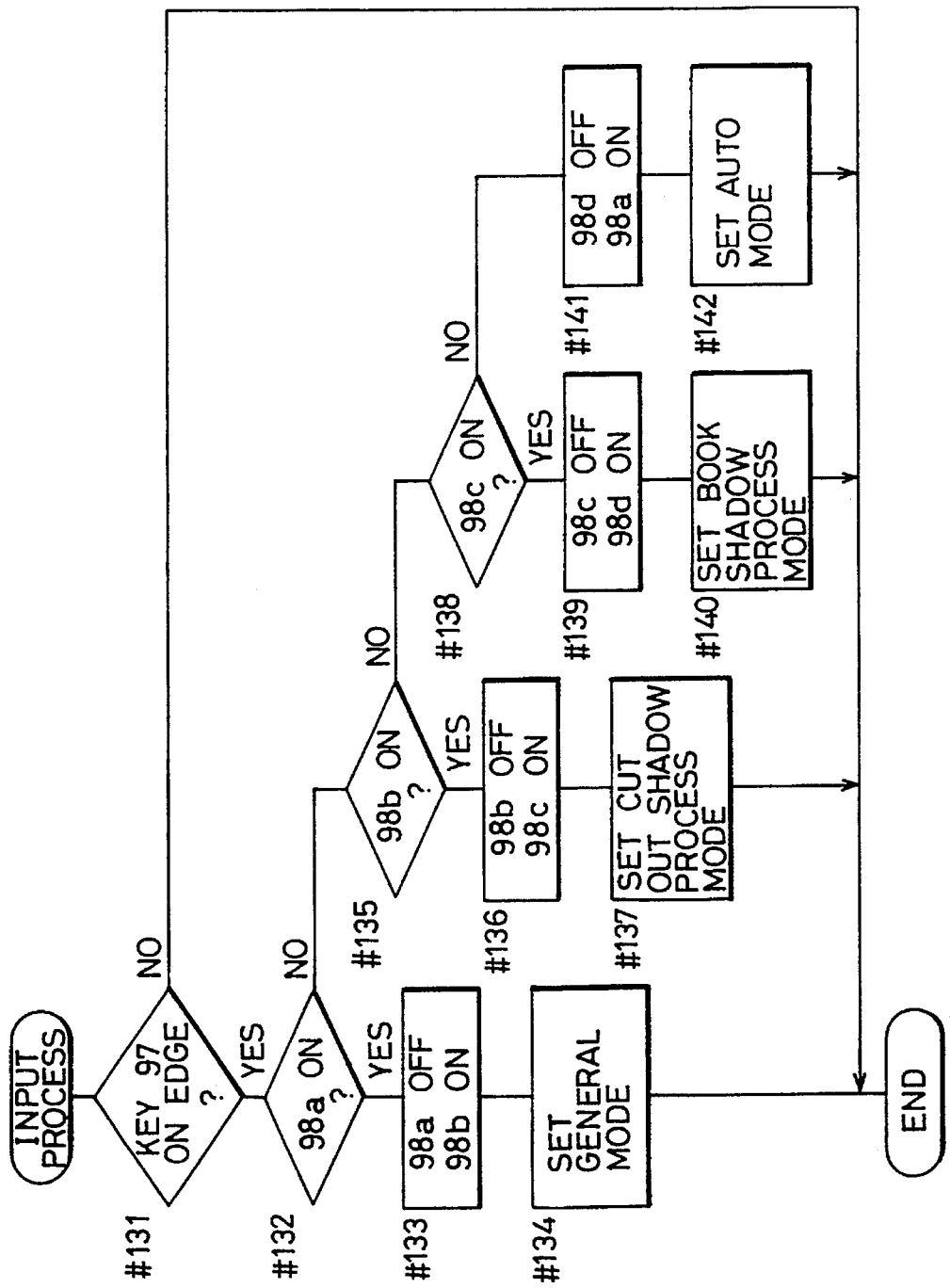
FIG. 12 is a flow chart showing the contents of input processing carried out by the operation panel of the copier of FIG. 1.

FIG. 12 is a flow chart showing the contents of an input processing actuated when mode selection key 97 is depressed on the operation panel of FIG. 5.

When key 97 is depressed at step #131, the LED previously turned on is identified at the respective steps of #132, #135 and #138. The LED of the selected mode is turned off and the LED of the next mode is turned on at the respective steps of #133, #136, #139 and #141.

In steps #134, #137, #140 and #142, the selected mode is set according to the turned on display LED. These processes are carried out by CPU 101. The set mode information is provided to CPU 105.

Figure 13:
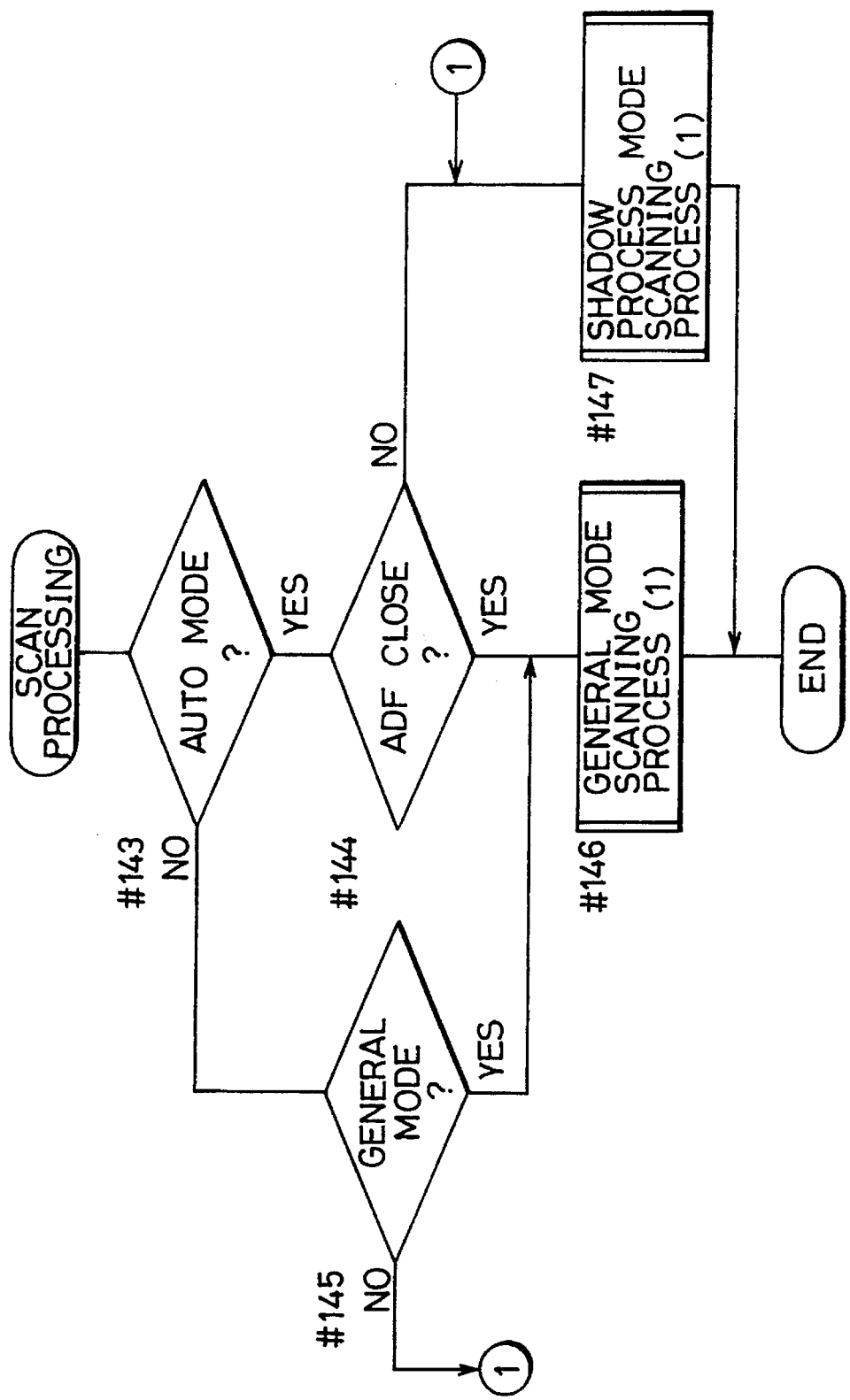
FIG. 13 is a flow chart showing the contents of a scanning process of the copier of FIG. 1.

FIG. 13 is a flow chart of a process actuated when a scanning operation is initiated by depression of a start key 96 on the operation panel of FIG. 5.

At step #143, determination is made whether the mode set in FIG. 12 is an "AUTO" mode or not. If in AUTO mode, determination is made at step #144 whether the original transportation unit (the Automatic Document Feeder: ADF) is opened or closed according to the output of OSW. If ADF is closed, determination is made that the original is not a cut-and-pasted original or a book, but a normal original, whereby normal scanning processing is carried out at step #146.

If determination is made that ADF is open at step #144, the possibility of the original being a book is high, whereby a scanning processing of a shadow processing mode is carried out at step #147. If the mode is not "AUTO" in step #143, determination is made whether a normal mode is set or not at step #145. If not in a normal mode, the flow proceeds to step #147 of a shadow processing mode scanning process (1), otherwise to step #146 of a normal mode scanning process (1).

Figure 14:
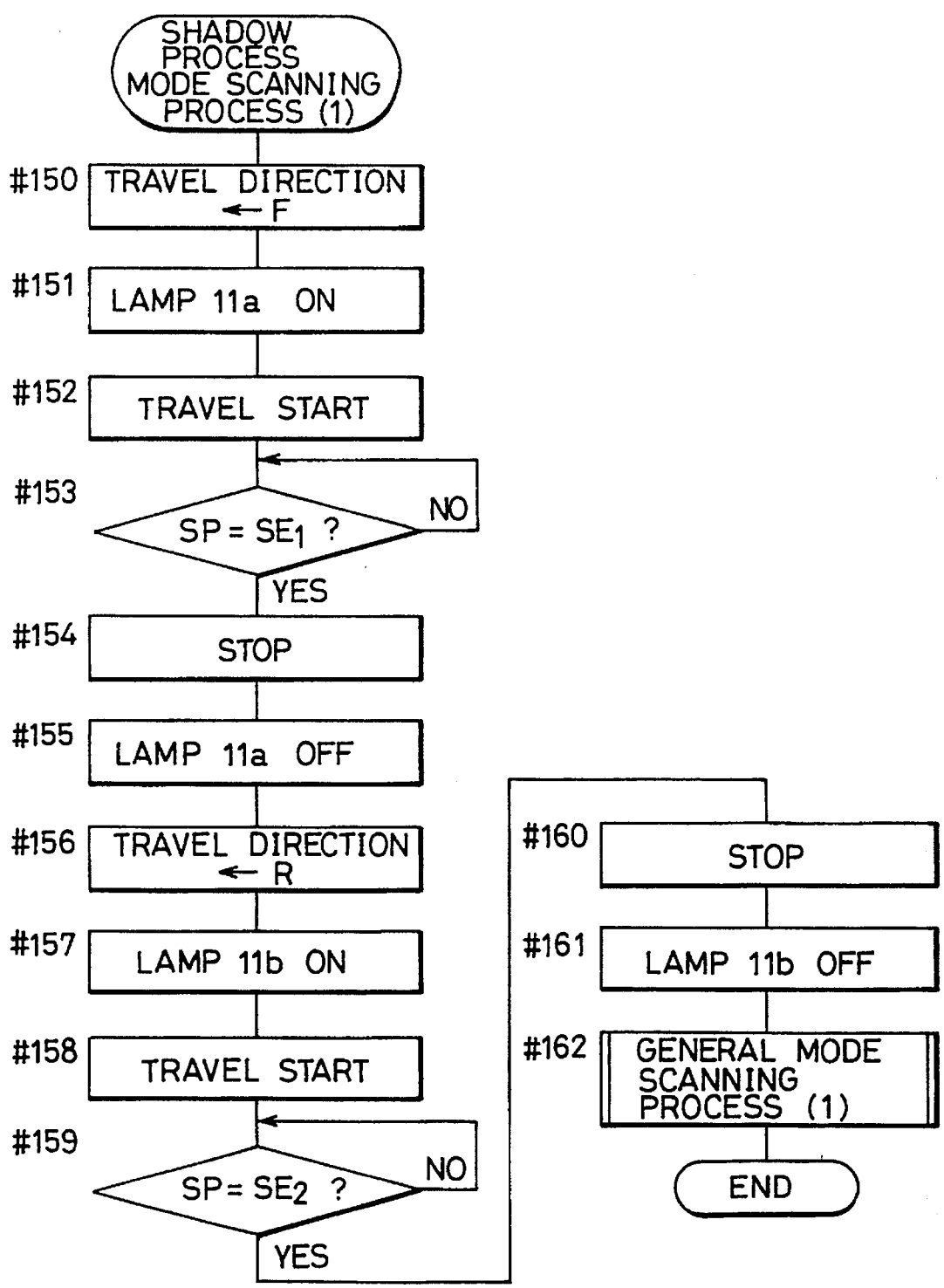
FIG. 14 is a flow chart specifically showing the contents of a shadow processing mode scanning process (1) routine of FIG. 13.

FIG. 14 is a flow chart specifically showing the contents of the shadow processing mode scanning process (1) of FIG. 13.

At step #150, the travel direction of the scanner is set to a forward direction (F) shown in FIG. 1. At step #151, lamp 11a of the scanner is turned on to initiate travel of scanner 19 (#152).

At step #153, determination is made by sensor SE1 provided below the original platen glass whether the scanner has reached the termination end of the front direction. When scanner 19 has arrived at the terminal end of the front direction, the move of scanner 19 is ceased at step #154, and lamp 11a is turned off (#155).

Then, the travel direction of scanner 19 is set to a rear direction (R) as shown in FIG. 1. At step #157, lamp 11b is turned on, and scanner 19 initiates its travel (#158).

At step #159, determination is made by sensor SE2 provided beneath the original platen glass whether scanner 19 has arrived at the terminal end of the rear direction.

When scanner 19 arrives at the terminal end of the rear direction, scanner 19 is stopped (#160), and lamp 11b is turned off (#161). At step #162, a normal mode scanning process (1) is carried out, and this process ends.

Figure 15:
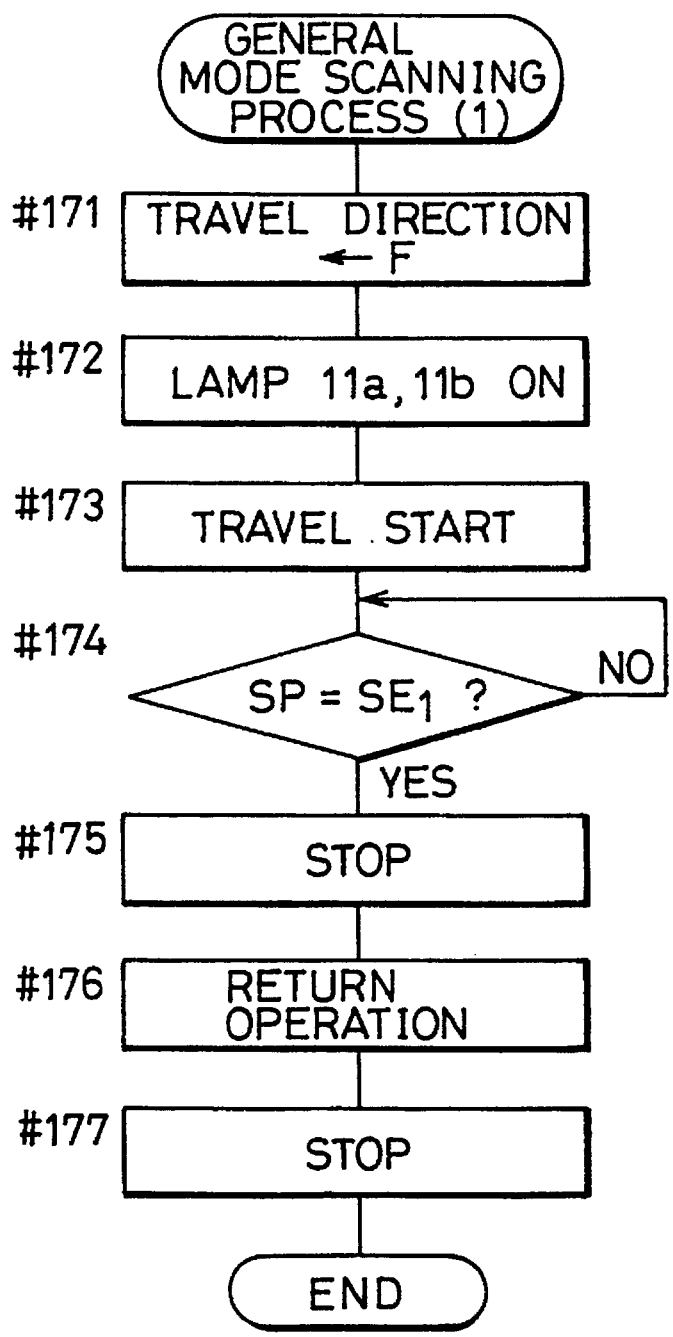
FIG. 15 is a flow chart specifically showing the contents of a general mode scanning process (1) routine of FIG. 14.

FIG. 15 is a flow chart specifically showing the contents of the normal scanning process (1) of FIG. 14.

Entering this process, the travel direction of scanner 19 is set to the F direction in step #171. At step #172, both lamps 11a and 11b are turned on, and scanner 19 initiates its movement (#173). Similarly, when determination is made that scanner 19 has reached the terminal end of the front direction at step #174, scanner 19 is stopped at step #175. At step #176, scanner 19 enters a return operation in the rear (R) direction. Here, both lamps 11a and 11b are not turned on. Scanner 19 stops at a predetermined position, and the flow ends.

Figure 16:
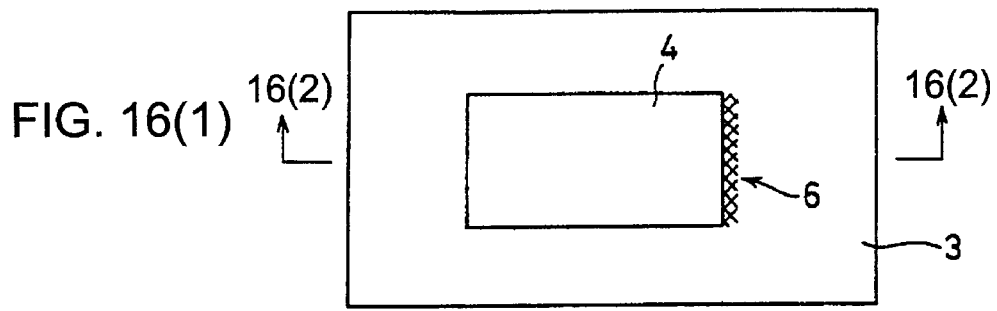
FIG. 16 is a diagram showing generation of a shadow region of an original image for describing a shadow processing mode according to a first embodiment of the present invention.
Figure 16:
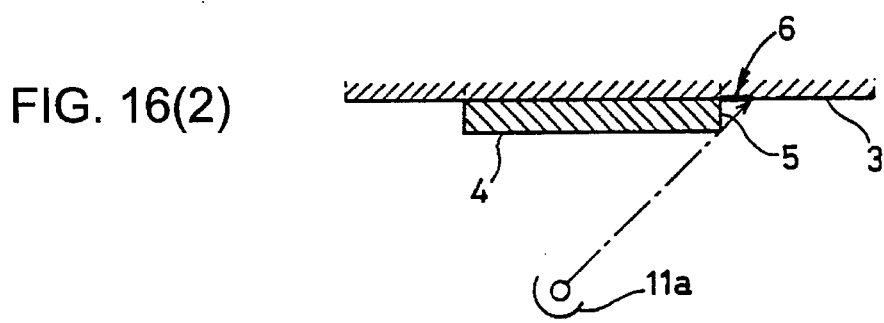

FIG. 16 shows the appearance of a shadow region by a scanning operation in a shadow processing mode according to the first embodiment of FIGS. 14 and 15.

Referring to FIG. 16 (1), a cut out original 4 is pasted at the center portion of an original 3. A step portion 5 is generated by cut out original 4 on the surface of original 3, explicitly shown by FIG. 16 (2) which is a sectional view taken along line A—A. When lamp 11a of scanner 19 illuminates original 3 as in FIG. 16 (2), a shadow 6 is generated at the right side of cut out original 4.

Figure 17:
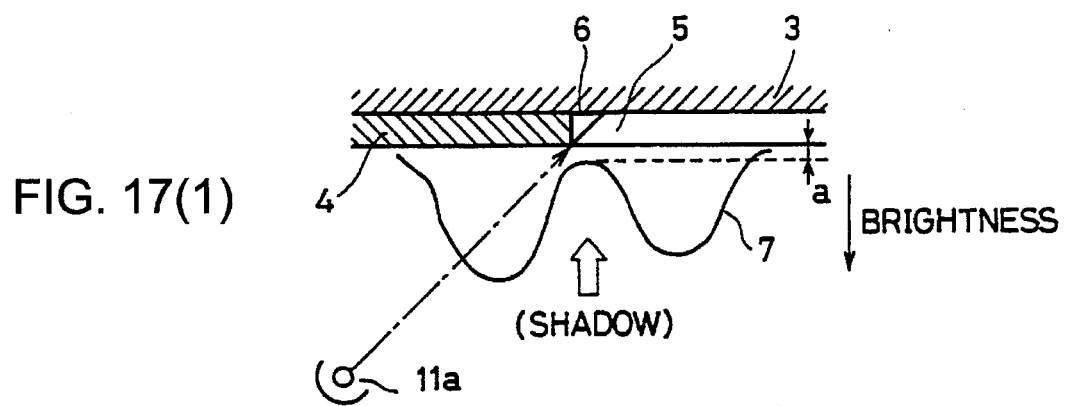
FIG. 17 is a diagram corresponding to FIG. 16 showing the brightness of reflected light from an original image, which differs according to the presence of a shadow region.
Figure 17:
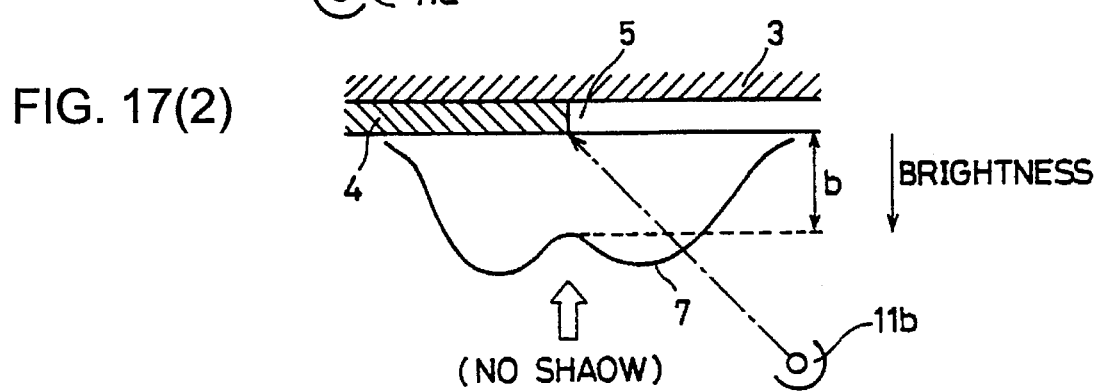

FIG. 17 shows the distribution of brightness of reflected light from the original when illuminated by either lamp 11a or 11b being turned on.

Referring to FIG. 17 (1), the original is illuminated by lamp 11a located at a left lower position with respect to a stepped portion 5 generated by original 3 and cut out original 4. The brightness of the reflected light from the original is decreased to the level of a at the area of shadow region 6.

When the same original is illuminated by lamp 11b located rightwards in a lower position as shown in FIG. 17 (2), the brightness of the reflected light from the original is not affected by stepped portion 5 and indicates the degree of b. Therefore, reflected light of that area shows almost no difference from the peripheral reflected light. Thus, determination can be made whether shadow 6 is caused by a cut out original or not by carrying out a scanning operation two times with each of lamps 11a and 11b turned on.

Figure 18:
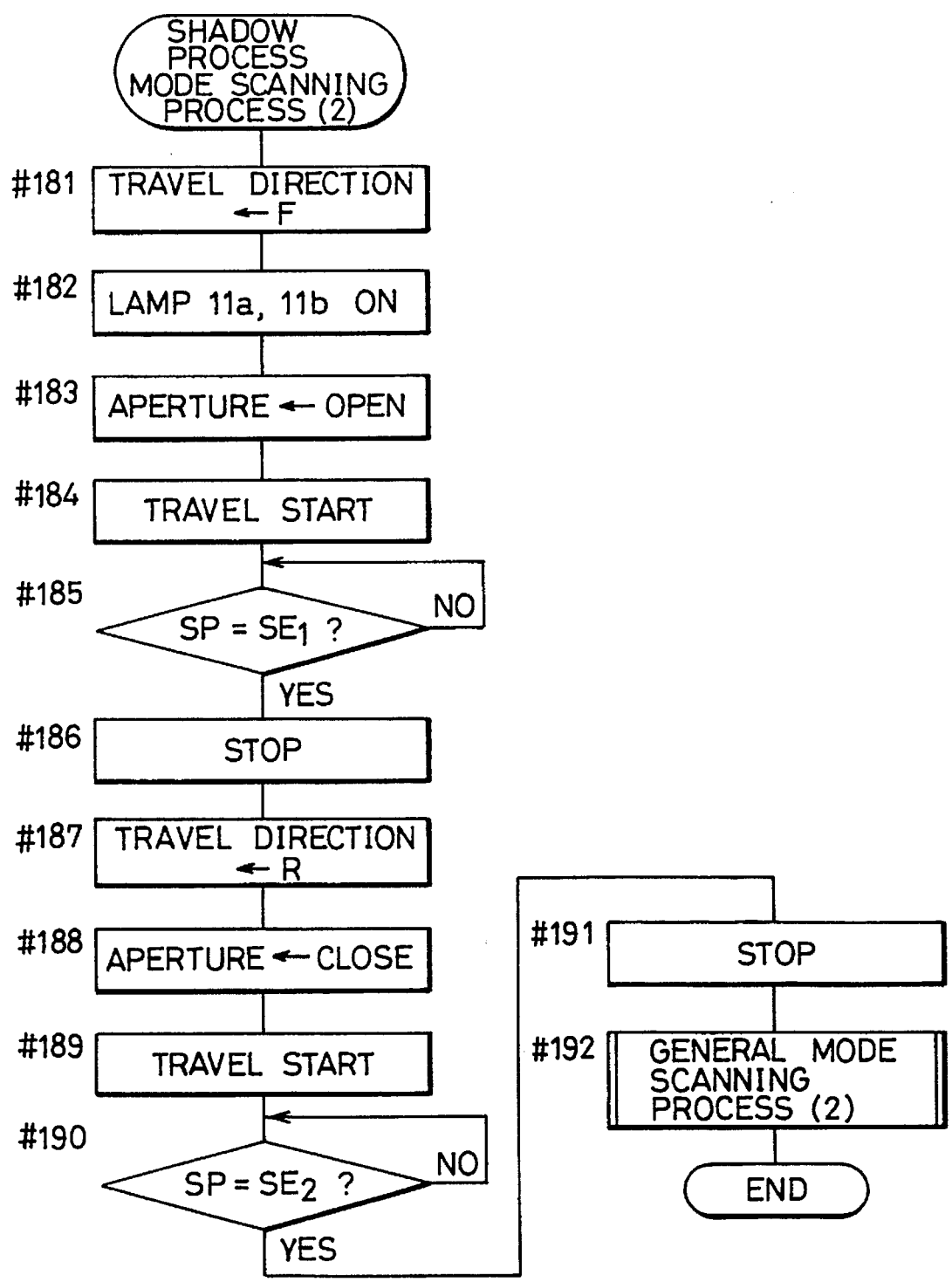
FIG. 18 is a flow chart specifically showing the contents of a shadow processing mode scanning process (2) routine according to a second embodiment of the present invention.

FIG. 18 is a flow chart of a scanning process routine of a shadow process mode according to a second embodiment of the present invention.

At step #181, the travel direction of scanner 19 is set to the front (F) direction. At step #182, both lamps 11a and 11b are turned on. At step #183, the aperture incorporated in condenser lens 14 is fully opened by the aperture mechanism, and scanner 19 initiates its travel (#184). When determination is made that scanner 19 has come to the end side (#185), scanner 19 is stopped (#186). Then, the travel direction of scanner 19 is set to the rear (R) direction (#187). At step #188, the aperture is adjusted to be stopped down to a predetermined range by the aperture mechanism. At step #189, scanner 19 initiates its travel in the rear direction. When detection is made that scanner 19 has reached its terminal end (#190), scanner 19 stops (#191). At step #192, a normal mode scanning process (2) is executed, and this process ends.

Figure 19:
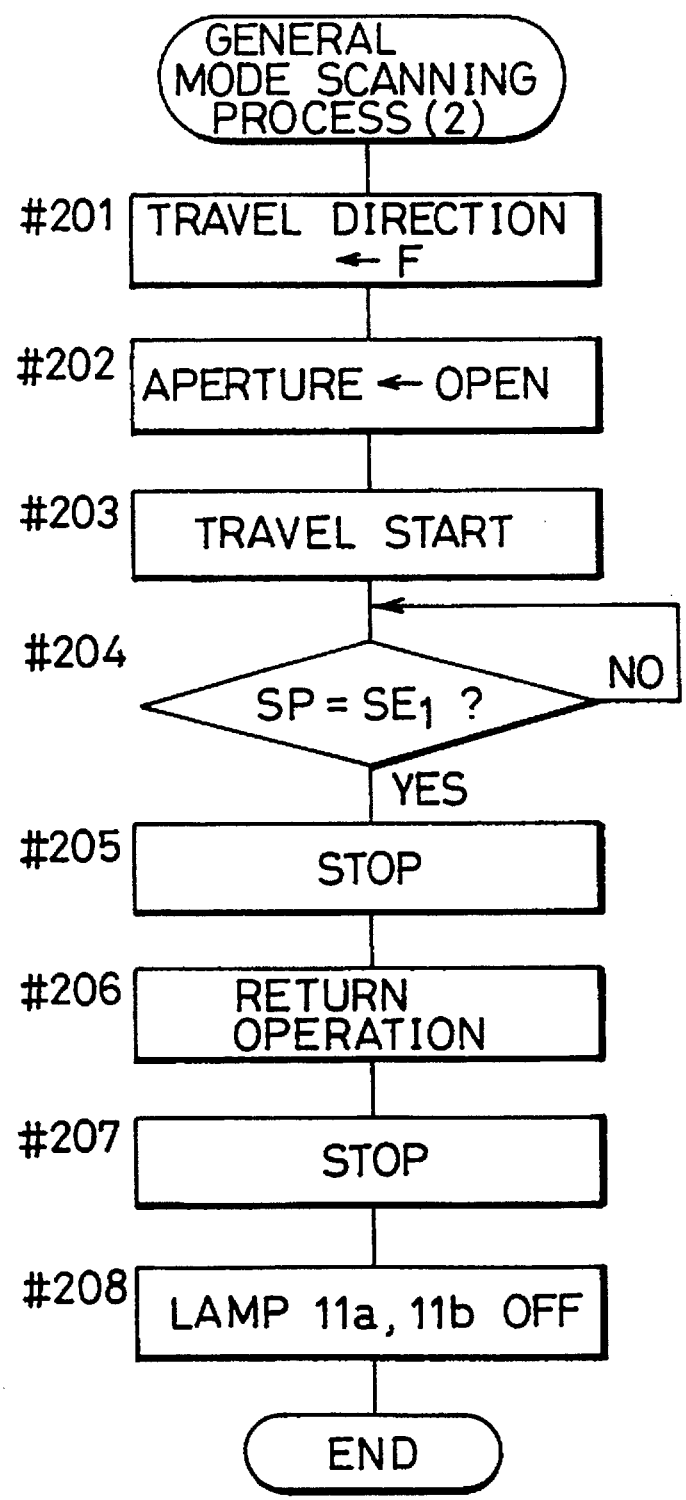
FIG. 19 is a flow chart specifically showing the contents of a normal mode scanning process (2) routine according to the second embodiment of the present invention.

FIG. 19 is a flow chart showing a normal mode scanning process (2) routine of FIG. 18.

At step #201, the travel direction is set to the front (F) direction, and the aperture is completely opened by the aperture mechanism (#202). At step #203, scanner 19 initiates its travel. Upon detection of scanner 19 arriving at the terminal end (#204), the travel of scanner 19 stops (#205). At step #206, scanner 19 enters a return operation. This return operation is stopped when scanner arrives at a predetermined position (#207). Then, both lamps 11a and 11b are turned off (#208), and the process ends.

FIGS. 20–27 correspond to the second embodiment of the present invention shown in FIGS. 18 and 19, They are referred to for describing the change in the amount of received light of the reflected light from the original when an aperture mechanism is employed.

Figure 20:
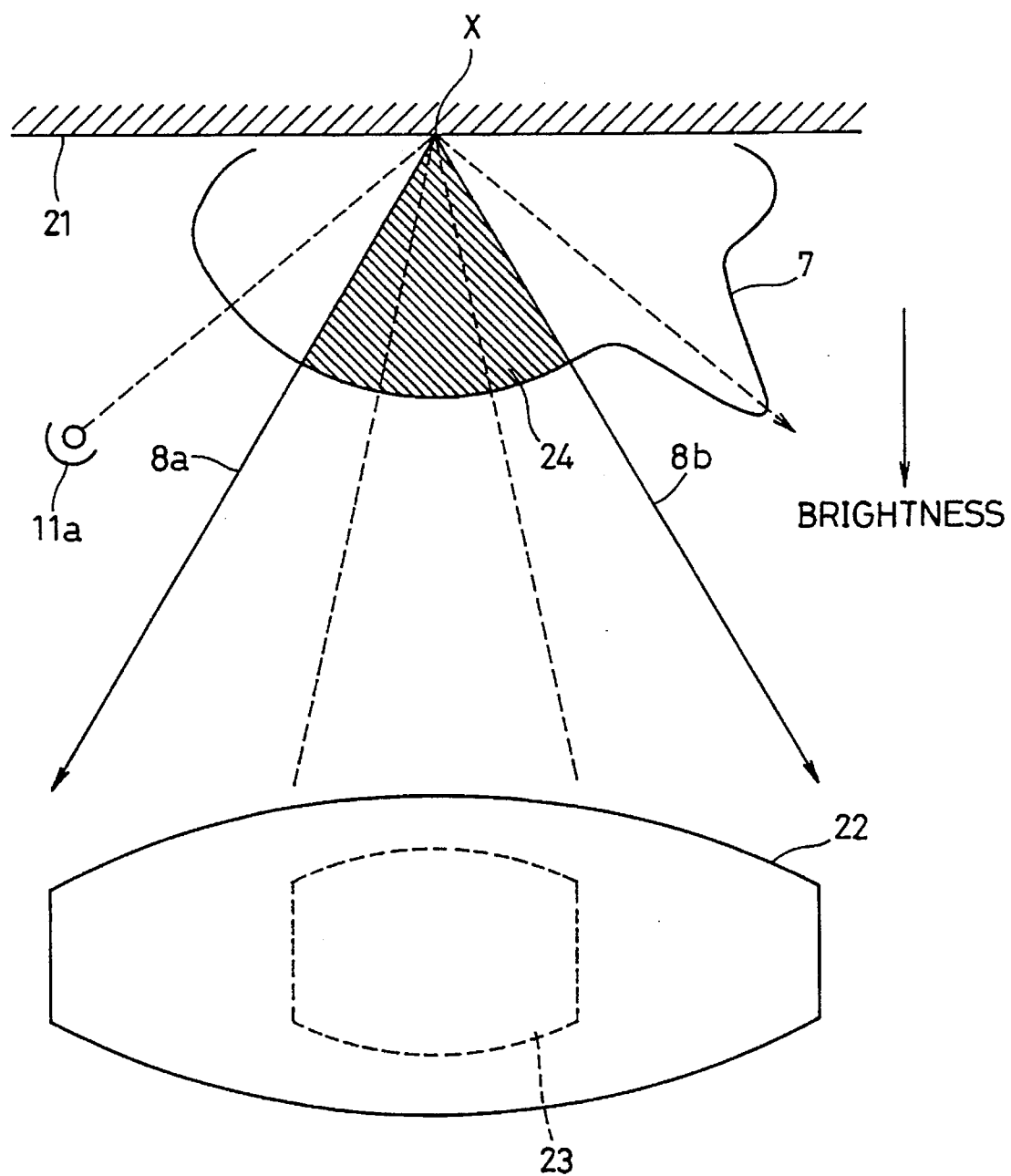
FIG. 20 is a diagram showing the characteristics of the aperture mechanism of a condenser lens according to a third embodiment of the present invention.

FIG. 20 shows the distribution of reflected light when a white original is illuminated by an exposure lamp.

Referring to FIG. 20, brightness distribution of point X at a white original 21 illuminated by lamp 11a is shown. Although lamps 11a and 11b are both turned on in the above flow charts, only lamp 11a is shown for the sake of simplification. The brightness of the reflected light from point X is distributed as shown by a curved line 7. The aperture range is fully opened by the aperture mechanism to show a large aperture range (1) 22 in contrast to an aperture range (2) 23 of a stopped down state indicated by a broken line. The amount of reflected light 24 of the shaded region between reflected light 8a and 8b from point X is received by the photoelectric conversion element.

Figure 21:
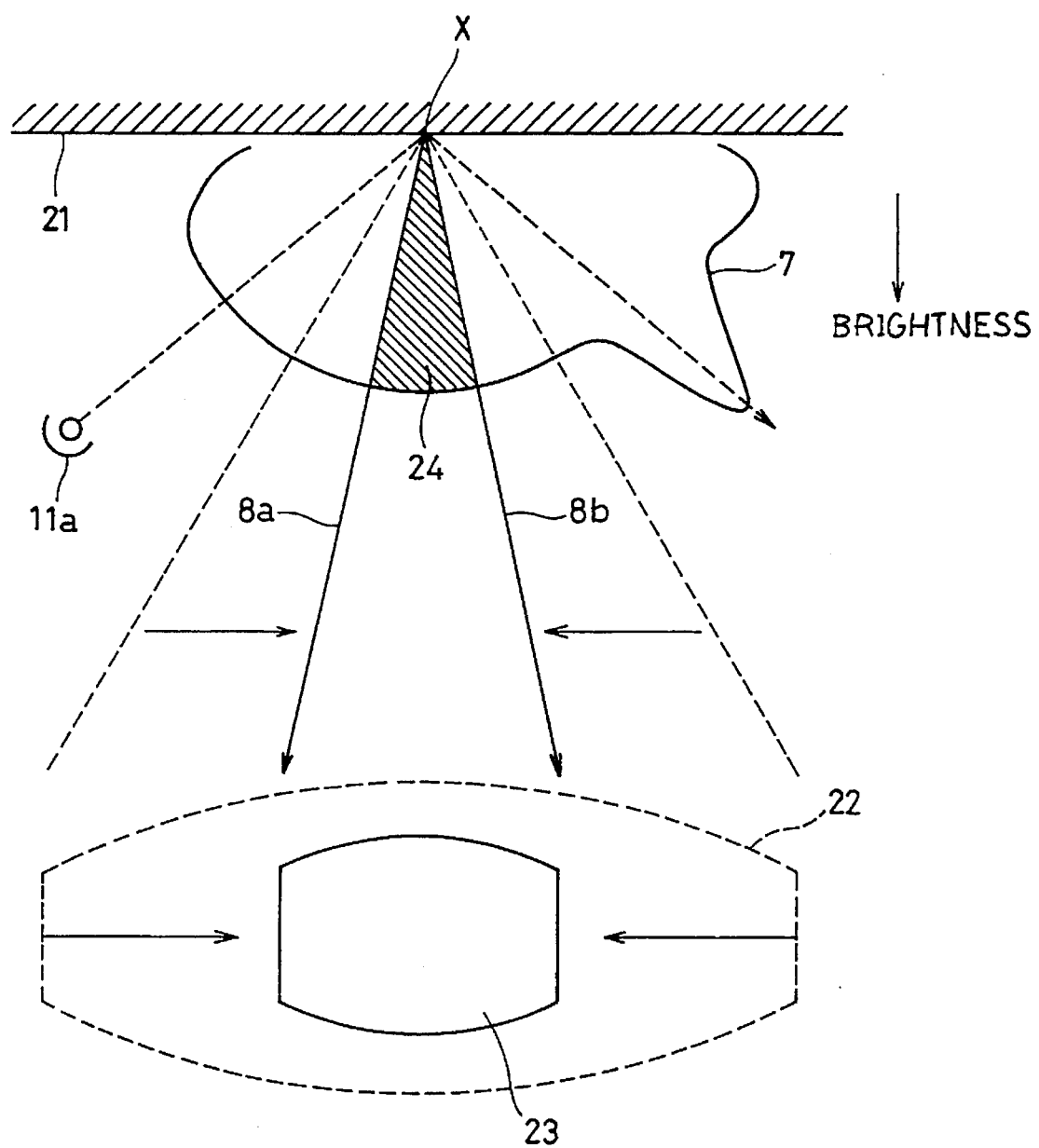
FIG. 21 is a diagram corresponding to FIG. 20, showing the characteristics of the amount of received light when the aperture is stopped down by the aperture mechanism.

FIG. 21 corresponds to FIG. 20, showing the aperture adjusted from the stop down range (1) 22 to the stop down range (2) (23). Corresponding to the stop down range (2) 23, reflected light 8a and reflected light 8b from point X is gathered towards the center portion. Therefore, the shaded area of the received amount of reflected light 24 is smaller than that of FIG. 20 in which the aperture is fully opened according to the stopped down level. Although only exposure lamp 11a is illustrated in FIGS. 20 and 21, the relationship of the amount of received light with respect to the stop down degree is similar to the change shown in FIGS. 20 and 21 when the other exposure lamp 11d is also turned on to obtain a sufficient amount of received light.

Figure 22:
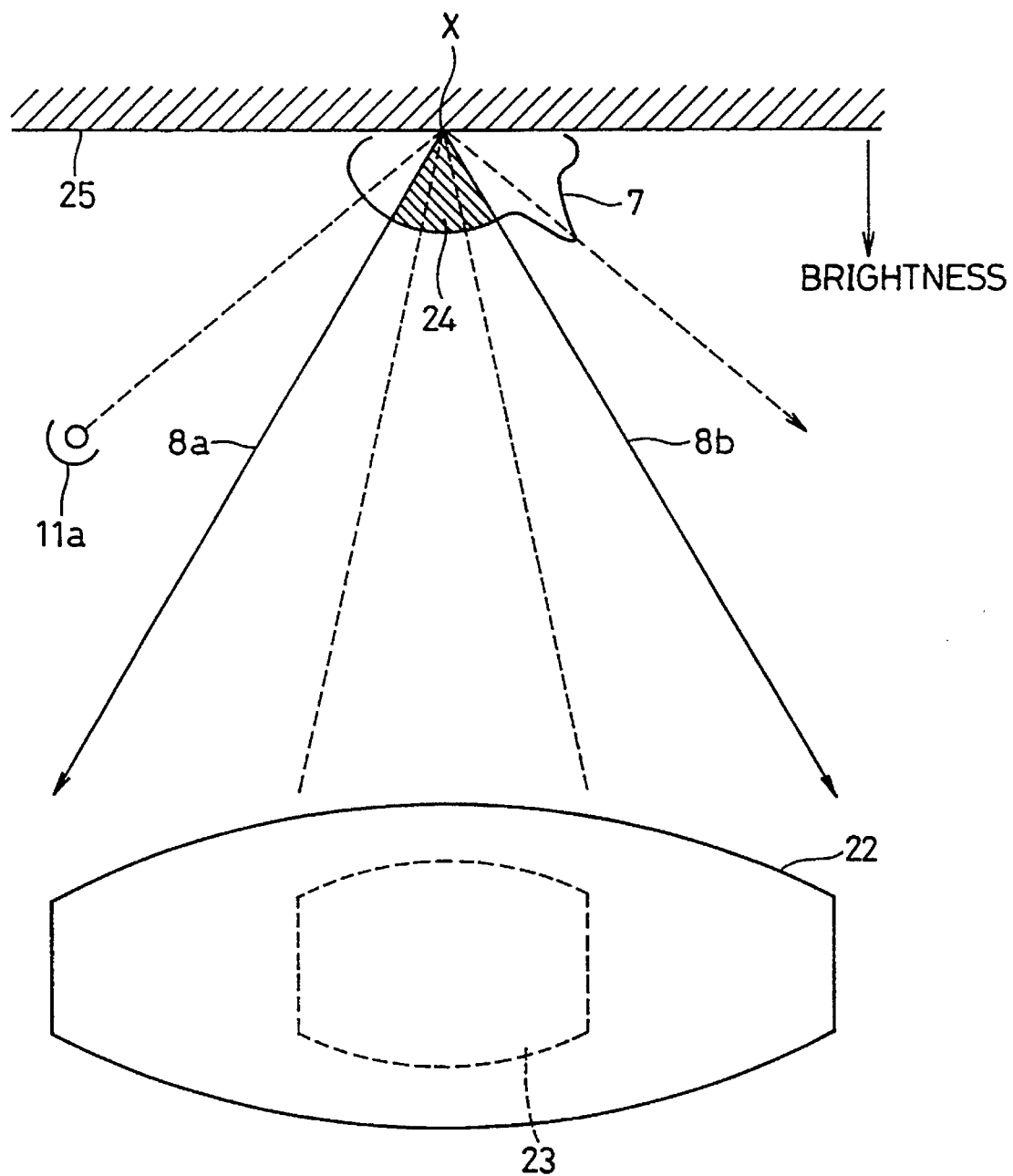
FIG. 22 is a diagram showing the characteristics of the aperture mechanism of the condenser lens according to the third embodiment of the present invention when the readout original is a black sheet.

FIG. 22 corresponds to FIG. 20, and shows the state where the original is black instead of the white original of the preceding embodiment.

When a black original 25 is irradiated with exposure lamp 11a, curve 7 indicating the brightness of reflected light from point X shows an extremely small distribution in comparison with that of FIG. 20 due to its great light absorption. The amount of light 24 received by photoelectric conversion element 17 is indicated by the hatched region.

Figure 23:
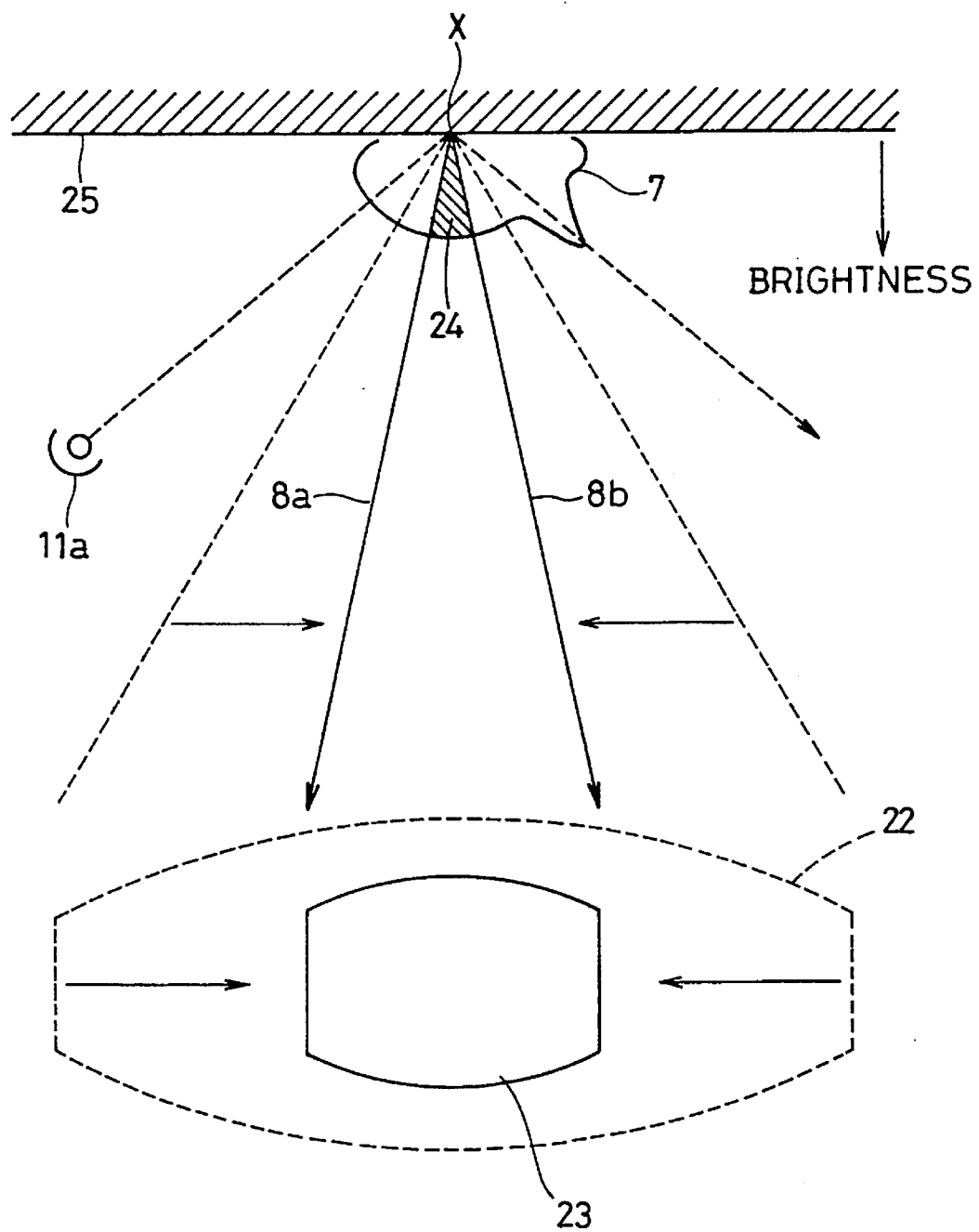
FIG. 23 is a diagram corresponding to FIG. 22, showing the characteristics of the amount of received light when the aperture is stopped down by the aperture mechanism.

FIG. 23 corresponds to FIG. 22, showing the case where the aperture is adjusted from the stop down range of (1) 22 to the stop down range of (2) 23 by the aperture mechanism. The amount of received light 24 varies according to the amount of the adjusted level of the aperture by the aperture mechanism.

Figure 24:
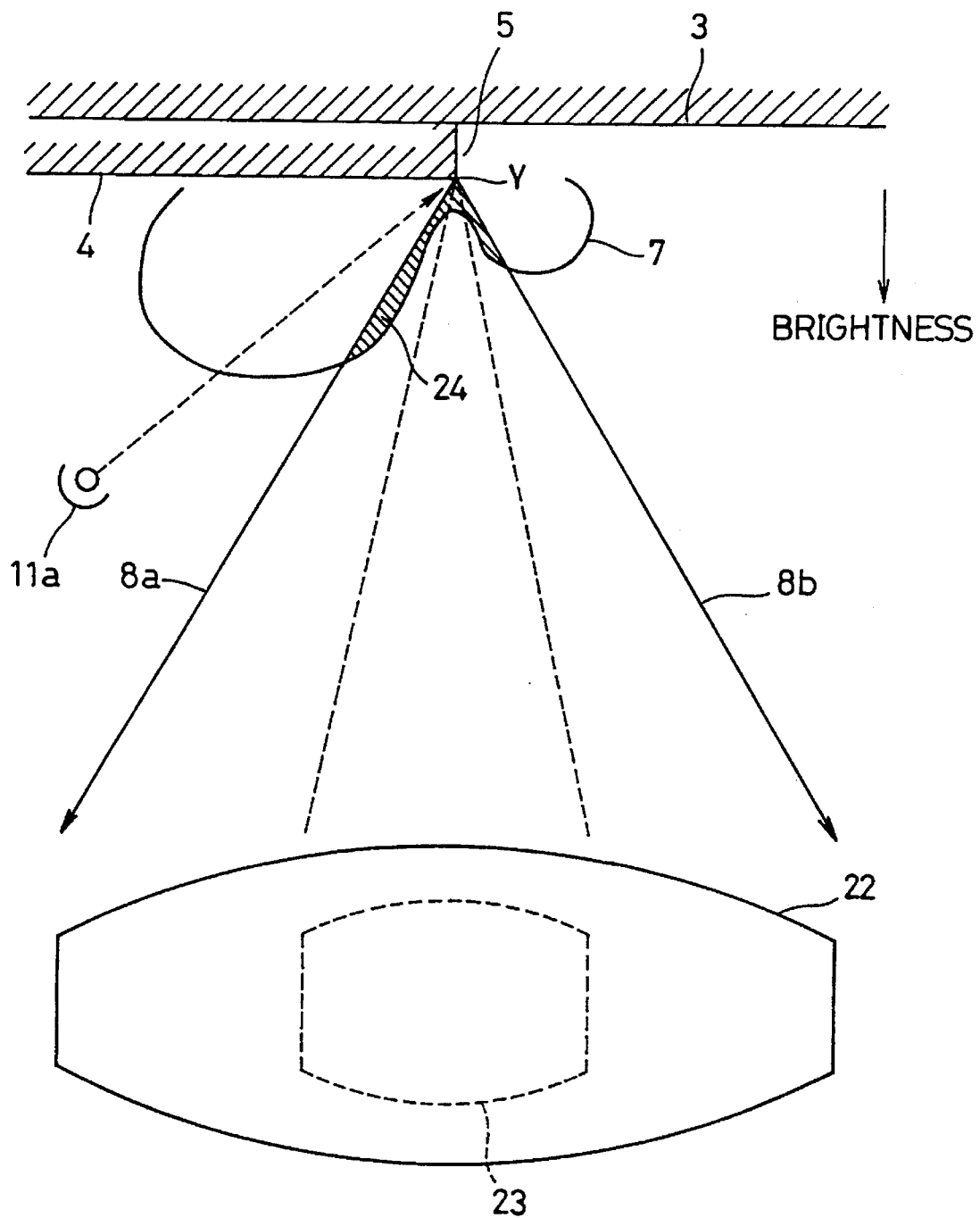
FIG. 24 is a diagram showing the characteristics of the amount of received light with respect to light reflected from a cut-and-pasted original when the aperture is fully opened by the aperture mechanism according to the third embodiment of the present invention.

FIG. 24 shows the change in the amount of received light using the aperture mechanism when the original is a cut out original.

Exposure lamp 11a is directed to point Y at the bottom edge of step portion 5 generated by original 3 and cut out original 4. The brightness of the light reflected from point Y shows a distribution of a brightness curve 7. In comparison with the brightness curves 7 shown in FIGS. 20 and 22, the brightness curve of FIG. 24 shows a distribution in which the brightness below point Y is extremely reduced by the presence of step portion 5. The stop down range (1) 22 by the aperture mechanism is fully opened as shown therein. Therefore, the reflected light from point Y received by photoelectric conversion element 17 corresponds to the amount of received light 24 indicated by the slanted line.

Figure 25:
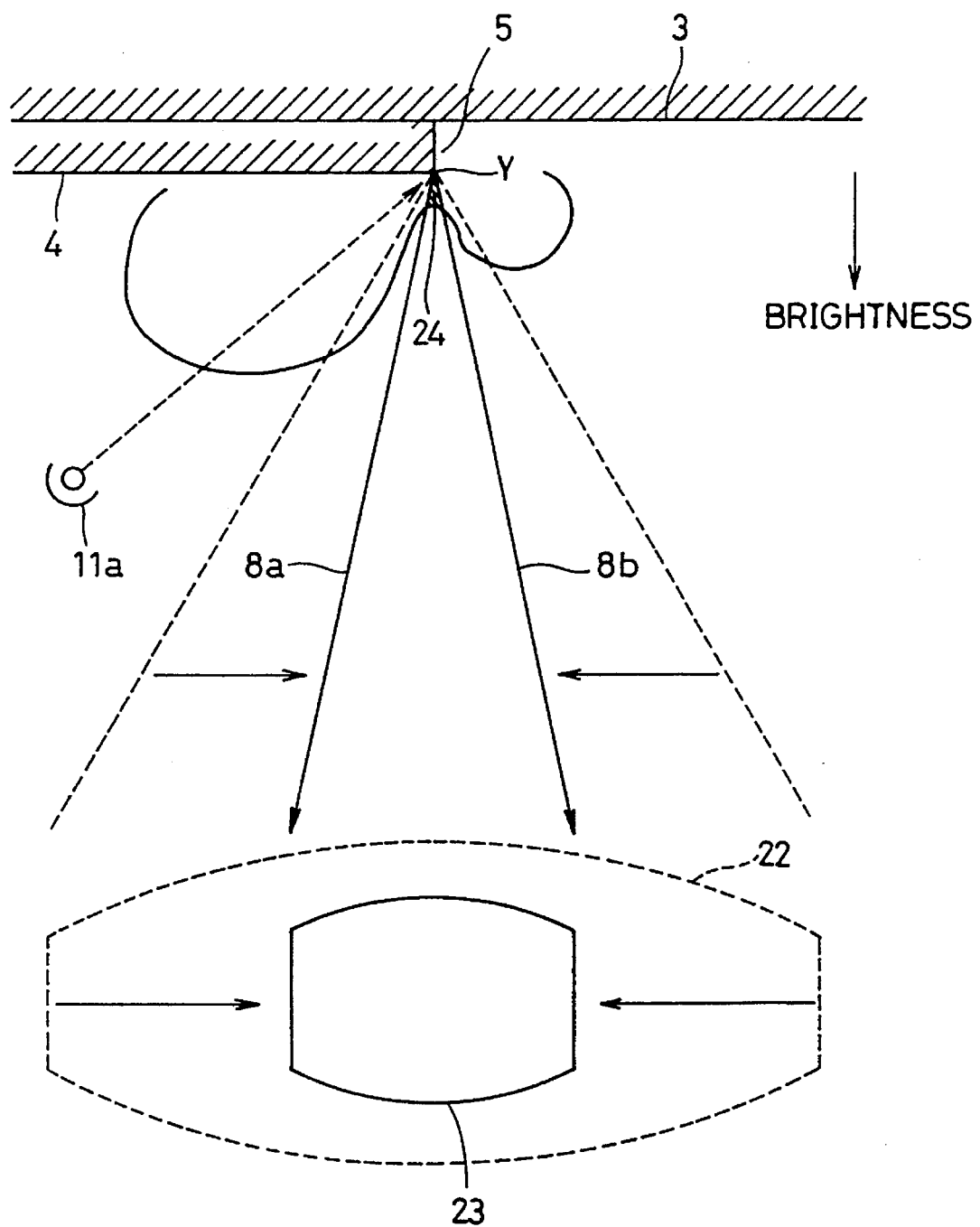
FIG. 25 is a diagram corresponding to FIG. 24, showing the characteristics of the amount of received light when the aperture is stopped down by the aperture mechanism.

FIG. 25 corresponds to FIG. 24, and shows the state where the aperture is adjusted from the stop down range of FIG. 24 to a stop down range (2) 23. Here, the amount of received light 24 received by photoelectric conversion element 17 is extremely small, and does not correspond to the adjusted level of the aperture mechanism. Thus, the presence of a shadow region due to a cut out original can be determined by detecting change in the amount of received light.

Figure 26:
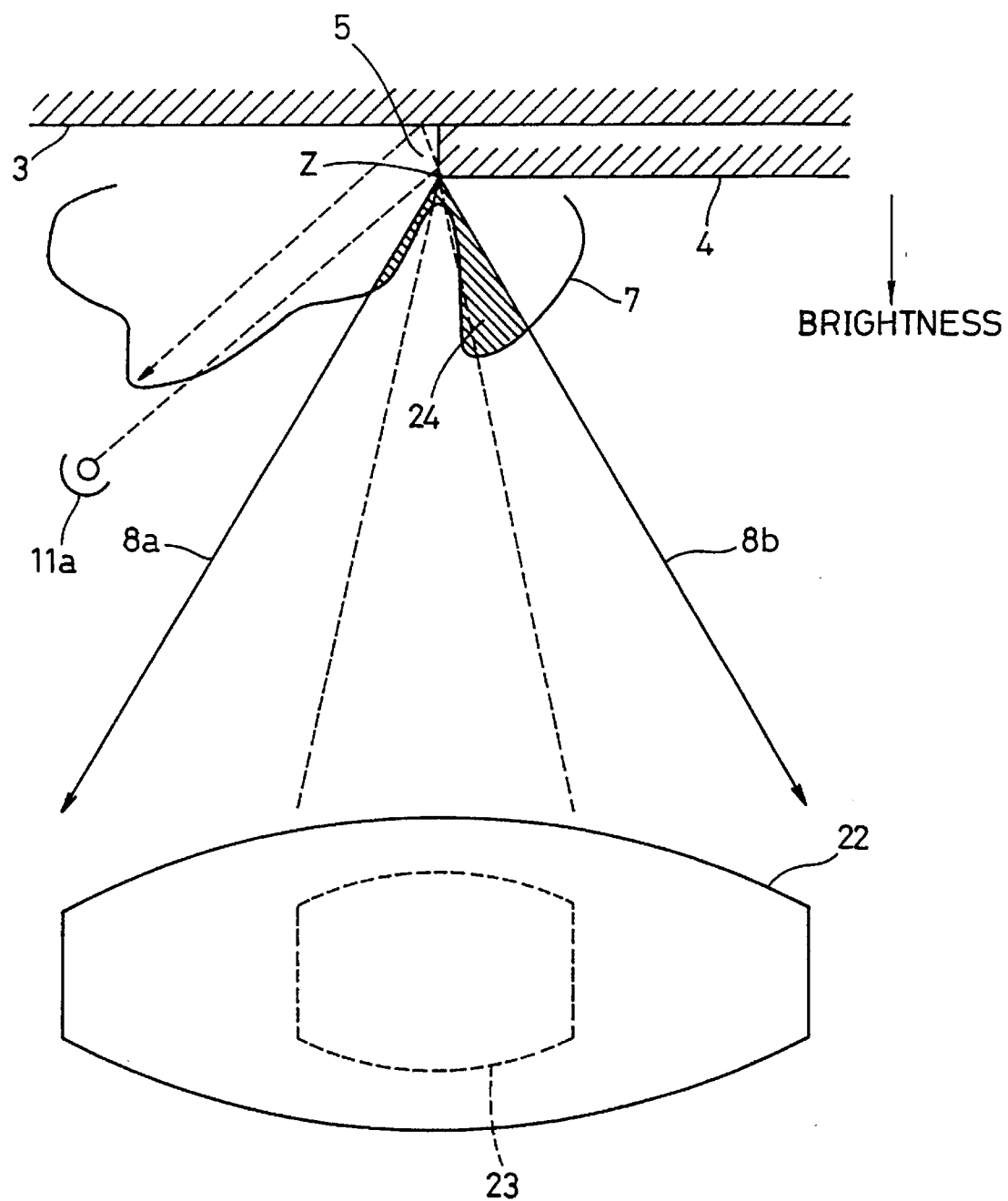
FIG. 26 is a diagram showing the characteristics of the amount of received light with respect to light reflected from the left edge of a cut-and-pasted original when the aperture is completely opened by the aperture mechanism according to the third embodiment of the present invention.

FIG. 26 shows the distribution of the amount of received light when a step portion at the other edge side of a cut out original is irradiated with an exposure lamp.

Referring to FIG. 26, a cut out original 4 is pasted on original 3. Point Z defined by the left end step portion 5 is irradiated with exposure lamp 11a. By the presence of step portion 5, the reflected light from point Z shows an extremely low amount below point Z, as is apparent from the distribution of brightness curve 7.

Figure 27:
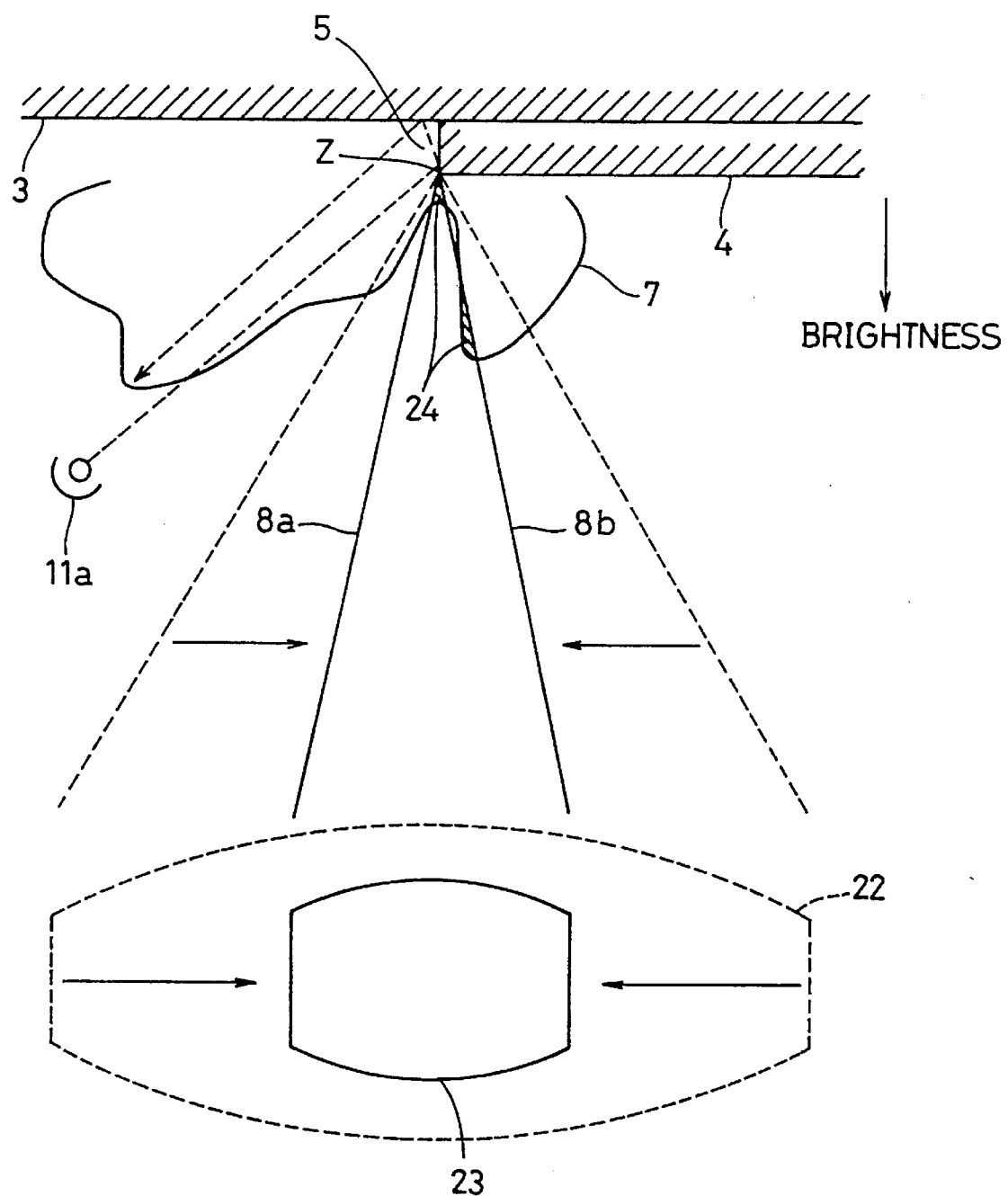
FIG. 27 is a diagram corresponding to FIG. 26, showing the characteristics of the amount of received light when the aperture is stopped down by the aperture mechanism.

FIG. 27 corresponds to FIG. 26, showing the distribution of the amount of received light when the aperture is adjusted to the stop down range of (2) 23. Similar to the case of FIG. 25, reduction in the amount of received light does not correspond to the stopped down level of the aperture mechanism. It shows a significant change. Therefore, the presence of an edge portion of a cut out original can be determined by detecting a change in the amount of the received light.

Figure 28:
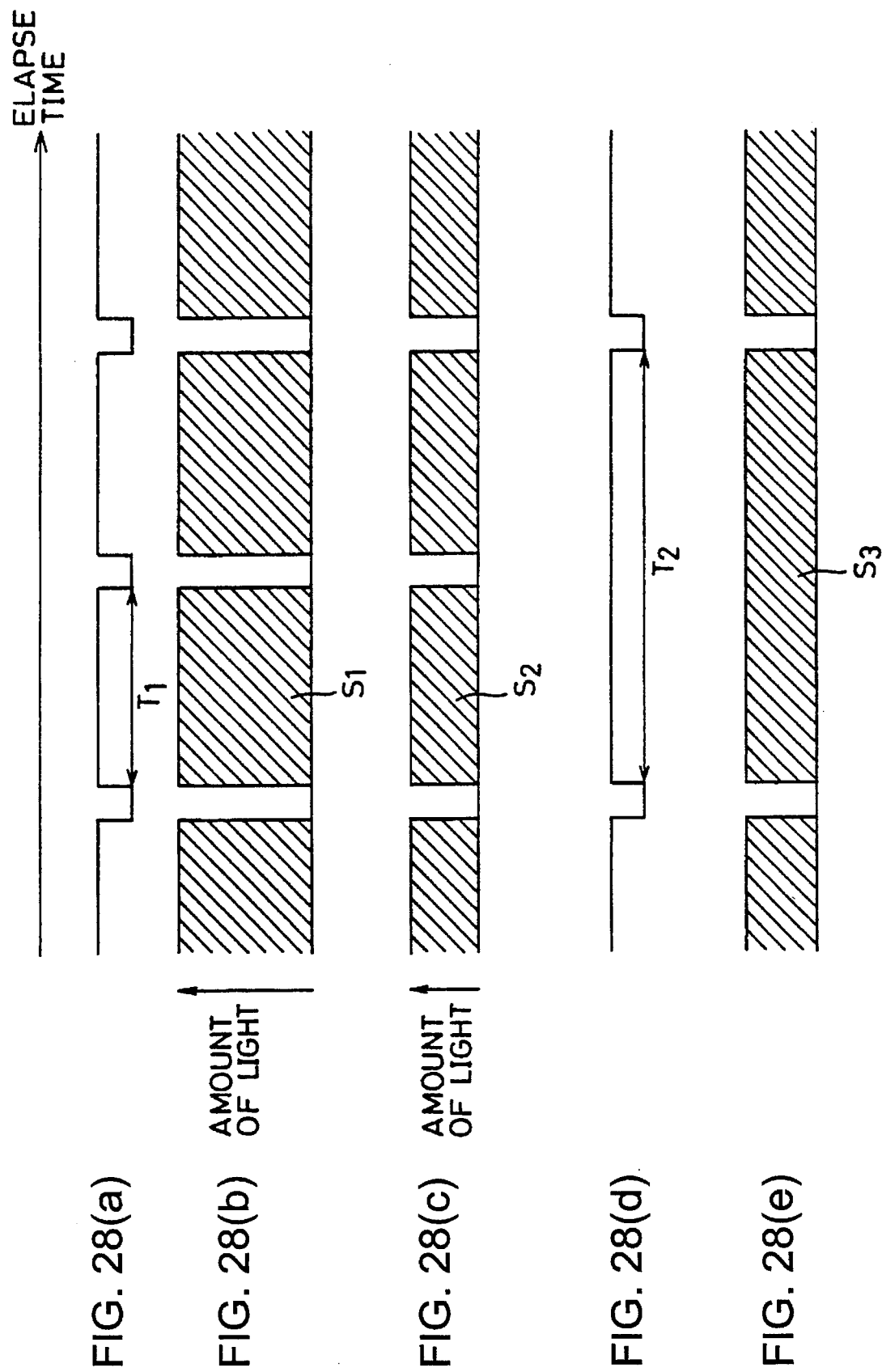
FIG. 28 is a diagram for describing the relationship between the stored time period and the amount of received light in a photoelectric conversion element according to the third embodiment of the present invention.

FIG. 28 is a diagram for describing the relationship of change in the amount of received light of a photoelectric conversion element when the aperture is adjusted by the aperture mechanism according to the second embodiment of the present invention. Referring to FIG. 28, (a) shows the stored time period $T_1$ of light in a photoelectric conversion element when the aperture is fully opened, and (b) shows the amount of received light represented as an area S1 for each time period $T_1$, and (c) shows the amount of received light in a photoelectric conversion element represented as $S_2$ when the aperture is stopped down while the stored time period is identical to the case where the aperture mechanism is fully opened. It is therefore apparent that the electronic stored amount in a photoelectric conversion element is reduced due to (amount of light×stored time period) when the aperture is stopped down. This will not allow the output level of the photoelectric conversion element to be maintained at a constant level. Therefore, the stored time period $T_2$ is increased according to the stop down level of the aperture mechanism as shown in (d). As a result, the area $S_3$ shown in (e) can be made substantially equal to area $S_1$ shown in (b) to increase the electronic stored amount in a photoelectric conversion element. Therefore, the output level can be maintained at a constant level.

Figure 29:
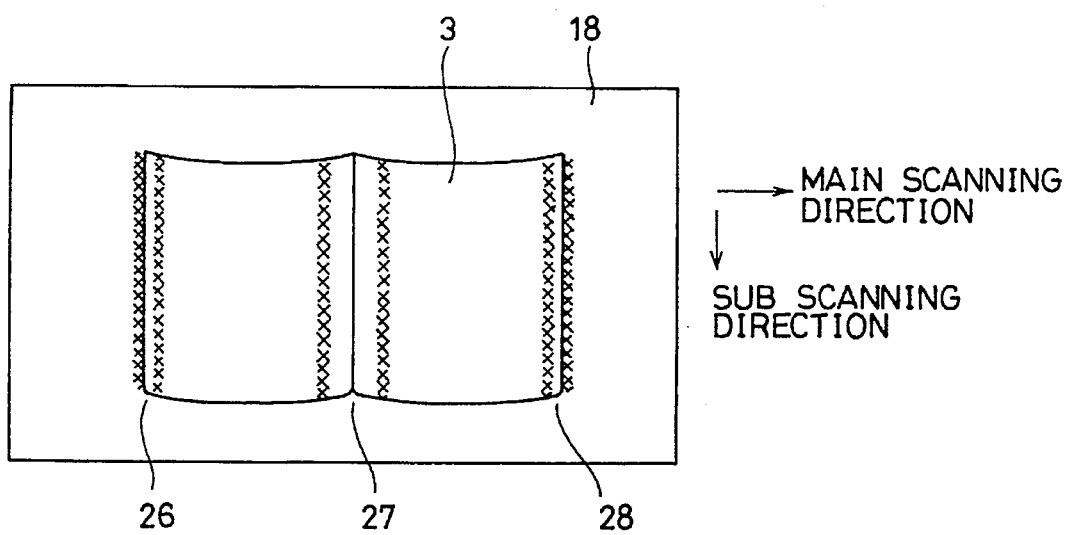
FIG. 29 is a diagram showing generation of a shadow region when the original is a book for describing a shadow processing operation according to the third embodiment of the present invention.

A third embodiment of the present invention will be described hereinafter with reference to FIG. 29 showing the case where the original to be read out is a book.

Referring to FIG. 29, a book original 3 is set on an original platen glass 18. A shadow region (1) 26, a shadow region (2) 27, and a shadow region (3) 28 are generated in the left side, the middle area, and the right side of the book, respectively. In the present embodiment, the rightward direction is the main scanning direction, and the downward direction is the subscanning direction in the drawing sheet.

Figure 30:
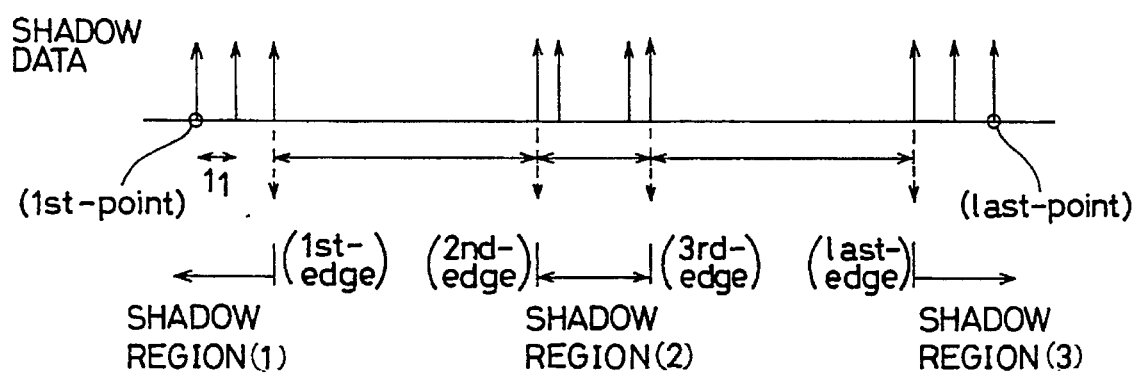
FIG. 30 is a diagram corresponding to FIG. 29, showing generation of shadow data in the main scanning direction of FIG. 29.

FIG. 30 corresponds to FIG. 29, and shows image data output corresponding to a shadow region.

Referring to FIG. 30, an image read out valid area starts from the first point to the last point. The right side end of shadow region (1) is the first edge, the left and right side ends of shadow region (2) are the second and third edges, and the left end side of shadow region (3) is the last edge.

Figure 31:
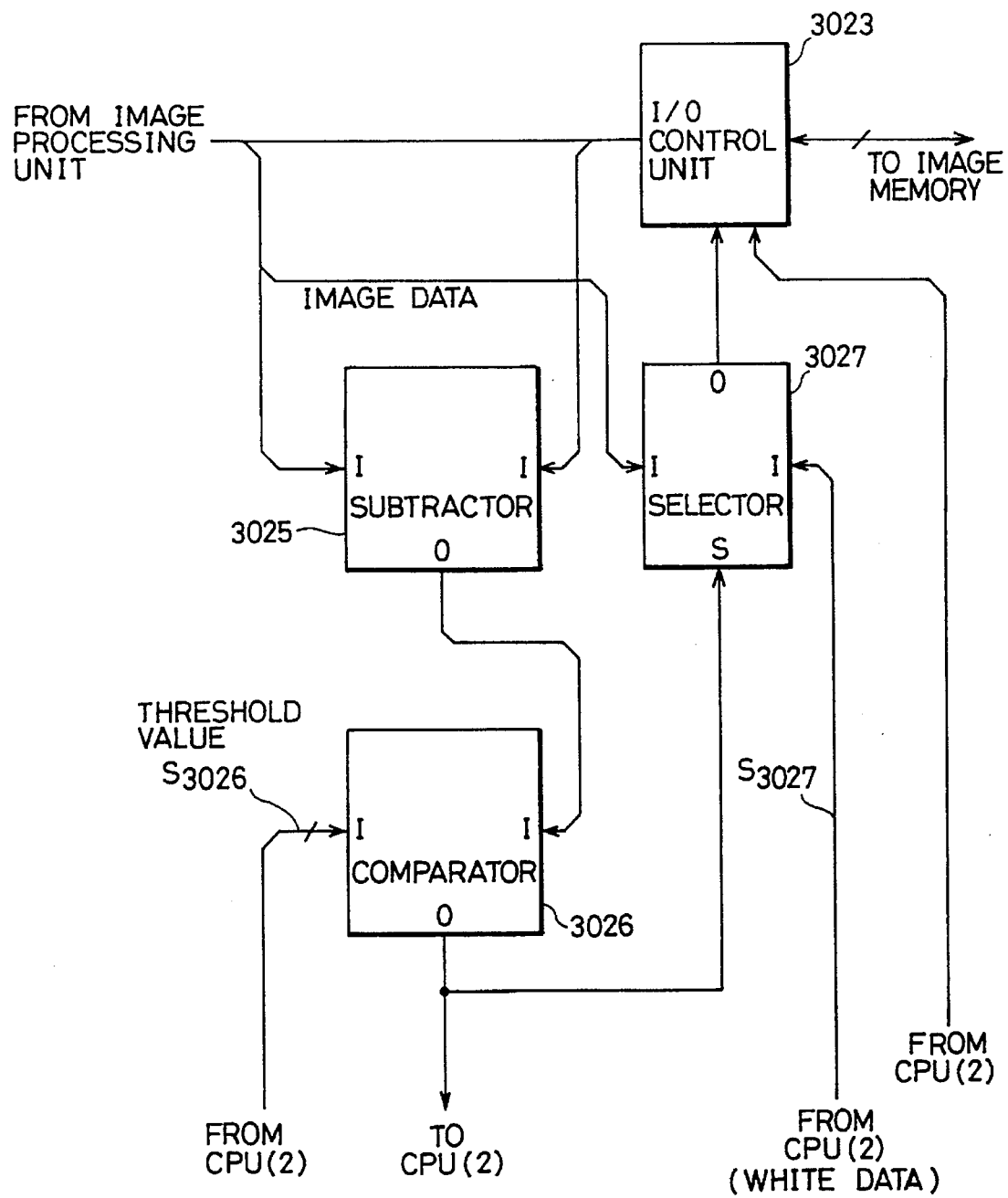
FIG. 31 is a block diagram specifically showing a structure of an image signal processing unit according to the third embodiment of the present invention.

FIG. 31 is a block diagram showing a structure of a shadow pixel detection unit according to the third embodiment of the present invention.

The structure shown in FIG. 31 is similar to the embodiment shown in FIG. 10, except that the output of comparator 3026 is provided to not only to selector 3027, but also to CPU (2). This is to determine the edge portion in a shadow region as shown in FIG. 30 on the basis of the output of shadow data.

Figure 32:
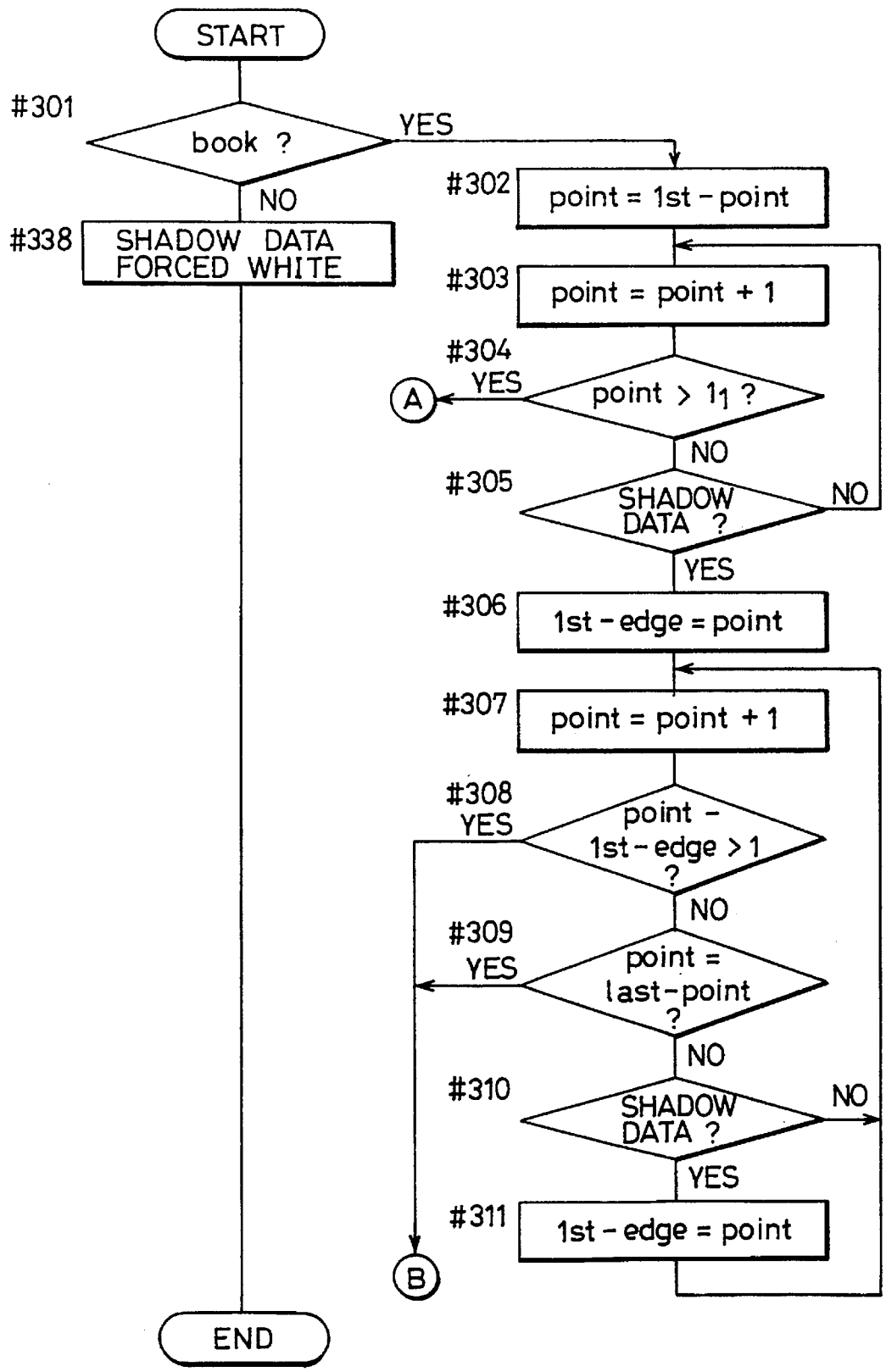
FIG. 32 is a flow chart partially showing the contents of control operation by a CPU (2) according to the third embodiment of the present invention.
Figure 33:
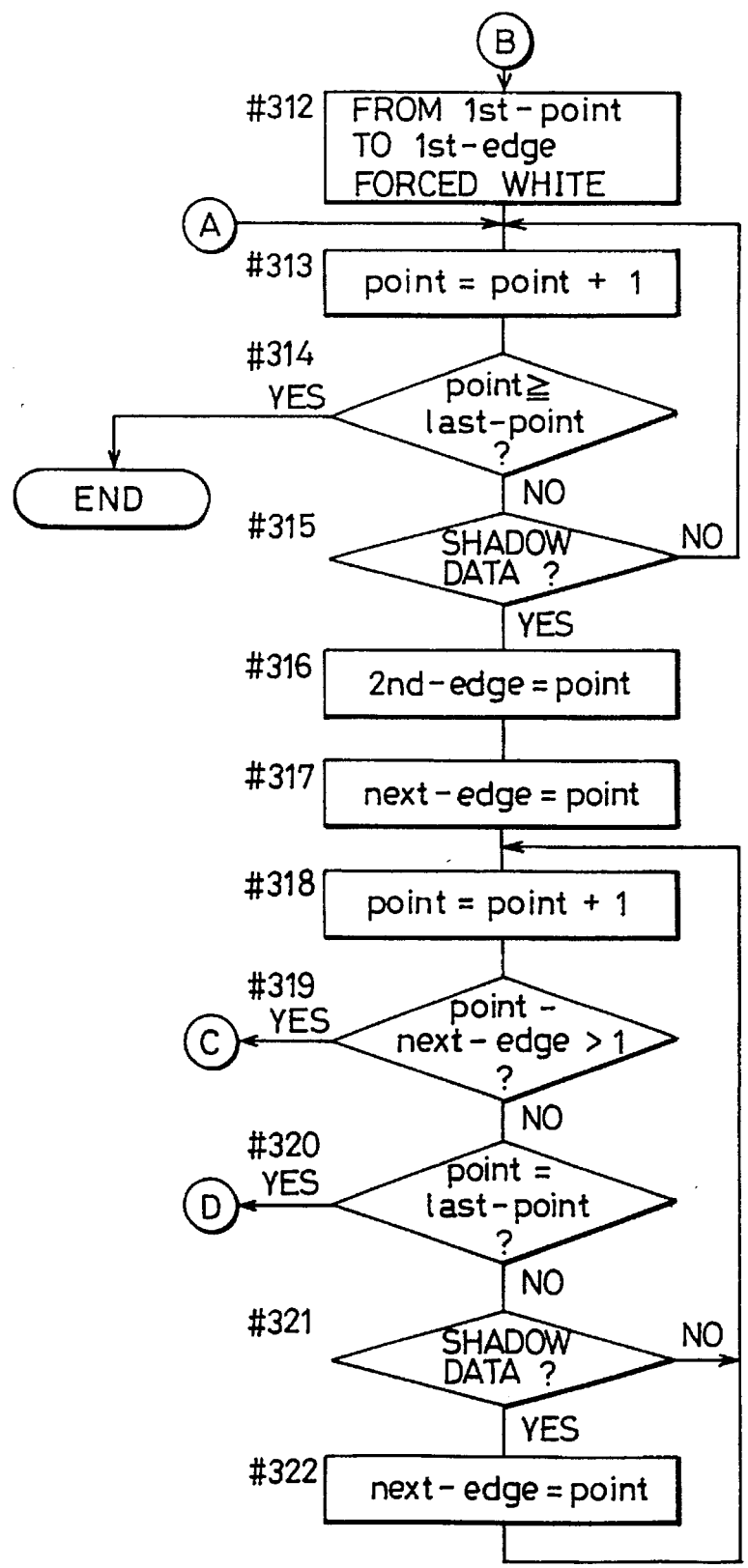
FIG. 33 is a flow chart succeeding the flow chart of FIG. 32.
Figure 34:
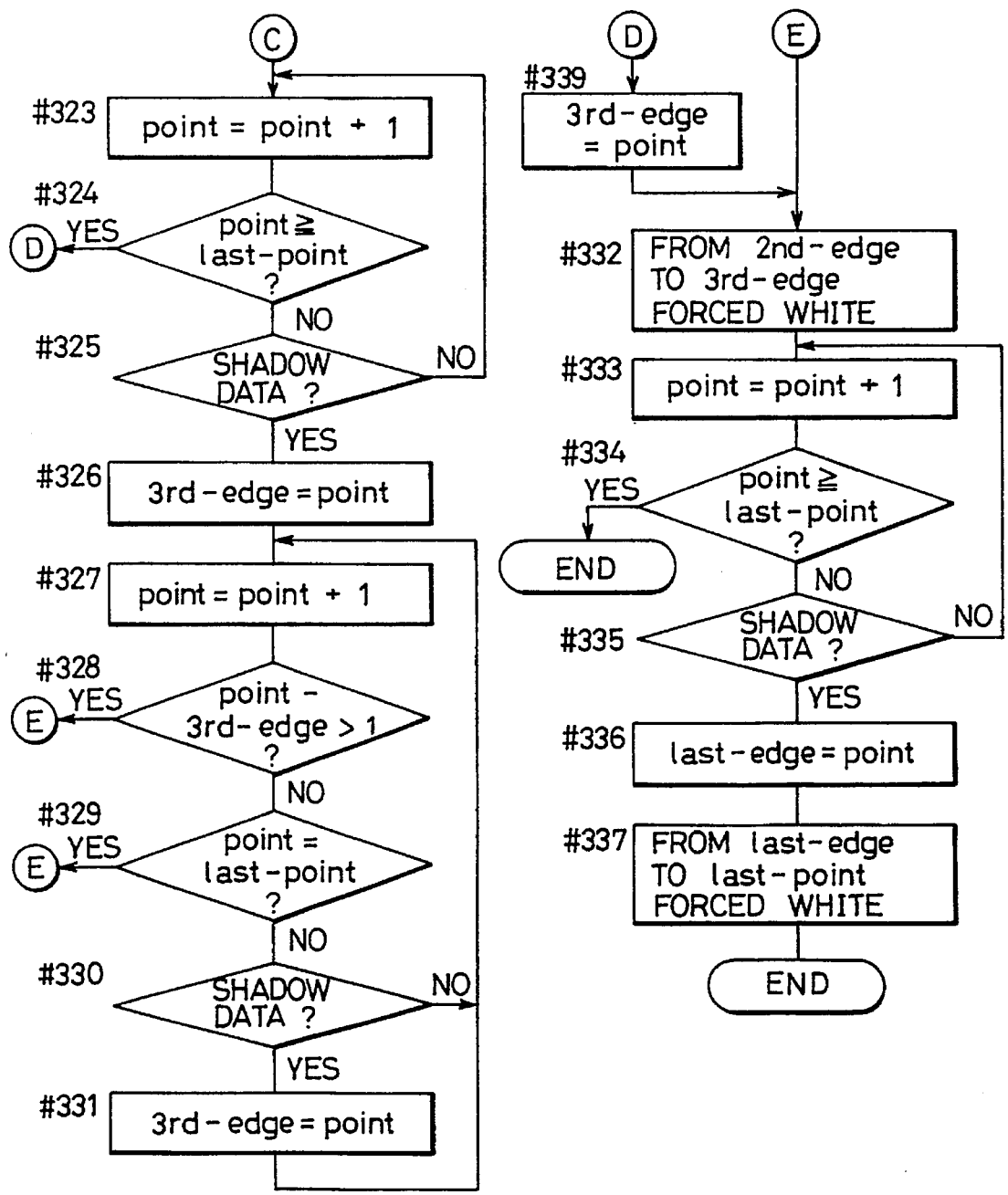
FIG. 34 is a flow chart succeeding the flow chart of FIG. 33.

FIGS. 32–34 are flow charts showing the control of CPU (2) according to the third embodiment of the present invention, for extracting an edge from the shadow data of FIG. 30.

At step #301, determination is made whether the mode has a book as a readout object. If the original is not a book, the control proceeds to step #338 to carry out a process for a general shadow. More specifically, a process of substituting all the output shadow data with white data is carried out. Thus, a process ends.

If the original is a book, the program proceeds to step #302 to set the first point as the point of the standard value. This point is incremented by 1 in step #303. At step #304, determination is made whether that point is greater than a predetermined value $1_1$. This comparison is made to proceed to the step of #313 and et seq. based upon the determination that no shadow is present at the leading area of the book when there is no shadow data from the 1st point to the point of predetermined value $1_1$.

When the point is below predetermined value $1_1$, the program proceeds to step #305 to determine whether shadow data is output or not. If the output is shadow data, the program proceeds to step #306 wherein the value of that point is set as the first edge. Then, at step #307, the point is incremented by 1. At step #308, determination is made whether a value which is the value of the first edge subtracted from the current point is greater than a predetermined value 1. If new shadow data is not output and this value is greater than 1, the first edge is set as the last point in the shadow region appearing at the left portion of the book. The program proceeds to the process of step #312 onward.

If the value of the first edge point subtracted from the current point is below 1, the program proceeds to step #309 in which determination is made whether the current point is the last point. When the current point reaches the last point, the program proceeds to step #312 and et seq. If the current point is not the last point, the program proceeds to step #310 in which determination is made whether shadow data is generated or not. If new shadow data is generated when the value of the first edge point subtracted from the current point is less than 1, the value of that point is substituted as the first edge, and the operation of step #307 and et seq. are repeated.

At step #312, the image data from the first point to the first edge is forcibly substituted with white data when the point of the first edge is determined. As a result, the data of shadow region (1) appearing at the left area of original 3 is replaced by white data.

At step #313, the point indicating the current position is incremented by 1. At step #314, determination is made whether that point is greater than the last point. If YES, the flow ends since the image readout valid area is terminated.

If the current point has not yet arrived at the last point, determination is made whether the data at that point is shadow data or not in step #315. If YES, the program proceeds to step #316 to set that point as the second edge. At step #317, the current point is inserted as the value of the next edge. At step #318, the value of the point is incremented by 1. At step #319, determination is made whether a value which is the next edge value subtracted from the current point value is greater than predetermined value 1. This comparison is made to proceed to the process of step #323 and et seq. with the next edge as the beginning of a region in which there is no shadow data in the middle shadow region (2) of the book, in the case where there is no shadow data of a value greater than the predetermined value of 1 from the next edge.

At step #320, determination is made whether the current point is the last point or not. If the current point is the last point, the flow proceeds to step #339 in which the current point is set as the third edge. Then, the program proceeds to the process of step #332 and et seq.

If the current point has not yet arrived at the last point, determination is made whether the output data is shadow data in step #321. If YES, the program proceeds to step #322 in which the value of that point is inserted as the next edge. Then, the process of step #318 and et seq. is repeated.

At step #323, the value of the point is increment by 1. At step #324, determination is made whether the current point exceeds the last point. If the last point is exceeded, the program proceeds to the process of step #331 and et seq., otherwise, the program proceeds to step #325 in which determination is made whether shadow data is output. If shadow data is output, the program proceeds to step #326 in which that point is substituted as the third edge. At step #327, the current point is incremented by 1.

At step #328, determination is made whether a value which is the third edge value subtracted from the current point value exceeds the predetermined value of 1 or not. If that value exceeds the predetermined value 1, or the current point is the last point in step #329, the flow proceeds to step #332 and et seq.

At step #330, determination is made whether the output data is shadow data. If shadow data is output, the program proceeds to step #331 to insert the current point value as the third edge. Thus, when there is no shadow data from the point of third edge to a range of more than predetermined value 1, the point value of the third edge is processed as the value of the right side end of shadow region (2). At step #332, image data from the point value of the second edge to the point value of the third edge is forcibly substituted with white data. By this process, the shadow region generated at the center area of the book can be processed as white data.

At step #333, the point value is incremented by 1. At step #334, determination is made whether the value of that point exceeds the last point. If the last point is not exceeded, the program proceeds to step #335 in which determination is made whether the output data is shadow data or not. When shadow data is output, the point value is set as the last edge. At step #337, the value of the image data from the last edge to the last point is forcibly substituted with white data. As a result, the data of the area of shadow region (3) of the book is replaced by white data.

If shadow data is not output from the point corresponding to the third edge to the last point, determination is made that the right side portion of the book includes no shadow region, whereby the program branches from step #334 to end the process.

Figure 35:
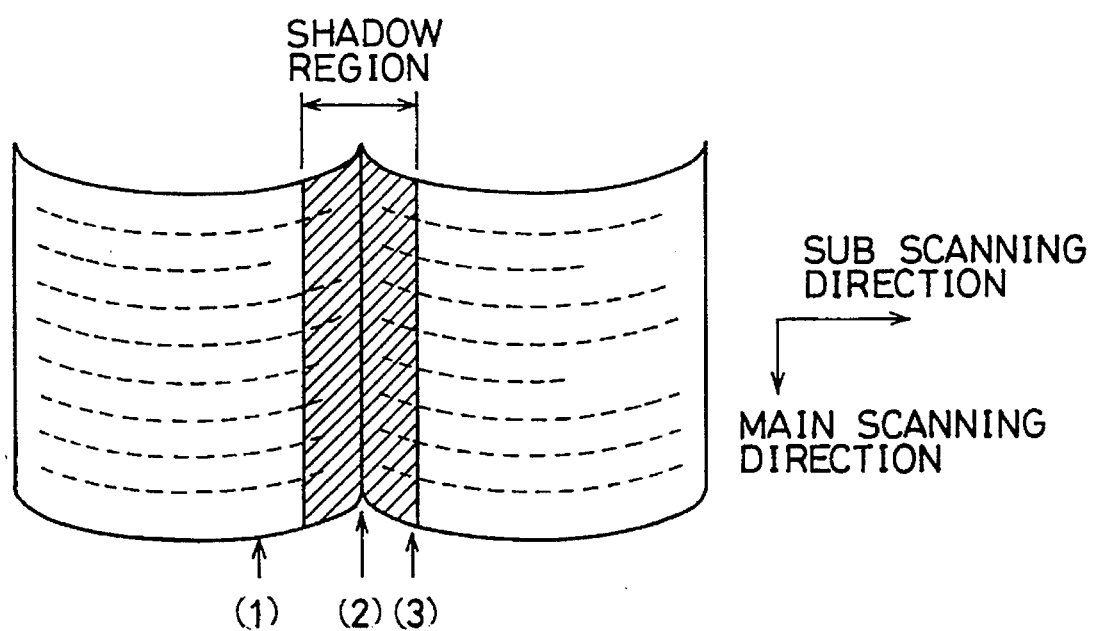
FIG. 35 is a diagram showing the overlapping state of a shadow region and print character data when the original is a book in describing the shadow process operation according to a fourth embodiment of the present invention.
Figure 36:
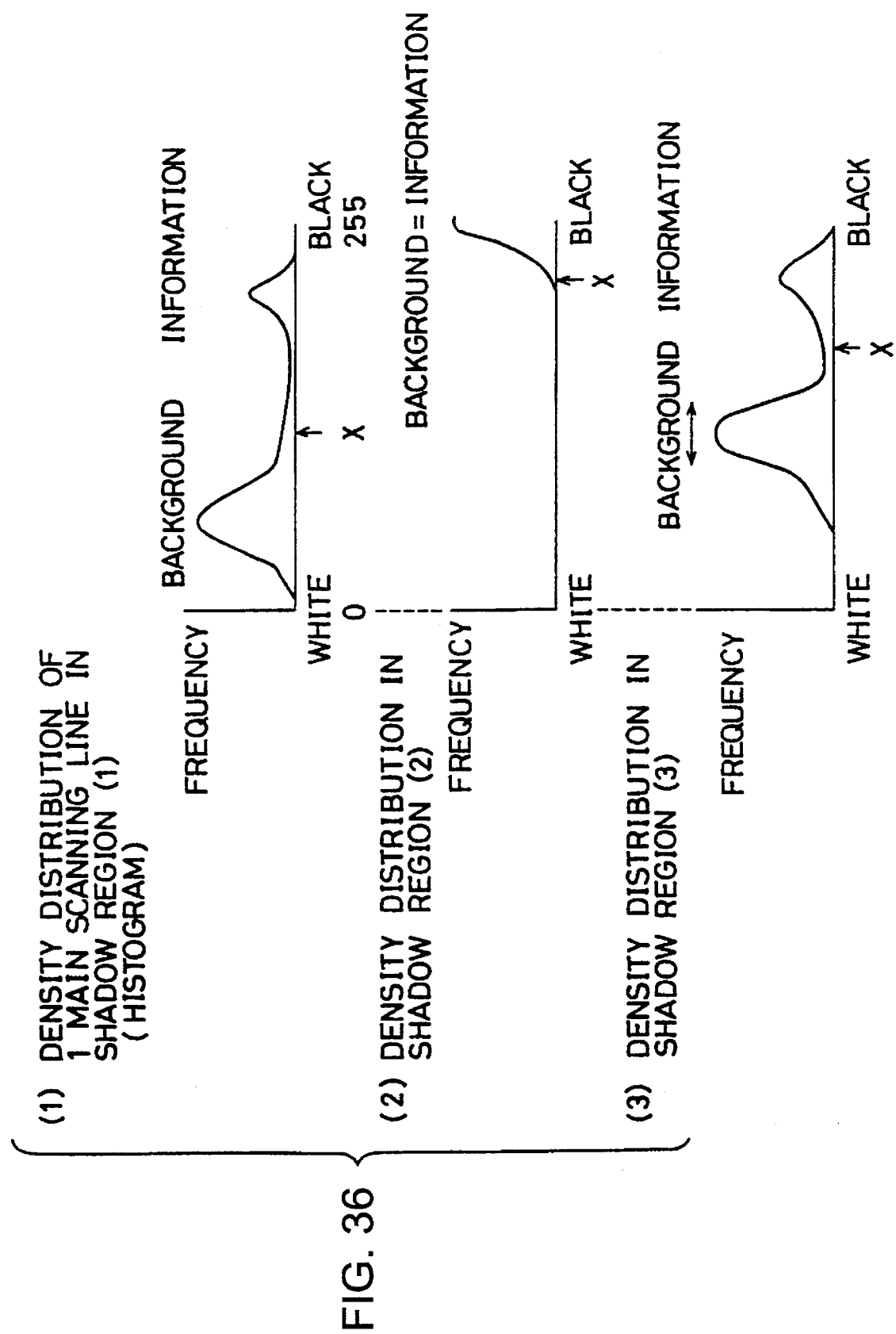
FIG. 36 is a diagram showing a density distribution of 1 line in the main scanning direction in each region of FIG. 35.

FIG. 35 shows generation of a shadow region when the readout original is a book according to a fourth embodiment of the present invention, and FIG. 36 shows the density distribution in each region of FIG. 35.

Referring to FIGS. 35 and 36, shadow region (1) has the density distribution of one line in the main scanning direction shown by (1) in FIG. 36. More specifically, the density distribution has 0 as white data and the maximum value 255 as black data plotted along the abscissa, and the generation frequency of the image data plotted along the ordinate. In shadow (1), the influence of a shadow region is not directly obvious, and the print character data of each page in the book is dominant in the density distribution. Therefore, the generation frequency of a background approximating white data is great, with character image information approximating black data partially indicated.

In region (2), print character data of the original is not included, and data implying the presence of a shadow at the center portion of the book is great, resulting in the density distribution shown in FIG. 36 (2). More specifically, data approximating the maximum density of black is frequent.

The density distribution of shadow (3) includes data of a shadow region and print character data, resulting in the density distribution shown in FIG. 36 (3). More specifically, image data affected by a shadow appears as the background data. Data of the print character and the like appears at the region near the maximum density of black as information data. According to the present embodiment, a shadow region is first detected, whereby CPU 2 produces density distribution of 1 line in the main scanning line in the shadow region to detect the underlying density.

Figure 37:
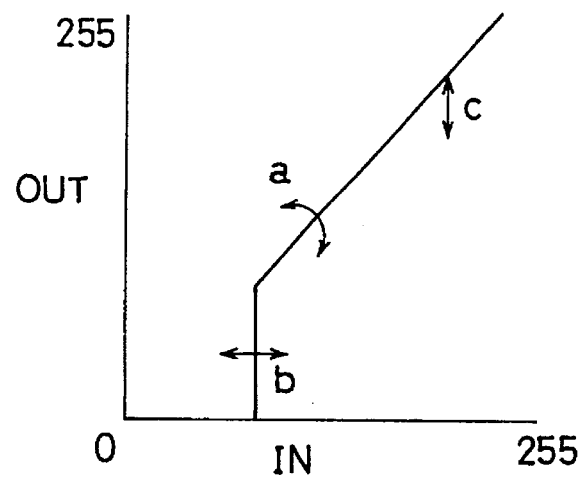
FIG. 37 is a diagram for describing a γ correction parameter according to the fourth embodiment of the present invention.

FIG. 37 shows the characteristics when a γ correction parameter is set on the basis of the detected underlying density.

Figure 38:
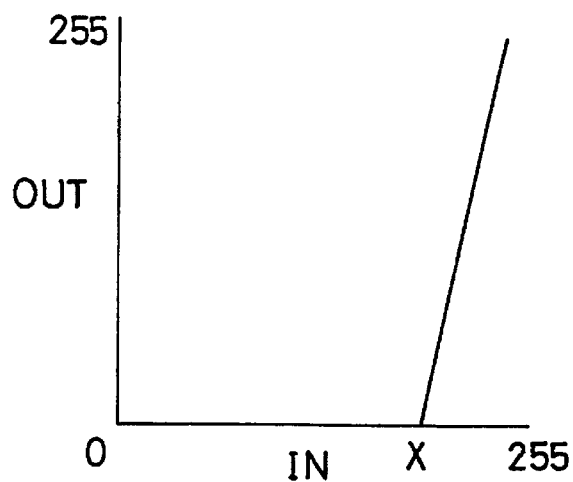
FIG. 38 is a diagram showing the specific setting content of γ correction parameters according to the fourth embodiment of the present invention.

Referring to FIG. 37, input data indicating the density distribution from 0 to 255 is plotted along the abscissa, and output data corresponding to the density data from 0 to 255 is plotted along the ordinate. The parameter includes inclination a, cut amount b, and level shift amount c. Each set parameter is stored in a γ correction register. The parameter to be used is switched by CPU (2) according to the type of image data. For example, when density distribution as shown in (1)–(3) of FIG. 36 appears, the γ correction parameter shown in FIG. 37 is a set according to point X shown in each distribution diagram. By such γ correction, information of only the desired print character data is output even when the image data includes both a shadow region and print character data. Furthermore, as shown in FIG. 38, the so-called overlap of a shadow region can be reduced to improve the identification rate of information character because the density distribution from the detected underlying density X as shown in FIG. 38 to the maximum black density is output by the gradation of 0–255. Although the density distribution is generated on a 1 line basis in the main scanning direction, the present invention is not limited to the unit of 1 line, and the above-described process may be carried out in an arbitrary region. Furthermore, the output density is not limited to the gradations of 0–255, and may be carried out in an arbitrary density range, for example 128–255.

Figure 39:
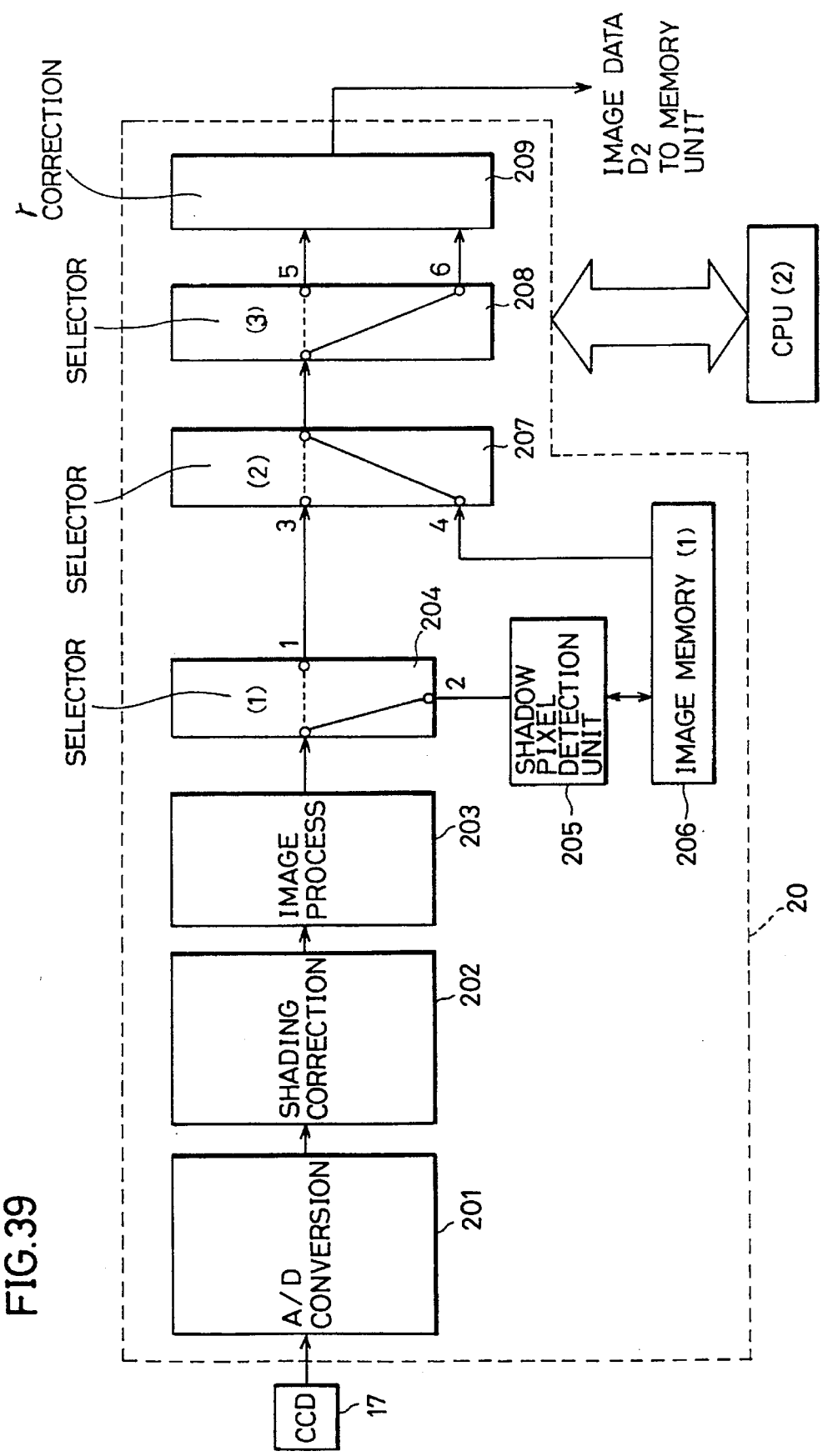
FIG. 39 is a block diagram specifically showing a structure of an image signal processing unit according to the fourth embodiment of the present invention.

FIG. 39 is a block diagram showing a structure of an image signal processing unit according to a fourth embodiment of the present invention.

Referring to FIG. 39, the structure and function of CCD 17, and A/D converting unit 201 to selector (2) 207 are similar to those of the above-described embodiments. Therefore, their description will not be repeated. Only the structure differing from that of the preceding embodiment, i.e. the structure of selector (3) 208 onward will be described.

Selector (2) 207 selects an output from selector (1) at the "3" side in a normal mode. When a shadow process mode is specified, output of image memory (1) 206 at the "4" side is selected. The output of image data having shadow image data corrected is selected.

When the original to be read out is a book, selector (3) 208 passes the image data detected as a shadow region in CPU (2) to the "6" side, and other image data to the "5" side according to the detected result of shadow data of shadow pixel detection unit 205. γ correction unit 209 carries out a general γ correction for image data provided from the "5" side of the image data from selector (3) 208. For image data provided from the "6" side of selector (3) 208, a γ correction according to the underlying density is carried out, as described above. The corrected data is provided to the memory unit as image data D2. The above-described control is carried out by CPU (2).

Figure 40:
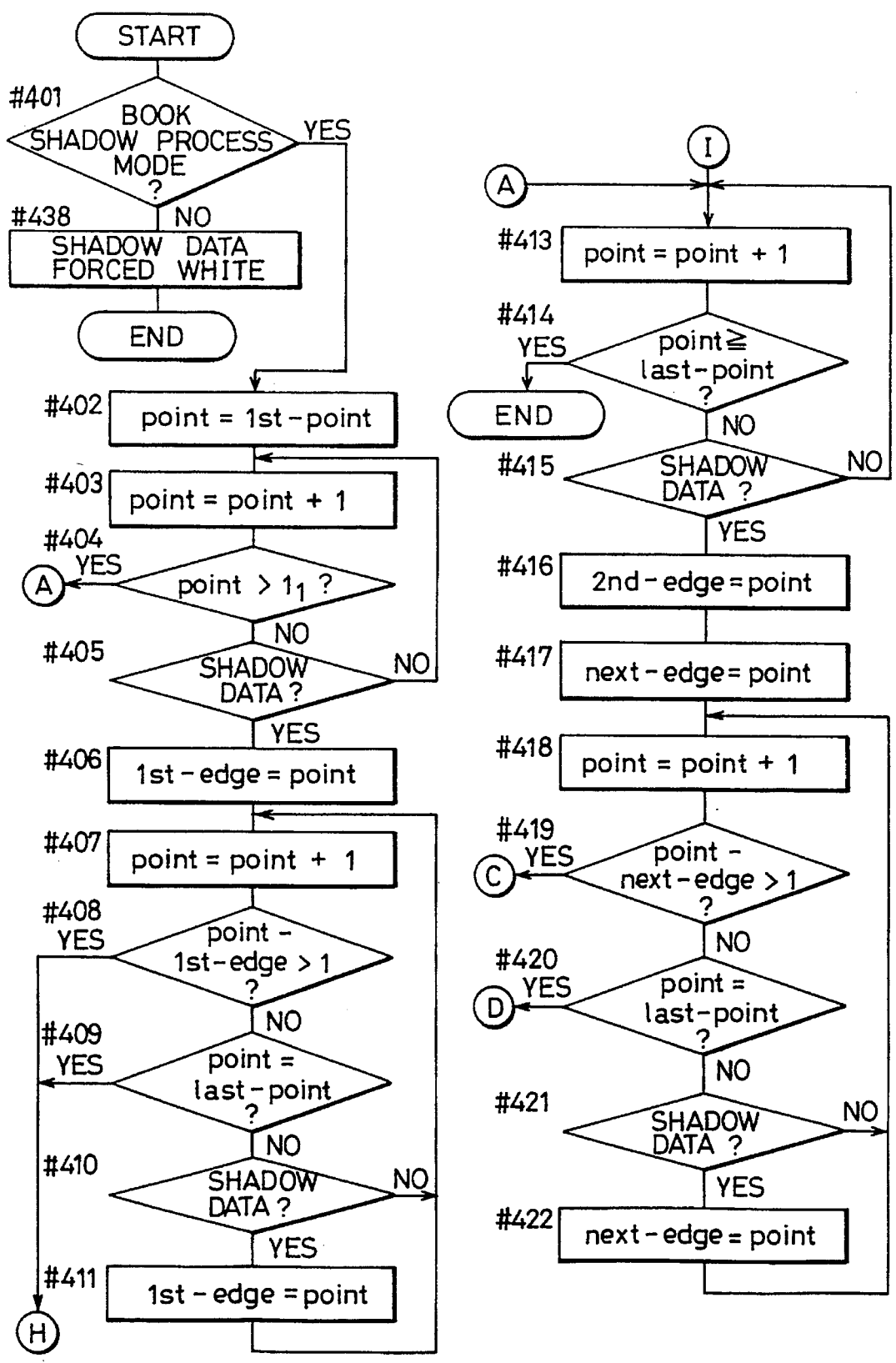
FIG. 40 is a flow chart partially showing the control contents of CPU (2) of FIG. 39.
Figure 41:
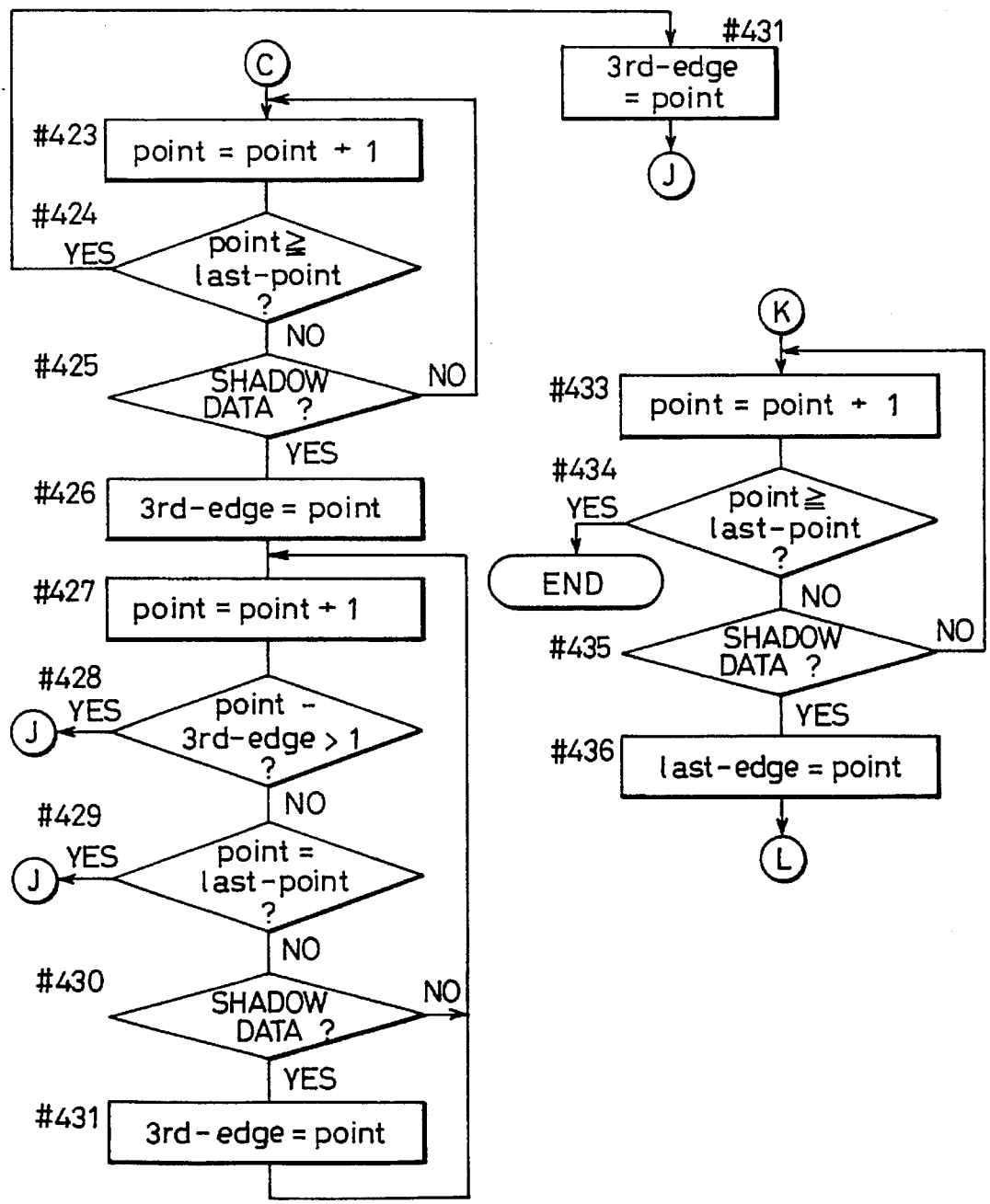
FIG. 41 is a flow chart succeeding the flow chart of FIG. 40.
Figure 42:
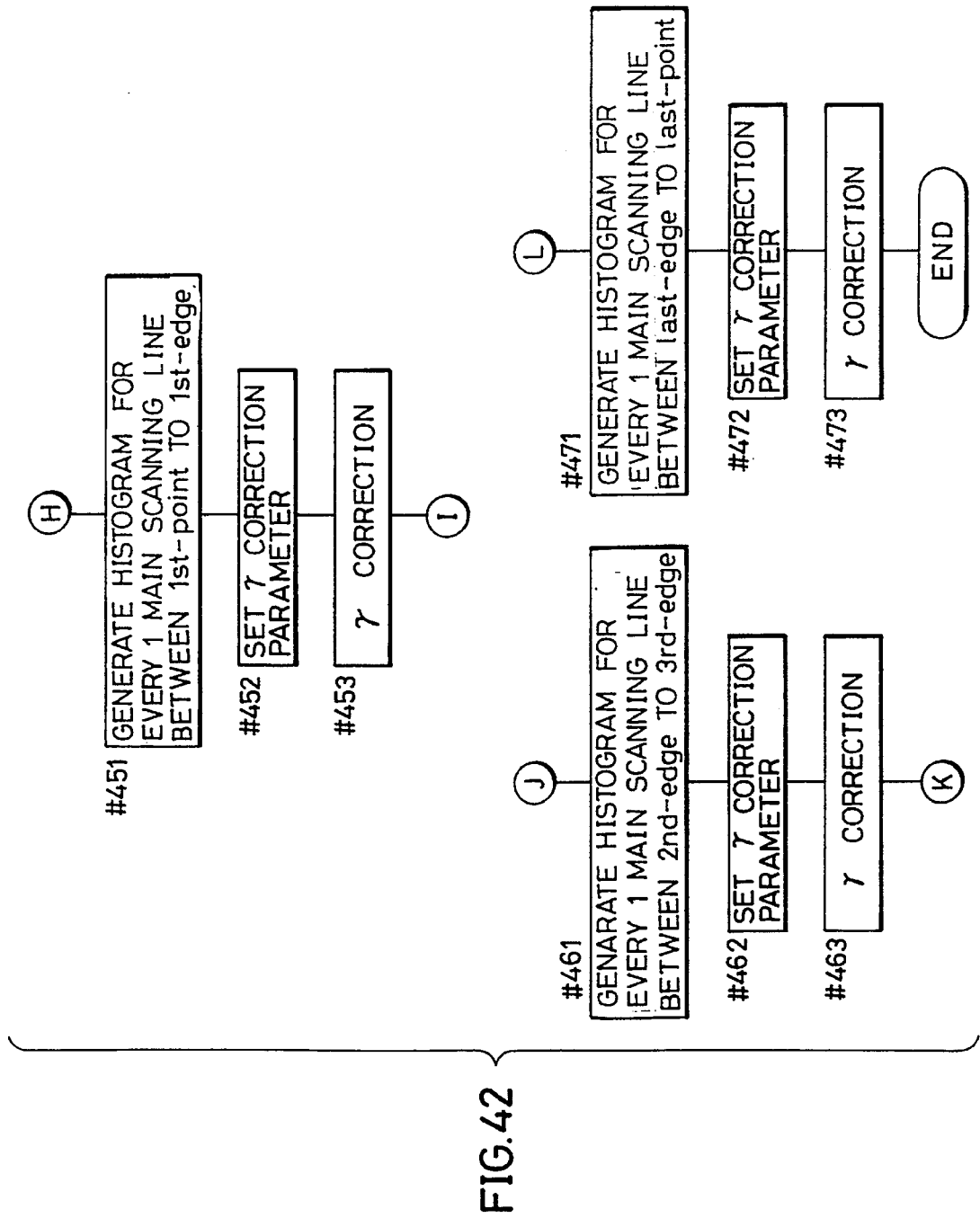
FIG. 42 is a flow chart succeeding the flow charts of FIGS. 40 and 41.

FIGS. 40–42 are flow charts of the control by CPU (2) of FIG. 39.

Because the steps in the flow charts of FIGS. 40 and 41 are basically similar to the corresponding steps of the 300 level in FIGS. 32 to 34 of the above-described third embodiment, their description will not be repeated. The portions specific in the fourth embodiment shown FIGS. 41 and 42 will be described hereinafter.

At step #451, a histogram for each main scanning line between the first point to the first edge is created. At step #452, γ correction parameters are set according to the produced histogram. Then at step #453, γ correction process is carried out according to the parameters set. Then, the flow returns to step #413. By the above-described process, the overlap due to the background can be removed in the left shadow region of a book original to obtain a clear character data or the like.

As shown in steps #461–463, γ correction is carried out also for the shadow regions from the second edge to the third edge according to the obtained histogram. Similarly, as shown in steps #471–473, γ correction process is carried out from the last edge to the last point. By carrying out an appropriate γ correction for the center and right side shadow regions of the book, the overlap of the shadow region can be reduced to improve the rate at which a print character is identified.

Figure 43:
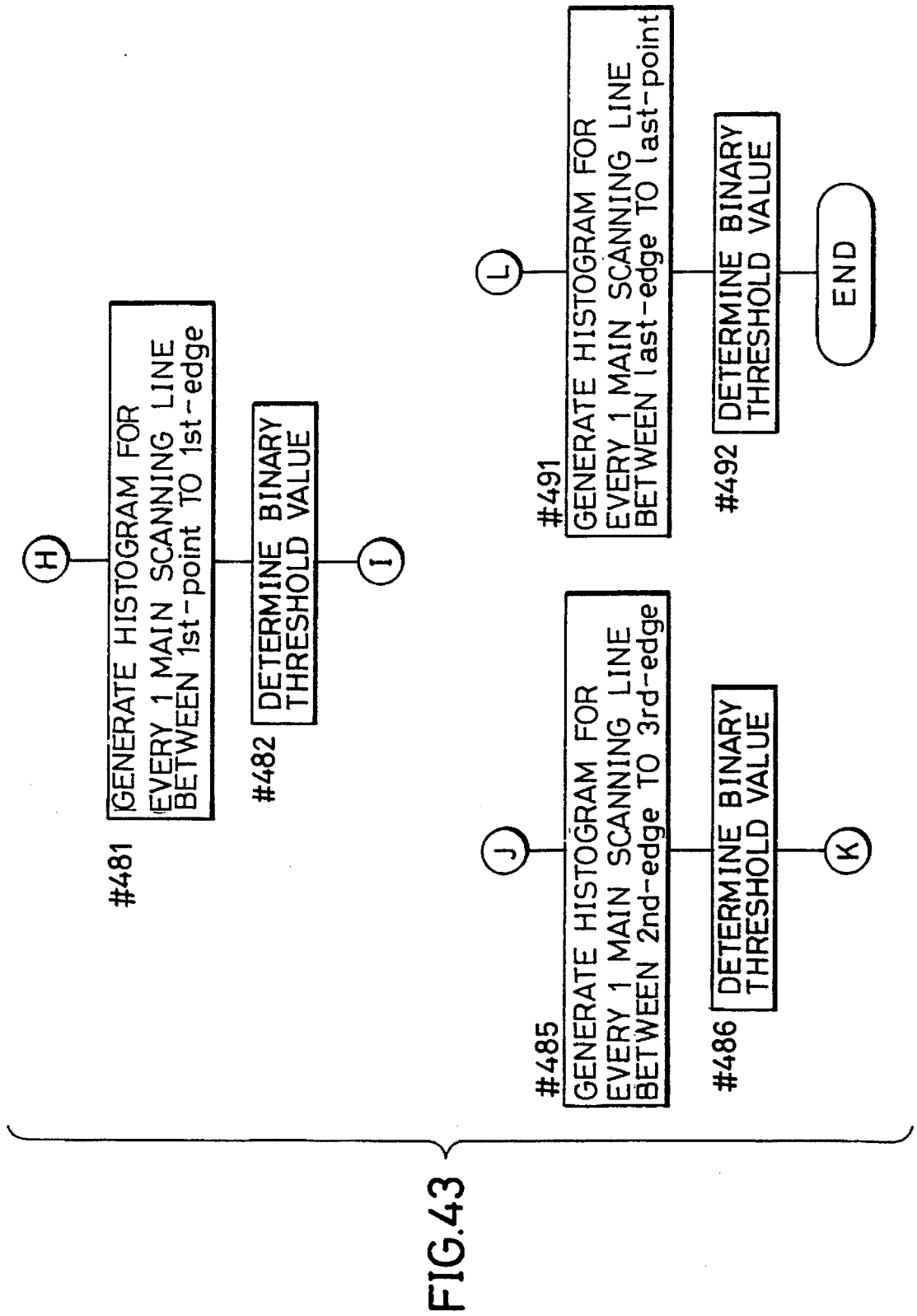
FIG. 43 is a diagram showing characterizing portions according to a fifth embodiment of the present invention, succeeding the flow charts of FIGS. 40 and 41.

FIG. 43 is a flow chart showing the feature of control by CPU (2) according to a fifth embodiment of the present invention.

The fifth embodiment of the present invention is similar to the fourth embodiment shown in FIGS. 40 and 41, except for the section of the flow chart of FIG. 43.

As shown in steps #481, #485 and #491, density distribution for each main scanning line in a shadow region is generated by CPU (2), as in the preceding fourth embodiment. In the fifth embodiment, a certain density data is defined as a predetermined threshold value, wherein any value below that threshold value is determined as background data. Therefore, a process is carried out in which density data below the threshold value is taken as white data, and density data exceeding the threshold value is taken as black data. This determination is based on the generated histogram.

In general, such a binary threshold value is determined from the density distribution of the entire original or the density distribution of the periphery regions. It is postulated that the underlying density is that approximating a white color original.

In contrast, the fifth embodiment of the present invention creates a density distribution in a shadow region. Therefore, even if the underlying density shows data approximating a black color, the presence of a density peak closer to the black side level implies that it is print character information of the original and not a shadow.

Such a threshold value determined by the above method is set as the threshold value of the binary processing unit in memory unit 30. It is to be noted that this threshold value is used only for a shadow region, and data other than the shadow region uses a prescribed threshold value. Because the threshold value is variable with respect to a shadow region, the problem of character information dropped due to the overlapping shadow at the center portion or the like when the original is a book can be reduced. Although the density distribution is detected for each 1 line of the main scanning direction, a binary threshold value may be determined on the basis of a density distribution created for the entire shadow region or for an arbitrary block.

Figure 44:
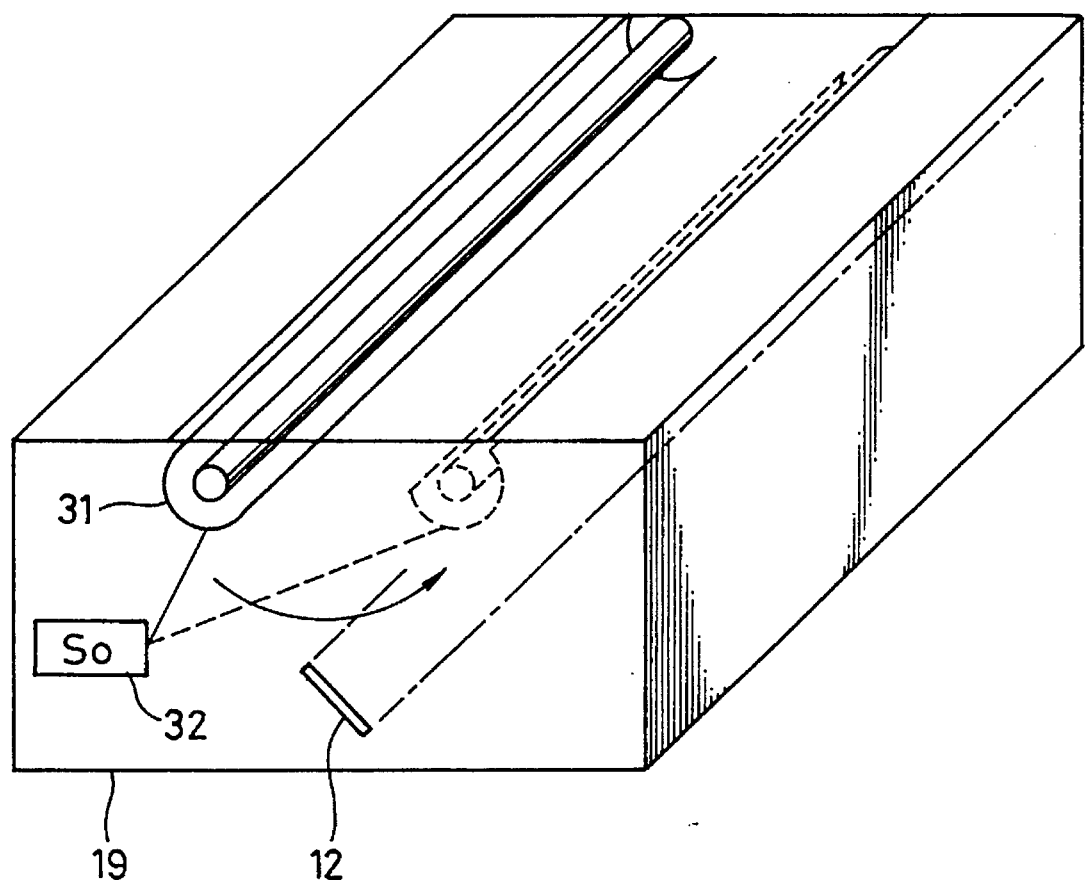
FIG. 44 is a perspective view showing a structure of a scanner unit according to a sixth embodiment of the present invention.

FIG. 44 is a perspective view of a structure of a scanner unit according to a sixth embodiment of the present invention.

An exposure lamp 31 illustrated by a solid line shows the position in a normal readout mode, and exposure lamp 31 indicated by a broken line indicates the position at the second scanning operation when a shadow process mode is set. Exposure lamp 31 is shifted to the position indicated by the solid line or the broken lines according to a drive signal to a solenoid 32 from a CPU (3). A first mirror 12 directs light reflected from an original due to illumination by exposure lamp 31 to the optical system following the second mirror. The structure of first mirror 12 is similar to that of the preceding embodiments.

Figure 45:
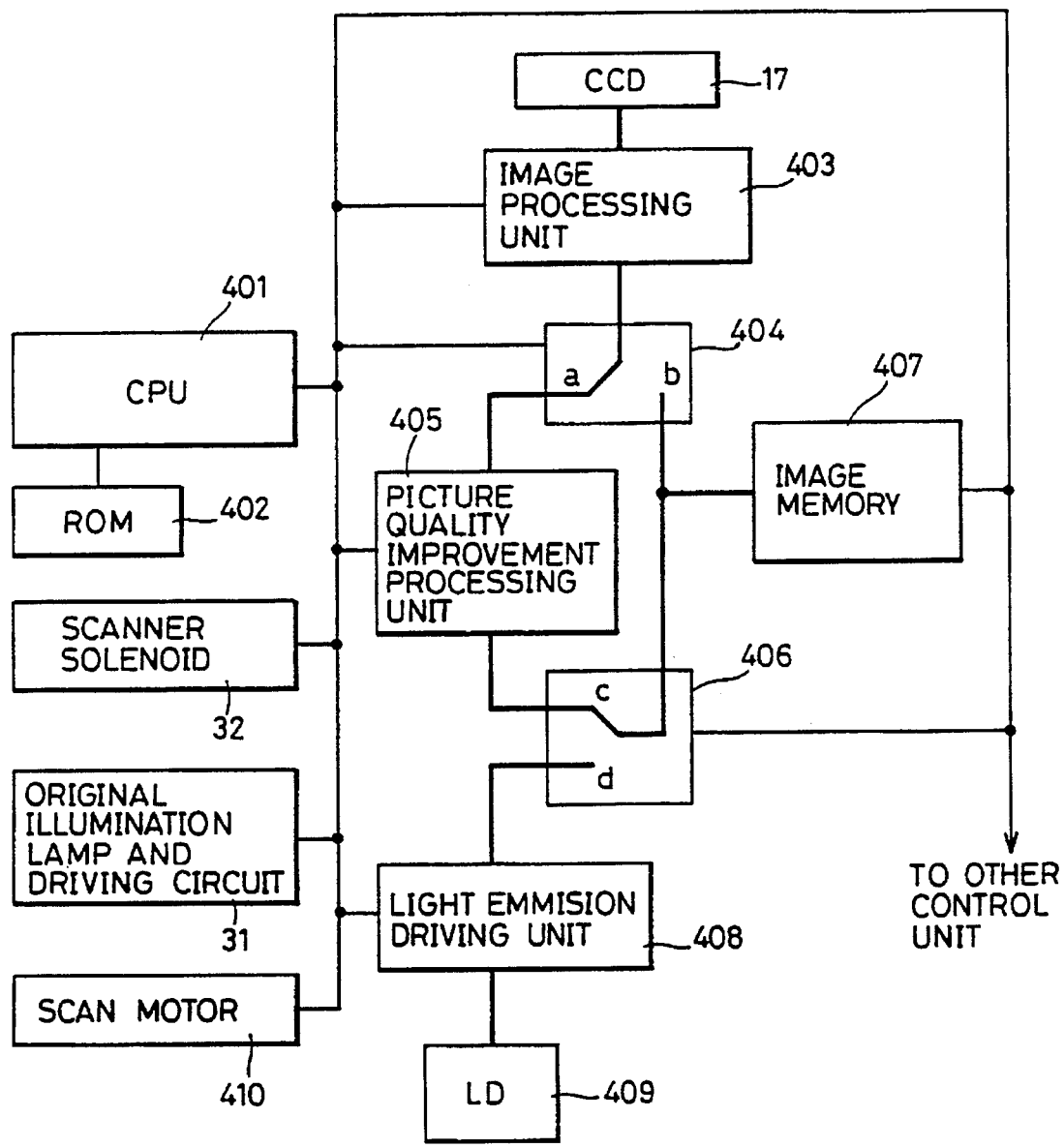
FIG. 45 is a system block diagram specifically showing a structure of a control unit according to a seventh embodiment of the present invention.

FIG. 45 is a block diagram showing a structure of an image forming apparatus according to the sixth embodiment of the present invention.

The structure and operation thereof will be described hereinafter.

(1) Original Image Readout Process

When an original image is to be read out, the switch of image switching unit 406 is always controlled to the position of c.

First Readout

The switch of image switching unit 404 is set to the connection side of b. Scan solenoid 32 is turned off. In FIG. 44, exposure lamp 31 is fixed to the position indicated by the solid line. Exposure lamp 31 is turned on and scan motor 410 is driven to initiate the first readout scan operation.

More specifically, original image of the first line of the original is read out. The readout first line original image is stored in an image memory 407. Image memory 407 is similar to image memory (2) 206 shown in FIG. 9. The original image from the 2nd line to the 6400th line is read out sequentially. The readout image data is sequentially stored into image memory 407. Then, exposure lamp 31 is turned off, and scan motor 410 is stopped.

Second Readout

Then, scan solenoid 32 is turned on, and exposure lamp 31 is shifted to be fixed at the position indicated by the broken line in FIG. 44 to alter the illumination direction to the original.

The connection of image switching unit 404 is set to a. Then, exposure lamp 31 is turned on and scan motor 410 is rotated in the opposite direction to carry out a return operation as the second readout operation.

By this return operation, the original image of the first pixel in the 6400th line is read in, while the first pixel data in the 6400th line is read out from image memory 407. This operation is the readout operation carried out in the direction of arrow 2 in FIG. 11. In picture quality improving processing unit 405, mutual data are added to obtain an average value. More specifically, the least significant bit of the added data is removed in I/O control unit 3023 of FIG. 46. This is equivalent to the operation of dividing the added data by 2 to obtain an average value.

This obtained average value of image data is written into an address corresponding to the 6400th line in image memory 407. The above-described process is repeated until the last pixel of the 6400th line. By carrying out a data process for 6400 lines, the last process data is stored in image memory 407. When the return operation of the scanner is completed, scan motor 410 is stopped, scanner solenoid 32 is turned on, and exposure lamp 31 is returned to the original position indicated by the solid line in FIG. 44.

(2) Image Forming Process (Implies Print Out of Data Stored in Image Memory (407))

In an image forming process, the switch of image switching unit 406 is set to the d side. Image data from the 1st line to the 6400th line stored in image memory 407 is sequentially read out. By controlling an LD light emitting driving unit 408 according to the readout data, the photoreceptor is exposed while the intensity is altered by an LD 409 to carry out a printout process.

The process of image processing unit 403 includes general steps such as shading correction, pixel density conversion, filtering, and γ correction. Although CPU 401 carries out the overall control of the image process, the image data process per se is carried out by a device provided in each block element.

Figure 46:
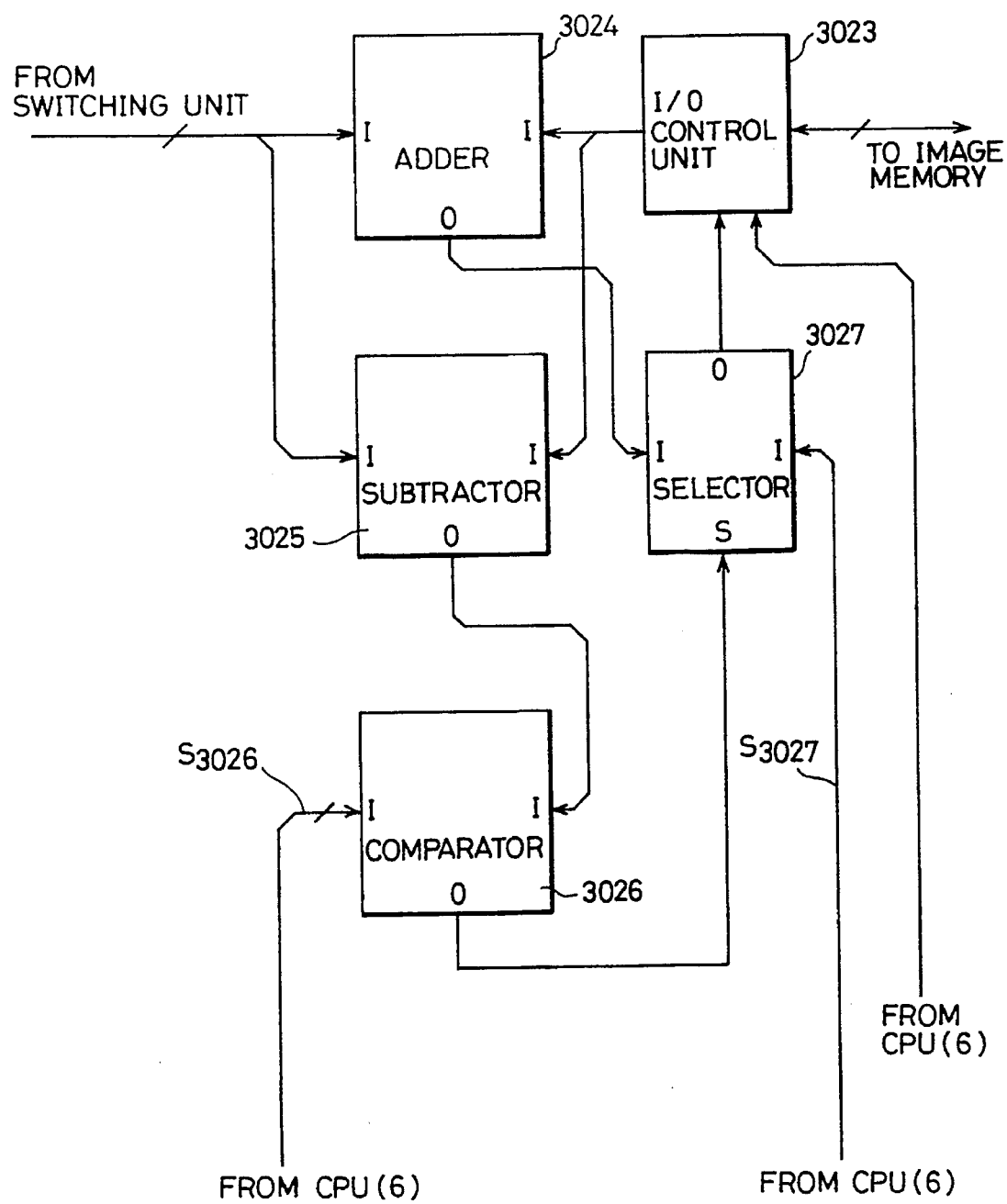
FIG. 46 is a block diagram schematically showing a structure of a picture quality improvement processing unit of FIG. 45.

FIG. 46 is a block diagram specifically showing a structure of picture quality improving processing unit 405 of FIG. 45. The structure of picture quality improving processing unit 405 is similar to that of the image processing unit shown in FIG. 10, provided that an adder 3024 is provided.

According to the structure of FIG. 46, a process of taking an average of data obtained by the forward and return scanning operation, and a process of removing a shadow region on the basis of determination of a shadow region can both be carried out.

Picture quality improving processing unit 405 can be used for first and second picture quality improving processes as set forth in the following.

First Picture Quality Improving Process

When a picture quality improving mode is selected, data (1) read out by the first scanning operation is directly written into the image memory. Data (2) of the second scanning operation is read out, while the read out data (1) stored in the image memory is read out to be provided to adder 3024. This operation is controlled by I/O control unit 3023. Readout data (1) and readout data (2) has data of the same position on the original on a pixel basis added by adder 3024. The added result is written into the image memory via I/O control unit 3023. I/O control unit 3023 simultaneously carries out control of the bus according to the transfer of data and also generation of an address to the memory. When readout data (1) is:

8=00000100, and
readout data (2) is:
10=00000110,
the added result is:
18=000001010. However, in adder 3024, the last one bit is removed to become:
9=00000101. Thus, the average value of readout data (1) and readout data (2) is obtained.

Although an average value is obtained on the basis of two scanning operations, the quality of image data can be improved by carrying out three or more scanning operations to obtain an average or using a predetermined calculation.

Second Picture Quality Improving Process

I/O control unit 3023 reads out on a pixel basis from the image memory the image read out by the first scanning operation. Adder 3024 obtains an average of the image data of the first scanning operation read out from the image memory and the image data of the second scanning operation provided from the switching unit. The output is provided to selector 3027. Subtractor 3025 takes the difference of the two image data, and provides the differential data to a comparator 3026. Comparator 3026 compares a predetermined data in a ROM with the differential data provided from subtractor 3025. The comparison result is provided to a selector 3027. When the output from comparator 3026 is greater than a predetermined value, selector 3027 obtains standard data S3027 from a CPU (6) to provide the same to I/O control unit 3023. Otherwise, selector 3027 provides the output of adder 3024, i.e. an average value, to I/O control unit 3023. I/O control unit 3023 has the data output from selector 3027 written into the image memory.

According to the above-described process, the portion of actual image data is written into the memory as an average data on a pixel basis to improve the data accuracy. For portions that have image data greatly altered by the illumination direction such as in the case of a cut-and-pasted original, the image data can be substituted with another fixed data, for example white data. Thus, image noise is reduced. In this case, the image data to be substituted may be set to data of a white background or data representing white color.

Figure 47:
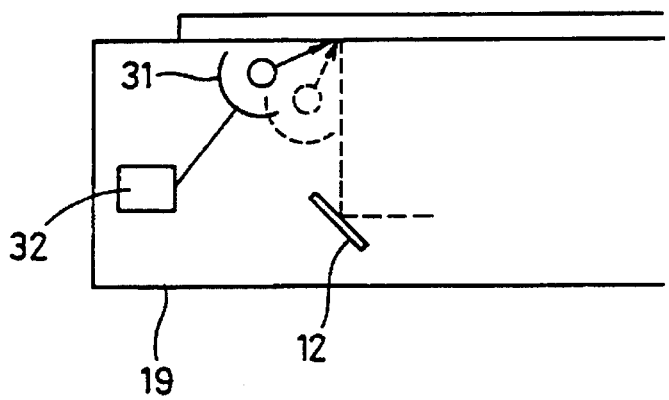
FIG. 47 schematically shows a structure of the proximity of an exposure lamp of a scanner unit according to a seventh embodiment of the present invention.

FIG. 47 is a diagram showing a structure of a scanner unit according to a seventh embodiment of the present invention.

Similar to the preceding embodiments, the seventh embodiment of the present invention has the position of exposure lamp 31 switched according to the drive of solenoid 32. Although the position of the exposure lamp was altered symmetrically with the axis line towards mirror 12 as the center, the position of the exposure lamp is altered, not symmetrically, but irregularly.

Figure 48:
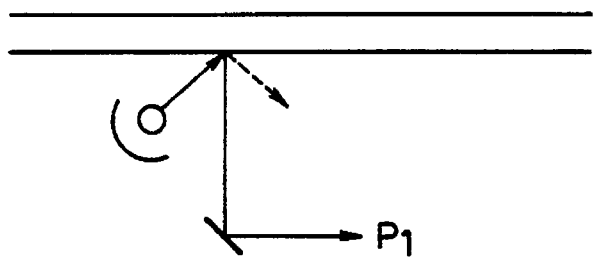
FIG. 48 is a diagram corresponding to FIG. 47, showing the state of the reflected light when the position of the exposure lamp is altered.
Figure 48:
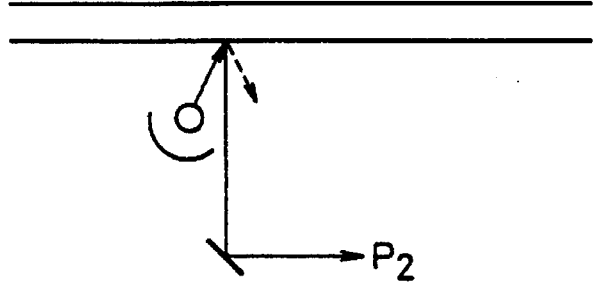

FIG. 48 corresponds to the exposure lamp position of FIG. 47, wherein (1) shows the reflected light when the exposure lamp is positioned as indicated by the solid line in FIG. 47, and (2) shows reflected light when the exposure lamp is positioned is indicated by the broken line in FIG. 47. It is appreciated from these figures that the amount of light $P_1$ and P2 guided by the optical system differs even with the same original when the exposure lamp is placed at the respective positions of (1) and (2) of FIG. 48. The seventh embodiment of the present invention further improves picture quality taking advantage of this phenomenon.

Figure 49:
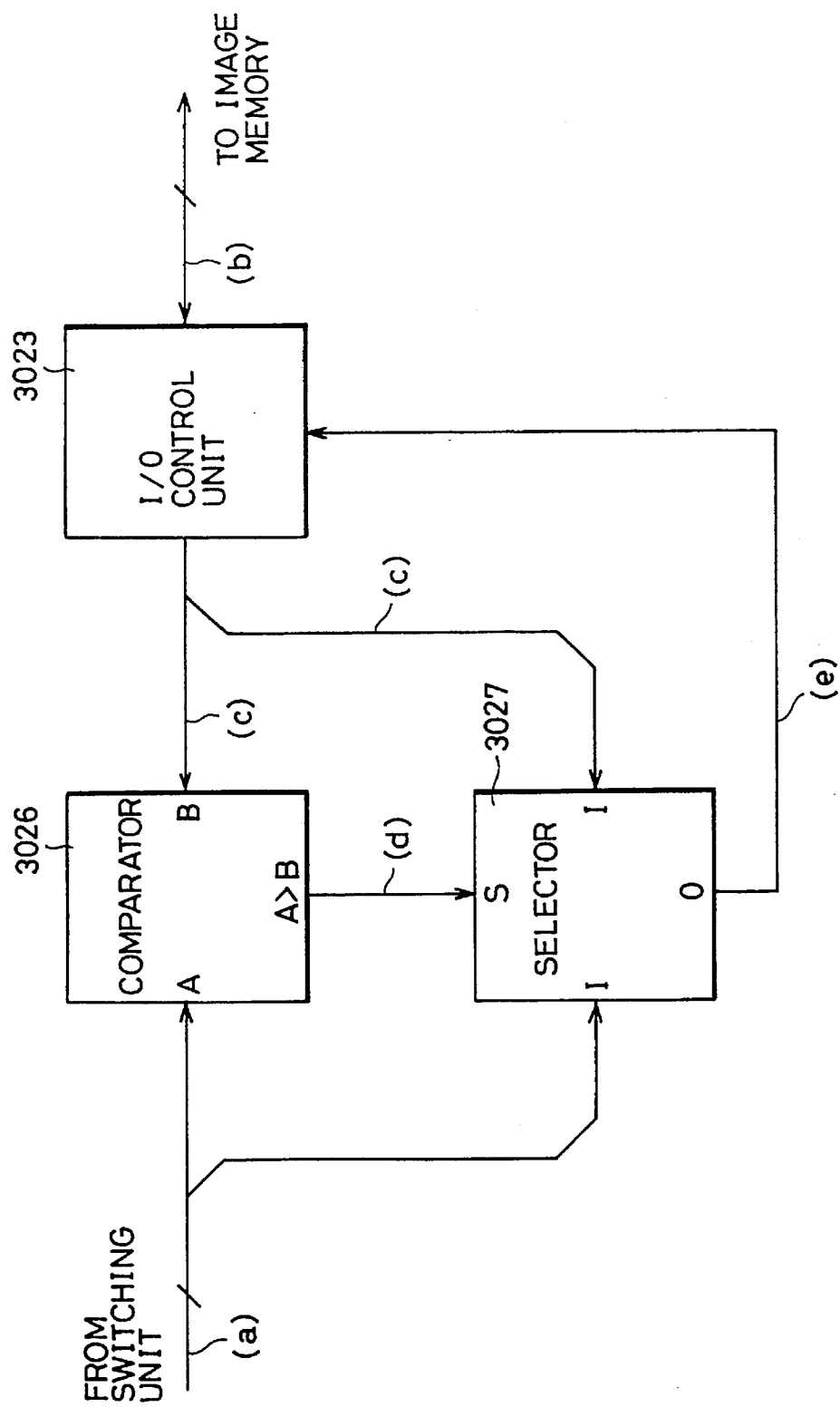
FIG. 49 is a diagram showing a modification of an picture quality improving processing unit according to a seventh embodiment of the present invention.

FIG. 49 shows the main components of the picture quality improving unit according to the seventh embodiment of the present invention.

The procedure of writing data into the image memory by the first scanning operation is similar to that of the preceding embodiment. In the second scanning operation, the light source has its position altered to that shown by the broken line in FIG. 47, and image data is read out. In synchronization with a readout signal (a) of the second scanning operation, a readout signal (b) of the first scanning operation stored in the image memory is read out. I/O control unit 3023 provides the readout signal (b) of the first scanning operation from the image memory to comparator 3026 and also to selector 3027 as an image signal (c). Comparator 3026 compares image signal (a) with image signal (c). The comparison result is provided to selector 3027 as signal (d). In response to switching signal (d) provided from comparator 3026, selector 3027 provides either signal (a) or (c) as an output (e). More specifically, when A>B, data (a) of the greater (brighter) luminance is selected. When A≦B, data (c) is output. I/O control unit 3023 controls the image memory to have output (e) from selector 3027 rewritten into an address identical to the address of the image memory from which the readout signal (b) is read out.

As a result, data of 1 page of greater luminance i.e. greater brightness is stored in the image memory. The subsequent output process of the image memory is similar to that of the prior embodiments.

Figure 50:
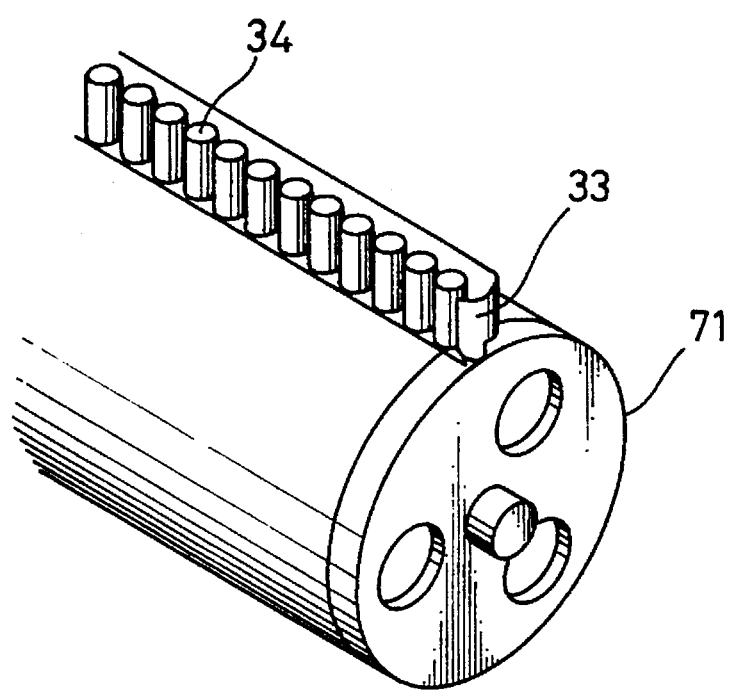
FIG. 50 is a perspective diagram showing a structure in the proximity of the photoreceptor drum according to an eighth embodiment of the present invention.

FIG. 50 is a perspective view of an eraser attached around the photoreceptor drum according to an eighth embodiment of the present invention.

The invention according to the eighth embodiment of the present invention removes an electrostatic latent image formed by charge on a surface of photoreceptor drum 71 corresponding to the portion determined as a shadow region according to the shadow recognition process of the preceding embodiment. One array of LEDs is disposed in the shaft direction of photoreceptor drum 71. The number of LEDs corresponds to the number of pixels in the main scanning direction. Each one of LED 34 is turned on/off independently. By turning on/off a desired LED of LED 34 according to the rotation of photoreceptor drum 71, charge of a specified region of an electrostatic latent image formed on the surface of photoreceptor drum 71 can be erased. In comparison to the preceding embodiment in which image data is removed digitally, the eight embodiment erases data of a portion corresponding to a shadow region or the like on photoreceptor drum 71. Therefore, erasure of a shadow region is possible not only in a digital copier but also in an analog copier.

Figure 51:
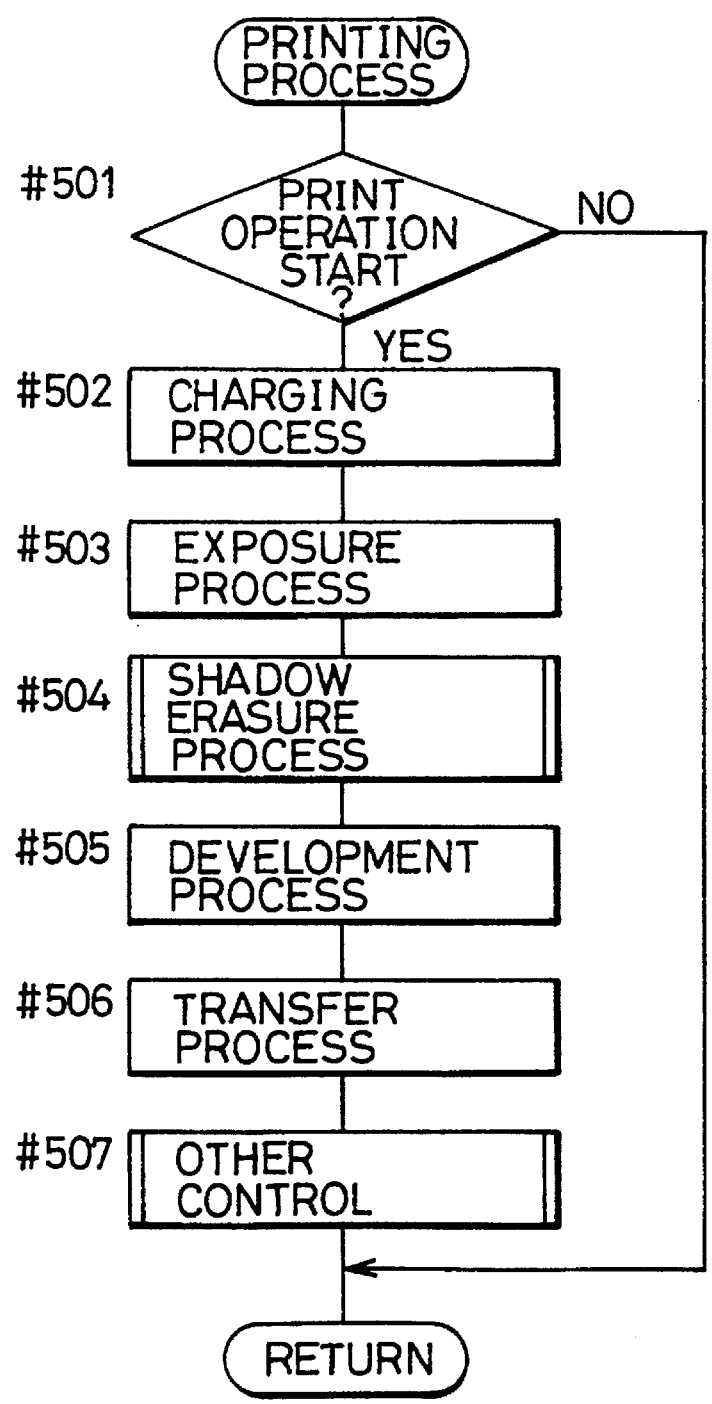
FIG. 51 is a flow chart showing the control contents of a CPU (4) according to an eighth embodiment of the present invention.

FIG. 51 is a flow chart showing the control of a CPU (4) according to the eighth embodiment of the present invention. The entire structure of the control unit of the eighth embodiment is similar to the control block shown in FIGS. 6-8.

In a print process, determination is made whether a print operation is initiated or not at step #501. When a print operation is initiated, a charging process of photoreceptor drum 71 is carried out at step #502. At step #503, an exposure process is carried out according to the image data of the readout original image.

At step #504, an erasure process of a shadow region which will be described afterwards is carried out. At step #505, a developing process is carried out. At step #506, a transfer process is carried out. At step #507, the remaining control is carried out, and the flow returns to the main routine.

Figure 52:
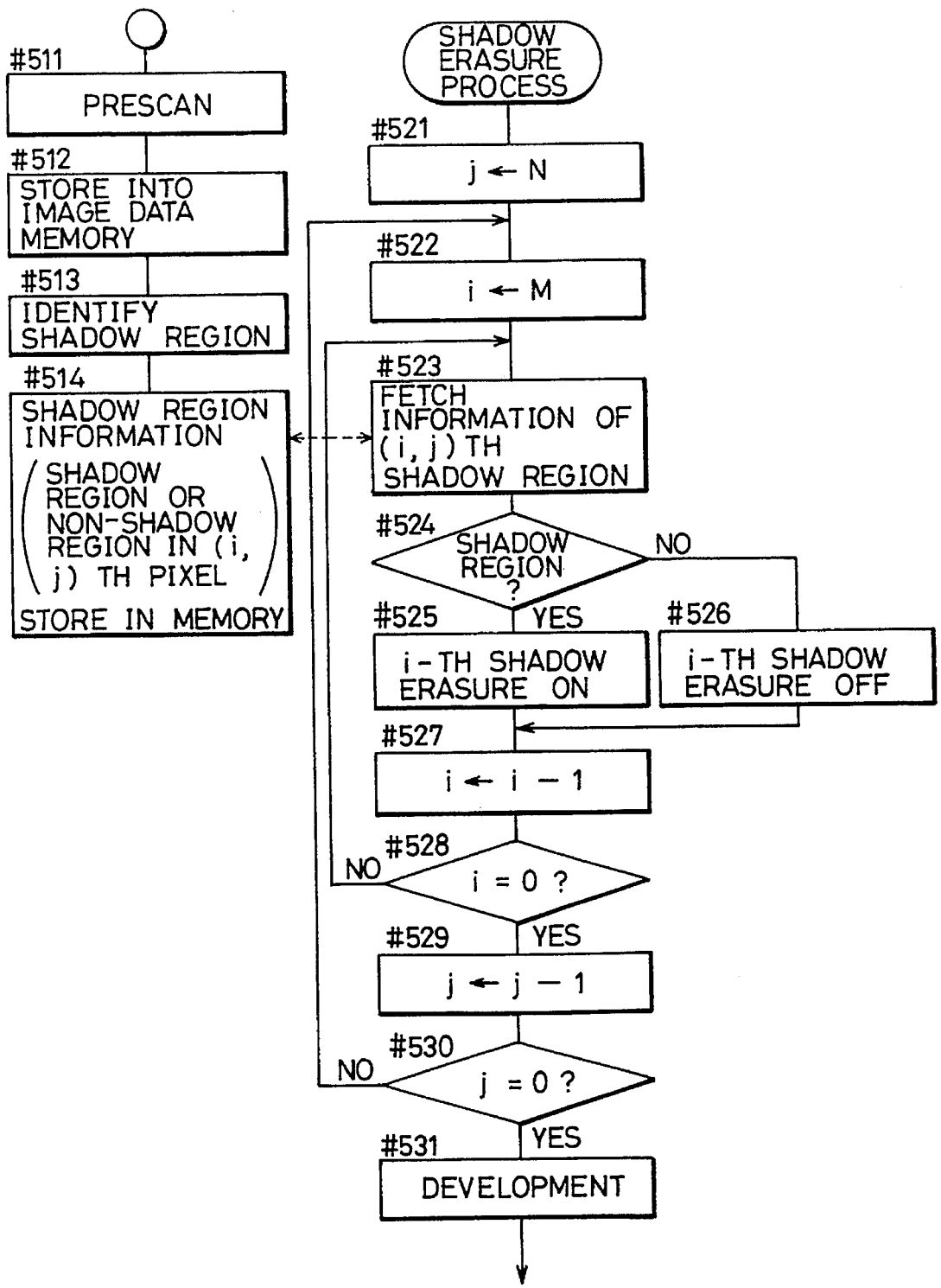
FIG. 52 is a flow chart specifically showing the contents of a shadow erase process routine of FIG. 51.

FIG. 52 is a flow chart showing the contents of a shadow erasure process routine of FIG. 51.

In a shadow erasure process, a value N corresponding to the number of pixels in the subscanning direction for variable j and a value M corresponding to the number of pixels in the main scanning direction for i are set at steps #521 and #522, respectively. At step #523, information of the (i, j)th shadow region is read out.

Prior to this shadow erasure process, a prescanning operation is carried out for the original image in step #511, and the readout image data is stored in the memory at step #512. Similar to the above-described embodiment, a shadow region of an original image is identified according to the stored image data at step #513. At step #514, information of that shadow region is stored in the memory. More specifically, data is stored indicating whether a shadow region exists in the (i, j)th pixel.

Shadow region information is stored in the memory by this prescanning operation. This data is fetched at the operation in step #523. At step #524, determination is made whether the (i, j)th region is a shadow region or not according to the fetched information. If the pixel is a shadow region, the flow proceeds to step #525 to turn on the i-th LED of the shadow eraser of FIG. 48. If the pixel is not a shadow region, that LED is left at the off state in step #526.

At step #527, the variable of i is decremented by 1. At step #528, determination is made whether the value of variable i is 0 or not. The operation from step #523 to #528 is repeated for the number of pixels in the main scanning direction. In other words, the LEDs corresponding to pixel data of each line are turned on/off. At step #529, variable j is decremented by 1. At step #530, determination is made whether the value of variable j is 0 or not. The operation of step #522 to step #530 is repeated for the number of pixels N in the subscanning direction. As a result, the electrostatic latent image of the region recognized as a shadow region for the entire pixel data of M, N pixels is removed with a shadow removal eraser. After a desired process is applied to the electrostatic latent image on photoreceptor drum 71, that electrostatic latent image is developed at step #531. Thus, image data having a desired shadow region removed can be output.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:

a scanning device for sequentially performing a plurality of scanning operations with respect to a single original image, each scanning operation including illuminating the original image and receiving reflected light therefrom to obtain a plurality of sets of image data, wherein an illumination condition is changed for each scanning operation, so that each set of image data is obtained under different illumination conditions; and a data generator which generates image forming data by an average of the plurality of sets of image data.

2. An image forming apparatus comprising:

a scanning device for sequentially performing a plurality of scanning operations with respect to a single original image, each scanning operation including illuminating the original image and receiving reflected light therefrom to obtain a plurality of sets of image data, wherein said scanning device comprises a control device for changing an illumination angle with respect to the original image for each scanning operation, so that each set of image data is obtained under different illumination conditions; and a data generator which generates image forming data based on the plurality of sets of image data obtained by said scanning operation.

3. An image forming apparatus comprising:

a scanning device for sequentially performing a plurality of scanning operations with respect to a single original image, each scanning operation including illuminating the original image and receiving reflected light therefrom to obtain a plurality of sets of image data, adjusting a range of light transmitted to change the illumination conditions for each scanning operation, an aperture being interposed in a path of reflected light, so that each set of image data is obtained under different illumination conditions; and a data generator which generates image forming data based on the plurality of sets of image data obtained by said scanning operation.

4. An image forming apparatus comprising:

a scanning device for sequentially performing a plurality of scanning operations with respect to a single original image, each scanning operation including illuminating the original image and receiving reflected light therefrom to obtain a plurality of sets of image data, said scanning device comprises means for executing a forward and return operation for each scanning operation and for reading out an original in cooperation with each forward and return operation, so that each set of image data is obtained under different illumination conditions; and a data generator which generates image forming data based on the plurality of sets of image data obtained by said forward and return scanning operation.

5. An image forming apparatus comprising:

a scanning device for sequentially performing a plurality of scanning operations with respect to a single original image, each scanning operation including illuminating the original image and receiving reflected light therefrom to obtain a plurality of sets of image data, wherein an illumination condition is changed for each scanning operation, so that each set of image data is obtained under different illumination conditions;

an original image detector which detects a type of the original;

a controller which controls whether a scanning operation is to be carried out for a plurality of times by said scanning device responsive to a detection of said original image detector; and a data generator which generates image forming data based on the plurality of sets of image data obtained by the plurality of times of scanning operation executed by said controller.

6. An image forming apparatus comprising:

a scanning device for sequentially performing a plurality of scanning operations with respect to a single original image, each scanning operation including illuminating the original image and receiving reflected light therefrom to obtain a plurality of sets of image data, wherein an illumination condition is changed for each scanning operation, so that each set of image data is obtained under different illumination conditions;

an identification means for identifying a shadow region corresponding to a difference between said plurality of sets of image data; and an eraser for erasing data corresponding to said shadow region to obtain an image forming data.

7. The image forming apparatus according to claim 6, further comprising:

a density detector which detects density of data corresponding to said shadow region;

wherein said eraser erases data corresponding to said shadow region according to density detected by said density detector.

8. The image forming apparatus according to claim 6, further comprising:

a latent image forming mechanism which forms a latent image of said original image;

wherein said eraser erases a latent image corresponding to said shadow region from said formed latent image based on the identification of said identification means.

9. The image forming apparatus according to claim 8, further comprising:

a density detector which detects density of data corresponding to said shadow region; and a controller which switches between activation and deactivation of said eraser device according to said density detected by said density detector.

10. The image forming apparatus according to claim 8, further comprising:

a density detector which detects density of said data corresponding to said shadow region;

wherein, according to said density of data corresponding to said shadow region, a light intensity of said eraser device is changed.

11. An image forming apparatus comprising:

a scanning device for sequentially performing a plurality of scanning operations with respect to a single original image, each scanning operation including illuminating the original data and receiving reflected light therefrom to obtain a plurality of sets of image data, said scanning device is movable in a forward and return direction with respect to an original, and comprises first and second exposure lamps having a length in an axis direction perpendicular to a travel direction of said scanning device and juxtaposing in the travel direction of said scanning device, so that each set of image data is obtained under different illumination conditions; and a data generator which generates image forming data based on the plurality of sets of image data obtained by said scanning operation.

12. The image forming apparatus according to claim 11, further comprising:

an exposure lamp driver which controls said first exposure lamp to be turned on and said second exposure lamp to be turned off in a forward travel of said scanning device in a first scanning operation, and said first exposure lamp to be turned off and said second exposure lamp to be turned on in a return travel of said scanning device in a second scanning operation.

13. The image forming apparatus according to claim 12, further comprising:

an identification means which identifies a shadow region of an original based on said plurality of sets of image data obtained by the first and second scanning operations.

14. The image forming apparatus according to claim 13, further comprising:

a control device which controls erasure of data corresponding to said shadow region from said plurality of sets of image data based on the identified shadow region of the original.

15. The image forming apparatus according to claim 14, further comprising:

a selector which selects a first mode of activating said control device and a second mode of not activating said control device.

16. An image processing apparatus comprising:

a scanner which sequentially performs a plurality of scanning operations with respect to a single original image, each scanning operation including illuminating the original image and receiving reflected light therefrom to obtain a plurality of sets of monochromatic image data, wherein an illumination condition is changed for each scanning operation, so that each set of monochromatic image data is obtained under different illumination conditions; and a data generator which generates new monochromatic image data based on the plurality of sets of monochromatic image data obtained by said scanning operations.

17. The image processing apparatus according to claim 16, wherein said data generator generates new monochromatic image data by an average of the plurality of sets of monochromatic image data.

18. The image processing apparatus according to claim 16, wherein said scanner sequentially performs two times of scanning operation with respect to a single original image so that two sets of monochromatic image data are obtained.

19. The image processing apparatus according to claim 18, wherein said scanner sequentially performs a forward direction scanning operation and a return direction scanning operation with respect to a single original image so that two sets of monochromatic image data are obtained.

20. The image processing apparatus according to claim 18, further comprising:

an identification means which identifies a shadow region corresponding to a difference between said two sets of monochromatic image data; and an eraser which erases data corresponding to said shadow region identified by said identification means.

21. The image processing apparatus according to claim 20, further comprising:

a density detector which detects density of data corresponding to said shadow region;

wherein said eraser erases data corresponding to said shadow region according to density detected by said density detector.

22. The image processing apparatus according to claim 20, further comprising:

a latent image forming means which forms a latent image of said original image;

wherein said eraser erases a latent image corresponding to said shadow region from said formed latent image based on the identification of said identification means.

23. An image forming apparatus comprising:

a scanning device for sequentially performing a plurality of scanning operations with respect to a single original image, each scanning operation including illuminating the original image and receiving reflected light therefrom to obtain a plurality of sets of image data, wherein a scanning condition is changed for each scanning operation, so that each set of image data is obtained under different scanning conditions; and a data generator which generates image forming data by an average of the plurality of sets of image data.

24. An image forming apparatus comprising:

a scanning device for sequentially performing a plurality of scanning operations with respect to a single original image, each scanning operation including illuminating the original image and receiving reflected light therefrom to obtain a plurality of sets of image data, said scanning device comprises a control device for changing a scanning angle with respect to the original image for each scanning operation, so that each set of image data is obtained under different scanning conditions; and a data generator which generates image forming data based on the plurality of sets of image data obtained by said scanning operation.

25. An image forming apparatus comprising:

a scanning device for sequentially performing a plurality of scanning operations with respect to a single original image, each scanning operation including illuminating the original image and receiving reflected light therefrom to obtain a plurality of sets of image data, said scanning device comprises an aperture mechanism for adjusting a range of light transmitted to change the scanning conditions for each scanning operation, an aperture being interposed in a path of reflected light, so that each set of image data is obtained under different scanning conditions; and a data generator which generates image forming data based on the plurality of sets of image data obtained by said scanning operation.

26. An image forming apparatus comprising:

a scanning device for sequentially performing a plurality of scanning operations with respect to a single original image, each scanning operation including illuminating the original image and receiving reflected light therefrom to obtain a plurality of sets of image data, said scanning device comprises means for executing a forward and return operation for each scanning operation and for reading out an original in cooperation with each forward and return operation, so that each set of image data is obtained under different scanning conditions; and a data generator which generates image forming data based on the plurality of sets of image data obtained by said forward and return scanning operation.

27. An image forming apparatus comprising:

a scanning device for sequentially performing a plurality of scanning operations with respect to a single original image, each scanning operation including illuminating the original image and receiving reflected light therefrom to obtained a plurality of sets of image data, wherein a scanning condition is changed for each scanning operation, so that each set of image data is obtained under different scanning conditions;

an original image detector which detects a type of the original;

a controller which controls whether a scanning operation is to be carried out for a plurality of times by said scanning device responsive to a detection of said original image detector; and a data generator which generates image forming data based on the plurality of sets of image data obtained by the plurality of times of scanning operation executed by said controller.

28. An image forming apparatus comprising:

a scanning device for sequentially performing a plurality of scanning operations with respect to a single original image, each scanning operation including illuminating the original image and receiving reflected light therefrom to obtain a plurality of sets of image data, wherein a scanning condition is changed for each scanning operation, so that each set of image data is obtained under different scanning conditions;

an identification means for identifying a shadow region corresponding to a difference between said plurality of sets of image data; and an eraser for erasing data corresponding to said shadow region to obtain an image forming data.

29. The image forming apparatus according to claim 28, further comprising:

a density detector which detects density of data corresponding to said shadow region;

wherein said eraser erases data corresponding to said shadow region according to density detected by said density detector.

30. The image forming apparatus according to claim 28, further comprising:

a latent image forming mechanism which forms a latent image of said original image, wherein said eraser erases a latent image corresponding to said shadow region from said formed latent image based on the identification of said identification means.

31. The image forming apparatus according to claim 30, further comprising:

a density detector which detects density of data corresponding to said shadow region; and a controller which switches between activation and deactivation of said eraser device according to said density detected by said density detector.

32. The image forming apparatus according to claim 30, further comprising:

a density detector which detects density of said data corresponding to said shadow region;

wherein, according to said density of data corresponding to said shadow region, a light intensity of said eraser device is changed.

33. An image forming apparatus comprising:

a scanning device for sequentially performing a plurality of scanning operations with respect to a single original image, each scanning operation including illuminating the original data and receiving reflected light therefrom to obtain a plurality of sets of image data, said scanning device is movable in a forward and return direction with respect to an original, and comprises first and second exposure lamps having a length in an axis direction perpendicular to a travel direction of said scanning device and juxtaposing in the travel direction of said scanning device, so that each set of image data is obtained under different scanning conditions; and a data generator which generates image forming data based on the plurality of sets of image data obtained by said scanning operation.

34. The image forming apparatus according to claim 33, further comprising:

an exposure lamp driver which controls said first exposure lamp to be turned on and said second exposure lamp to be turned off in a forward travel of said scanning device in a first scanning operation, and said first exposure lamp to be turned off and said second exposure lamp to be turned on in a return travel of said scanning device in a second scanning operation.

35. The image forming apparatus according to claim 34, further comprising:

an identification means which identifies a shadow region of an original based on said plurality of sets of image data obtained by the first and second scanning operations.

36. The image forming apparatus according to claim 35, further comprising:

a control device which controls erasure of data corresponding to said shadow region from said plurality of sets of image data based on the identified shadow region of the original.

37. The image forming apparatus according to claim 36, further comprising:

a selector which selects a first mode of activating said control device and a second mode of not activating said control device.

* * * * *